US012204277B2

(12) United States Patent
Kamada et al.

(10) Patent No.: US 12,204,277 B2
(45) Date of Patent: Jan. 21, 2025

(54) TONER, DEVELOPER, TONER STORAGE UNIT, IMAGE FORMING APPARATUS, AND IMAGE FORMING METHOD

(71) Applicants: Yasuo Kamada, Shizuoka (JP); Hiroshi Yamada, Shizuoka (JP); Toma Takebayashi, Shizuoka (JP); Akio Takei, Shizuoka (JP)

(72) Inventors: Yasuo Kamada, Shizuoka (JP); Hiroshi Yamada, Shizuoka (JP); Toma Takebayashi, Shizuoka (JP); Akio Takei, Shizuoka (JP)

(73) Assignee: Ricoh Company, Ltd., Tokyo (JP)

(*) Notice: Subject to any disclaimer, the term of this patent is extended or adjusted under 35 U.S.C. 154(b) by 519 days.

(21) Appl. No.: 17/678,125

(22) Filed: Feb. 23, 2022

(65) Prior Publication Data

US 2022/0291602 A1 Sep. 15, 2022

(30) Foreign Application Priority Data

Feb. 26, 2021 (JP) ................................ 2021-030706

(51) Int. Cl.

*G03G 9/08* (2006.01)
*G03G 9/087* (2006.01)
*G03G 15/02* (2006.01)

(52) U.S. Cl.

CPC ......... *G03G 9/0825* (2013.01); *G03G 9/0819* (2013.01); *G03G 9/08711* (2013.01); *G03G 15/0258* (2013.01)

(58) Field of Classification Search

CPC ............... G03G 9/0825; G03G 9/0819; G03G 9/08711; G03G 15/0258; G03G 9/09328;

(Continued)

(56) References Cited

U.S. PATENT DOCUMENTS 6,936,390 B2 8/2005 Nanya et al.
7,303,847 B2 12/2007 Tomita et al.

(Continued)

FOREIGN PATENT DOCUMENTS

JP 2002-284881 10/2002
JP 2005-55498 3/2005

(Continued)

OTHER PUBLICATIONS

U.S. Appl. No. 17/400,226, filed Aug. 12, 2021.

(Continued)

*Primary Examiner* — Stewart A Fraser

(74) *Attorney, Agent, or Firm* — Grüneberg and Myers PLLC

(57) ABSTRACT

Provided is a toner including toner base particles and resin particles. Each toner base particle includes a binder resin, a colorant, and wax. Each resin particle e has a core-shell structure including a core and a shell, where a glass transition temperature TgA of the shell is higher than a glass transition temperature TgB of the core. A surface of each toner base particle is covered with the resin particles. A storage elastic modulus G'1 of the toner at 70° C. during heating is $1.0\times10^5$ Pa or greater but $1.0\times10^3$ Pa or less, and a storage elastic modulus G'2 of the toner at 100° C. during heating is $1.0\times10^4$ Pa or greater but $5.0\times10^4$ Pa or less, as the toner is measured by a rheometer.

13 Claims, 3 Drawing Sheets

(58) Field of Classification Search
CPC ........... G03G 9/09357; G03G 9/09364; G03G 9/09314
See application file for complete search history.

(56) References Cited

U.S. PATENT DOCUMENTS

| | | | |
|---|---|---|---|
| 7,374,851 | B2 | 5/2008 | Nakayama et al. |
| 7,504,188 | B2 | 3/2009 | Yamada et al. |
| 9,785,074 | B2 | 10/2017 | Nagata et al. |
| 9,921,503 | B2 | 3/2018 | Yamada et al. |
| 10,088,766 | B2 | 10/2018 | Santo et al. |
| 2003/0027074 | A1 | 2/2003 | Emoto et al. |
| 2003/0096185 | A1 | 5/2003 | Yamashita et al. |
| 2003/0134220 | A1 | 7/2003 | Emoto et al. |
| 2003/0138717 | A1 | 7/2003 | Yagi et al. |
| 2003/0152859 | A1 | 8/2003 | Emoto et al. |
| 2004/0131961 | A1 | 7/2004 | Watanabe et al. |
| 2005/0112488 | A1 | 5/2005 | Yamada et al. |
| 2006/0024097 | A1 | 2/2006 | Yamada et al. |
| 2007/0184370 | A1 | 8/2007 | Yamashita et al. |
| 2008/0227000 | A1 | 9/2008 | Honda et al. |
| 2008/0280218 | A1 | 11/2008 | Sabu et al. |
| 2008/0280219 | A1 | 11/2008 | Nakayama et al. |
| 2010/0285402 | A1 | 11/2010 | Saitoh et al. |
| 2011/0033796 | A1 | 2/2011 | Yamada et al. |
| 2014/0242514 | A1 | 8/2014 | Inoue et al. |
| 2014/0272695 | A1 | 9/2014 | Moritani et al. |
| 2014/0342283 | A1 | 11/2014 | Yamamoto et al. |
| 2015/0353677 | A1 | 12/2015 | Izumi et al. |
| 2015/0361213 | A1 | 12/2015 | Kamada et al. |
| 2017/0115583 | A1* | 4/2017 | Tsuchihashi ....... G03G 9/08711 |
| 2017/0242359 | A1* | 8/2017 | Washino ............ G03G 9/09321 |
| 2018/0017884 | A1* | 1/2018 | Asakawa ........... G03G 9/08793 |
| 2018/0024454 | A1* | 1/2018 | Ojima ................ G03G 9/09314 430/108.1 |
| 2018/0335712 | A1* | 11/2018 | Okita ................. G03G 9/09321 |
| 2019/0086826 | A1* | 3/2019 | Komada ............ G03G 9/09371 |
| 2019/0227449 | A1 | 7/2019 | Nemoto et al. |
| 2021/0116830 | A1 | 4/2021 | Takei et al. |
| 2021/0356877 | A1 | 11/2021 | Kamada et al. |
| 2021/0389686 | A1 | 12/2021 | Kakinuma et al. |

FOREIGN PATENT DOCUMENTS

| | | |
|---|---|---|
| JP | 2007-233030 | 9/2007 |
| JP | 2019-099809 | 6/2019 |
| JP | 2019-143128 | 8/2019 |
| JP | 2021-182034 | 11/2021 |

OTHER PUBLICATIONS

Notice of rejection for Japanese Patent Application No. 2021-030706, dated Jul. 23, 2024, 6 pages with English Translation.

* cited by examiner

TONER, DEVELOPER, TONER STORAGE UNIT, IMAGE FORMING APPARATUS, AND IMAGE FORMING METHOD

CROSS-REFERENCE TO RELATED APPLICATIONS

The present application claims priority under 35 U.S.C. § 119 to Japanese Patent Application No. 2021-030706 filed Feb. 26, 2021. The contents of which are incorporated herein by reference in their entirety.

BACKGROUND OF THE INVENTION

Field of the Invention

The present disclosure relates to a toner, a developer, a toner storage unit, an image forming apparatus, and an image forming method.

Description of the Related Art

In recent years, toners have been desired to have a small particle size and hot offset resistance for improving quality of output images, low temperature fixability for energy saving, and heat resistant storage stability for resisting high temperature and high humidity conditions during storage or transportation after the production. Particularly, an improvement in low temperature fixability of a toner is very important because the energy consumption during fixing constitutes the majority of the energy consumption in the image formation process.

In order to improve low temperature fixability of a toner, it is important to use a material having a low melting point for the toner. However, the toner produced with the material having a low melting point has poor heat resistant storage stability. There is a trade-off between the low temperature fixability and the heat resistant storage stability.

In order to achieve both low temperature fixability and heat resistant storage stability, therefore, proposed is for example a production method of composite resin particles where the method includes forming composite particles including resin particles on each surface of which fine resin particles including two resins within each fine resin particle as constitutional components are deposited, and removing part of or the entire fine resin particles (see, for example, Japanese Unexamined Patent Application Publication Nos. 2002-284881, 2019-099809, and 2019-143128). Moreover, proposed are resin particles deposited on surfaces of toner particles (see Japanese Unexamined Patent Application Publication No. 2007-233030).

SUMMARY OF THE INVENTION

According to one aspect of the present disclosure, a toner includes toner base particles and resin particles. Each of the toner base particles includes a binder resin, a colorant, and wax. Each of the resin particles has a core-shell structure including a core and a shell, where a glass transition temperature TgA of the shell is higher than a glass transition temperature TgB of the core. A surface of each of the toner base particles is covered with the resin particles. A storage elastic modulus G'1 of the toner at 70° C. during heating is $1.0\times10^5$ Pa or greater but $1.0\times10^6$ Pa or less, and a storage elastic modulus G'2 of the toner at 100° C. during heating is $1.0\times10^4$ Pa or greater but $5.0\times10^4$ Pa or less, as the toner is measured by a rheometer.

DESCRIPTION OF THE EMBODIMENTS

Figure 1:
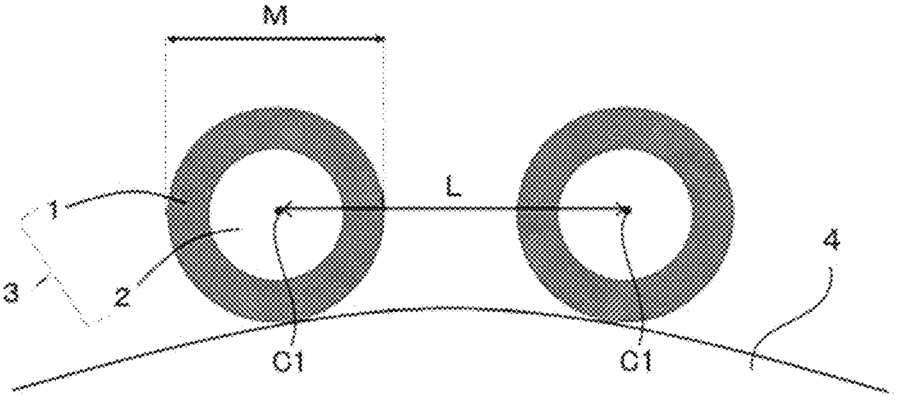
FIG. 1 is a schematic view illustrating an example of a state of a toner surface.

The toner, developer, toner storage unit, image forming apparatus, and image forming method of the present disclosure will be described with reference to drawings hereinafter. Embodiments or aspects of the present disclosure described shall not be construed to as limiting the scope of the present disclosure. The embodiments may be changed to other embodiments, or through addition, modification, or omission, within the range a person skilled in the art can arrive, and any of these embodiments are included in the scope of the present disclosure as long as such embodiments exhibit functions and effects of the present disclosure.

(Toner)

The toner of the present disclosure includes toner base particles and resin particles. Each toner base particle includes a binder resin, a colorant, and wax. Each resin particle has a core-shell structure including a core and a shell, where a glass transition temperature TgA of the shell is higher than a glass transition temperature TgB of the core. A surface of each toner base particle is covered with the resin particles. A storage elastic modulus G'1 of the toner at 70° C. during heating is $1.0\times10^5$ Pa or greater but $1.0\times10^6$ Pa or less, and a storage elastic modulus G'2 of the toner at 100° C. during heating is $1.0\times10^4$ Pa or greater but $5.0\times10^4$ Pa or less, as the toner is measured by a rheometer.

In the art, it has been desired to develop a technology capable of achieving both low temperature fixability and heat resistant storage stability, and achieving excellent cleaning performance on a photoconductor (electrostatic latent image bearer) and prevention of contamination of a cleaning member or a photoconductor at the same time. For example, external additives, such as inorganic particles, function as a lubricant to contribute to improvement of cleaning performance. On the other hand, there is a concern that use of the external additives may contaminate a cleaning member, such as a cleaning blade, or a photoconductor.

In the art, additives, such as inorganic particles (e.g. silica, and titanium oxide) are added to surfaces of typical toner particles for the purpose of imparting flowability or chargeability. It has been know that, during cleaning of the toner, the toner is blocked by a cleaning blade, which is an example of a cleaning member, on a photoconductor (also referred to as an image bearer, or an electrostatic latent image bearer), and the additives are freed from the blocked toner. The freed additives are supplied to a contact part between the cleaning blade and the image bearer to form a banked layer of the additives. The banked layer of the additives functions as a lubricant between the cleaning blade and the image bearer. As a result, excellent toner cleaning performance is obtained. However, as an amount of the additives increases, an amount of the additives freed from the toner increases due to the increased amount of the additives. As a result, the cleaning blade or photoconductor is contaminated with the additives, leading to significant abrasion of the cleaning blade or deterioration of the photoconductor. Such problems become significant especially when inorganic particles are used as external additives.

In contrast, the present disclosure can achieve both low temperature fixability and heat resistant storage stability, and contamination of a cleaning member or a photoconductor can be prevented while maintaining excellent cleaning performance. Since surfaces of toner base particles are covered with resin particles in the present disclosure, the resin particles can make the toner particles hard without impairing fixability. Therefore, an amount of inorganic particles serving as additives can be reduced. Accordingly, contamination of a cleaning member of photoconductor can be prevented while maintaining excellent cleaning performance. Since the glass transition temperatures of the shells and cores, and storage elastic modulus of the toner satisfy the ranges specified in the present disclosure, moreover, reliability (storage stability and deposition properties) can be secured even though the amount of additives is reduced, and both low temperature fixability and heat resistant storage stability can be achieved.

The present disclosure has an object to provide a toner, which can achieve both low temperature fixability and heat resistant storage stability, and can prevent a cleaning blade or a photoconductor from contamination while maintaining excellent cleaning performance.

The present disclosure can provide a toner, which can achieve both low temperature fixability and heat resistant storage stability, and can prevent a cleaning blade or a photoconductor from contamination with maintaining excellent cleaning performance.

<Storage Elastic Modulus of Toner>

When the toner of the present disclosure is measured by a rheometer, a storage elastic modulus G'1 of the toner at 70° C. during heating is $1.0\times10^5$ Pa or greater but $1.0\times10^6$ Pa or less, and a storage elastic modulus G'2 of the toner at 100° C. during heating is $1.0\times10^4$ Pa or greater but $5.0\times10^4$ Pa or less. When the storage elastic modulus G'1 and the storage elastic modulus G'2 of the toner satisfy the above-mentioned ranges, respectively, the above-described effects can be obtained.

When the storage elastic modulus G'1 at 70° C. during heating is less than $1.0\times10^5$ Pa or greater than $1.0\times10^6$ Pa, it may be difficult to achieve both fixability and heat resistant storage stability of the toner at the same time.

In order to adjust the storage elastic modulus G'1 at 70° C. during heating to the range of $1.0\times10^5$ Pa or greater but $1.0\times10^6$ Pa or less, for example, a blending ratio of a crystalline resin, an amorphous resin, and resin particles is appropriately adjusted.

When the storage elastic modulus G'2 at 100° C. during heating is less than $1.0\times10^4$ Pa or greater than $5.0\times10^4$ Pa, it may be difficult to achieve both fixability and heat resistant storage stability of the toner at the same time.

In order to adjust the storage elastic modulus G'2 at 100° C. during heating to the range of $1.0\times10^4$ Pa or greater but $5.0\times10^4$ Pa or less, for example, a blending ratio of a crystalline resin, an amorphous resin, and resin particles is appropriately adjusted.

<Resin Particles>

In the present disclosure, the resin particles cover surfaces of the toner base particles. Each of the resin particles has a core-shell structure including a shell and a core. A glass transition temperature TgA of the shell is higher than a glass transition temperature TgB of the core. Although the detailed description thereof will be provided later, high heat resistance storage stability of a toner can be assured because the glass transition temperature TgA of the shell is higher than the glass transition temperature TgB of the core.

A surface of each toner base particle is covered with the resin particles. A coverage factor of the surfaces of the toner base particles with the resin particles is preferably 30% or greater but 90% or less, and more preferably 30% or greater but 70% or less.

Since the coverage factor of the surfaces of the toner base particles with the resin particles is 30% or greater, heat resistant storage stability of a resultant toner can be assured. Since the coverage factor of the surfaces of the toner base particles with the resin particles is 90% or less, external additives are easily deposited on the toner base particles covered with the resin particles, and heat is easily transmitted during fixing of the toner to assure fixability of the toner. Since the coverage factor of the surfaces of the toner base particles with the resin particles is 70% or less, the above-effects can be obtained.

The coverage factor of the surfaces of the toner base particles with the resin particles is measured in the following manner.

The resin particles on the surface of the toner base particle are observed under a scanning electron microscope (SEM), and an area ratio of the resin particles to the area of the toner base particle is calculated from the captured image using an image processing software.

The standard deviation of the distance between the resin particles next to one another present on a surface of the toner base particle is preferably 500 nm or less, more preferably 250 nm or less, and even more preferably 100 nm or less. The lower limit of the standard deviation of the distance between the resin particles next to one another present on the surface of the toner base particle is preferably 10 nm or greater. When the standard deviation of the distance between resin particles next one another present on the surface of the toner base particle is 500 nm or less, both low temperature fixability and heat resistant storage stability are achieved at a high level, and image defects due to filming can be prevented while maintaining excellent cleaning performance.

The average distance between the resin particles next to one another present on the surface of the toner base particle is preferably 10 nm or greater but 500 nm or less, and more preferably 20 nm or greater but 250 nm or less.

Examples of a method for adjusting the standard deviation of the distance between the resin particles next to one another present on the surface of the toner base particle to 500 nm or less include: a method where a composition is designed so that a coverage factor of toner base particles having a target toner particle diameter with the resin particles is to be 90% or greater, and the resin particles are added during an emulsification step of a toner production process to deposit and closely adhere the resin particles onto surfaces of the toner base particles; and a method where the average circularity of the toner base particles is adjusted to efficiently deposit the resin particles to control the distance between the resin particles.

In the present disclosure, the distance between the resin particles next to one another present on the surface of the toner base particle is a distance from a center of one resin particle to a center of another resin particle. The center of the resin particle is determined by observing the resin particle under a scanning electron microscope (SEM) to capture an image of the resin particle, and determining the center point of the image of the resin particle as the center of the resin particle.

The surface of the toner base particle is not flat but is slightly rounded (curved). Therefore, the distance between the resin particles is not measured with the distance between the resin particles projected on the surface of the toner base particle. Instead, the distance between the resin particles is the minimum distance between the resin particles on an image of the resin particles on the surface of the toner base particle captured by a scanning electron microscope (SEM).

FIG. 1 is a schematic view illustrating an example of a state of a toner surface. The resin particles 3 are deposited on the surface of the toner base particle 4. The resin particle 3 includes a core resin (b2) 2 and a shell resin (b1) 1, which will be described later. C1 and C2 are centers of the resin particles 3, respectively. M is the volume average primary particle diameter of the resin particles 3. L is the distance between the resin particles 3 next to one another.

Figure 2:
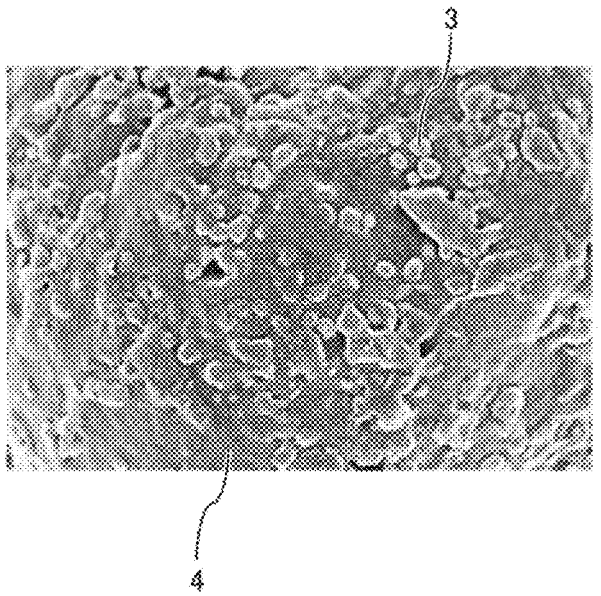
FIG. 2 is a photograph depicting an example of an SEM image of the toner surface.

Moreover, FIG. 2 is a photograph depicting an example of a SEM image of the toner surface. As depicted in FIG. 2, the resin particles 3 are deposited on the surface of the toner base particle 4.

A method for measuring the distance between the resin particles will be described. As described hereinafter, the external additives are removed from the toner particles as much as possible by a liberation treatment using ultrasonic waves, to make the toner particles in the state close to the toner base particles, and then the average value and standard deviation of the distance between the resin particles.

—Liberation Method of External Additives—

[1] A 100 mL screw vial is charged with 50 mL of a 5% by mass surfactant aqueous solution (product name: NOIGEN ET-165, available from DKS Co., Ltd.). To the solution, 3 g of the toner is added, and the vial is slowly agitated in up-down and left-right motions. Thereafter, the resultant is stirred by a ball mill for 30 minutes to homogeneously disperse the toner in the dispersion solution.

[2] Then, ultrasonic energy is applied to the resultant for 60 minutes by means of an ultrasonic homogenizer (product name: homogenizer, type: VCX750, CV33, available from Sonics & Materials, Inc.) with setting the output to 40 W.

[Ultrasonic Wave Conditions]

Vibration duration: continuous 60 minutes

Amplitude: 40 W

Vibration onset temperature: 23° C.±1.5° C.

Temperature during vibrations: 23° C.±1.5° C.

[3](1) The dispersion liquid is subjected to vacuum filtration with filter paper (product name: Quantitative filter paper (No. 2, 110 mm), available from Advantec Toyo Kaisha, Ltd.). The resultant is washed twice with ion-exchanged water, followed by performing filtration. After removing the free additives that have been detached from the toner particles, the toner particles are dried.

(2) The toner obtained in (1) is observed under scanning electron microscope (SEM). First, a backscattered electron image is observed to detect external additives and/or filler including Si.

(3) The image of (1) is binarized using image processing software (ImageJ), to eliminate the external additives and/or filler.

Next, the toner of the same location as (1) is observed to obtain a secondary electron image. The resin particles are not observed in the backscattered electron image, but are observed only in the secondary electron image. With reference to the image obtained in (3), therefore, the particles present in the region other than the residual external additives and fillers (other than the region excluded in (3)) are determined as the resin particles, and a distance between the resin particles (a distance between the center of one resin particle and the center of another resin particle present next to the one resin particle) is measured using the image processing software.

The measurement is performed on 100 binarized images (one toner particle per image) and an average of the measured values is determined as an average value of the distance between the resin particles.

The standard deviation of the distance between resin particles is calculated according to the following equation, where x is a distance between particles.

$$\sqrt{\frac{1}{n-1}\sum_{k=1}^{n}(x_i-\bar{x})}$$

[Image Capturing Conditions]

Scanning electron microscope: SU-8230 (available from Hitachi High-Tech Corporation)

Image capturing magnification: 35,000 times

Captured image: secondary electron (SEL) image, backscattered electron (BSE) image Acceleration voltage: 2.0 kV Acceleration current: 1.0 μA Probe current: Normal Focus mode: UHR WD: 8.0 mm The volume average primary particle diameter of the resin particles is preferably 5 nm or greater but 100 nm or less, more preferably 10 nm or greater but 100 nm or less, and even more preferably 10 nm or greater but 50 nm or less. When the volume average primary particle diameter is within the above-mentioned range, improved low temperature fixability can be obtained.

For example, the volume average primary particle diameter can be measured by observing a scanning electron microscopic (SEM) image.

Each of the resin particles (may be also referred to as "resin particles (B) hereinafter) preferably has a core resin (core) and a shell resin (a shell) covering at least part of the surface of the core resin. More preferably, each resin particle is composed of the core resin and the shell resin. Yet more preferably, the resinous material of each resin particle includes a vinyl-based unit of a resin (b1) and a vinyl-based unit of a resin (b2).

The shell resin (may be also referred to as a "resin (b1)" hereinafter) and the core resin (may be also referred to as a "resin (b2) hereinafter) are each preferably a polymer obtained through homopolymerization or copolymerization of a vinyl monomer.

Examples of the vinyl monomer include the following (1) to (10).

(1) Vinyl Hydrocarbon

Examples of the vinyl hydrocarbon include (1-1) aliphatic vinyl hydrocarbon, (1-2) alicyclic vinyl hydrocarbon, and (1-3) aromatic vinyl hydrocarbon.

(1-1) Aliphatic Vinyl Hydrocarbon

Examples of the aliphatic vinyl hydrocarbon include alkene and alkadiene.

Specific examples of the alkene include ethylene, propylene, and α-olefin.

Specific examples of the alkadiene include butadiene, isoprene, 1,4-pentadiene, 1,6-hexadiene, and 1,7-octadiene.

(1-2) Alicyclic Vinyl Hydrocarbon

Examples of the alicyclic vinyl hydrocarbon include mono- or di-cycloalkene and alkadiene. Specific examples thereof include (di)cyclopentadiene, and terpene.

(1-3) Aromatic Vinyl Hydrocarbon

Examples of the aromatic vinyl hydrocarbon include styrene, and hydrocarbyl (alkyl, cycloalkyl, aralkyl and/or alkenyl)-substituted styrene. Specific examples thereof include α-methylstyrene, 2,4-dimethylstyrene, and vinyl naphthalene.

(2) Carboxyl Group-Containing Vinyl Monomer and Salts Thereof

Examples of the carboxyl group-containing vinyl monomer and salts thereof include C3-30 unsaturated monocarboxylic acid (salt), unsaturated dicarboxylic acid (salt), anhydrides (salt) thereof, and monoalkyl (the number of carbon atoms: from 1 through 24) ester thereof and salt thereof.

Specific examples thereof include: carboxyl group-containing vinyl monomers, such as (meth)acrylic acid, maleic acid (anhydride), monoalkyl maleate, fumaric acid, monoalkyl fumarate, crotonic acid, itaconic acid, monoalkyl itaconate, itaconic acid glycol monoether, citraconic acid, monoalkyl citraconate, and cinnamic acid; and metal salts thereof.

In the present disclosure, "acid (salt)" means an acid or a salt of the acid.

For example, C3-30 unsaturated monocarboxylic acid (salt) means C3-30 unsaturated monocarboxylic acid or a salt thereof.

In the present disclosure, "(meth)acrylic acid" means methacrylic acid or acrylic acid.

In the present disclosure, "(meth)acryloyl" means methacryloyl or acryloyl.

In the present disclosure, "(meth)acrylate" means methacrylate or acrylate.

(3) Sulfonic Acid Group-Containing Vinyl Monomer, Vinyl Sulfuric Acid Monoester Compound, and Salts Thereof Examples of the sulfonic acid group-containing vinyl monomer, vinyl sulfuric acid monoester compound and salts thereof include C2-14 alkene sulfonic acid (salt), C2-24 alkyl sulfonic acid (salt), sulfo(hydroxy)alkyl-(meth)acrylate (salt), sulfo(hydroxy)alkyl-(meth)acrylamide (salt), and alkylallylsulfosuccinic acid (salt).

Specific examples of the C2-14 alkene sulfonic acid include vinyl sulfonic acid (salt).

Specific examples of the C2-24 alkyl sulfonic acid (salt) include α-methylstyrenesulfonic acid (salt).

Specific examples of the sulfo(hydroxy)alkyl-(meth)acrylate (salt) and sulfo(hydroxy)alkyl-(meth)acrylamide (salt) include sulfopropyl(meth)acrylate (salt), sulfuric acid ester (salt), and a sulfonic acid group-containing vinyl monomer (salt).

(4) Phosphoric Acid Group-Containing Vinyl Monomer and Salts Thereof

Examples of the phosphoric acid group-containing vinyl monomer and salts thereof include (meth)acryloyloxyalkyl (the number of carbon atoms: from 1 through 24) phosphoric acid monoester (salt), and (meth)acryloyloxyalkyl (the number of carbon atoms: from 1 through 24) phosphonic acid (salt).

Specific examples of the (meth)acryloyloxyalkyl (the number of carbon atoms: from 1 through 24) phosphoric acid monoester (salt) include 2-hydroxyethyl(meth)acryloyl phosphate (salt), and phenyl-2-acryloyloxyethyl phosphate (salt).

Specific examples of the (meth)acryloyloxyalkyl (the number of carbon atoms: from 1 through 24) phosphonic acid (salt) include 2-acryloyloxyethylphosphonic acid (salt).

Examples of salts of (2) to (4) above include alkali metal salts (e.g., sodium salt, and potassium salt), alkaline earth metal salts (e.g., calcium salt, and magnesium salt), ammonium salts, amine salts, and quaternary ammonium salts.

(5) Hydroxyl Group-Containing Vinyl Monomer

Examples of the hydroxyl group-containing vinyl monomer include hydroxystyrene, N-methylol(meth)acrylamide, hydroxyethyl(meth)acrylate, hydroxypropyl(meth)acrylate, polyethylene glycol mono(meth)acrylate, (meth)allyl alcohol, crotyl alcohol, isocrotyl alcohol, 1-buten-3-ol, 2-buten-1-ol, 2-butane-1,4-diol, propargyl alcohol, 2-hydroxyethylpropenyl ether, and sucrose allyl ether.

(6) Nitrogen-containing vinyl monomer

Examples of the nitrogen-containing vinyl monomer include (6-1) an amino group-containing vinyl monomer, (6-2) an amide group-containing vinyl monomer, (6-3) a nitrile group-containing vinyl monomer, (6-4) a quaternary ammonium cation group-containing vinyl monomer, and (6-5) a nitro group-containing vinyl monomer.

Examples of the (6-1) amino group-containing vinyl monomer include aminoethyl (meth)acrylate.

Examples of the (6-2) amide group-containing vinyl monomer include (meth)acrylamide, and N-methyl(meth)acrylamide.

Examples of the (6-3) nitrile group-containing vinyl monomer include (meth)acrylonitrile, cyanostyrene, and cyanoacrylate.

Examples of the (6-4) quaternary ammonium cation group-containing vinyl monomer include quaternized compound (quaternized using a quaternizing agent, such as methyl chloride, dimethyl sulfate, benzyl chloride, and dimethyl carbonate) of a tertiary amine group-containing vinyl monomer (e.g., dimethylaminoethyl(meth)acrylate, diethylaminoethyl(meth)acrylate, dimethylaminoethyl (meth)acrylamide, diethylaminoethyl(meth)acrylamide, and diallylamine).

Examples of the (6-5) nitro group-containing vinyl monomer include nitrostyrene.

(7) Epoxy Group-Containing Vinyl Monomer

Examples of the epoxy group-containing vinyl monomer include glycidyl (meth)acrylate, tetrahydrofurfuryl (meth) acrylate, and p-vinyl phenyl phenyl oxide.

(8) Halogen Element-Containing Vinyl Monomer

Examples of the halogen element-containing vinyl monomer include vinyl chloride, vinyl bromide, vinylidene chloride, allyl chloride, chlorostyrene, bromostyrene, dichlorostyrene, chloromethylstyrene, tetrafluorostyrene, and chloroprene.

(9) Vinyl Ester, Vinyl (Thio) Ether, Vinyl Ketone

Examples of the vinyl ester include vinyl acetate, vinyl butyrate, vinyl propionate, diallyl phtharate, diallyl adipate, isopropenyl acetate, vinyl methacrylate, methyl 4-vinylbenzoate, cyclohexyl methacrylate, benzyl methacrylate, phenyl (meth)acrylate, vinyl methoxy acetate, vinyl benzoate, ethyl α-ethoxyacrylate, C1-50 alkyl group-containing alkyl(meth) acrylate [e.g., methyl (meth)acrylate, ethyl (meth)acrylate, propyl (meth)acrylate, butyl (meth)acrylate, 2-ethylhexyl (meth)acrylate, dodecyl (meth)acrylate, hexadecyl (meth) acrylate, heptadecyl (meth)acrylate, octadecyl (meth)acrylate, eicosyl (meth)acrylate, and behenyl (meth)acrylate)], dialkyl fumarate (where 2 alkyl groups are each a C2-8 straight-chain or branched-chain alicyclic group), dialkyl maleate (where 2 alkyl groups are each a C2-8 straight-chain or branched-chain alicyclic group), poly(meth)allyloxy alkane [e.g., diallyloxy ethane, triallyloxy ethane, tetraallyloxy ethane, tetraallyloxy propane, tetraallyloxy butane, and tetrametha-allyloxy ethane], a polyalkylene glycol chain-containing vinyl monomer [e.g., polyethylene glycol (molecular weight: 300) mono(meth)acrylate, polypropylene glycol (molecular weight: 500) monoacrylate, (meth)acrylate of a methyl alcohol ethylene oxide (10 mol) adduct, and (meth)acrylate of a lauryl alcohol ethylene oxide (30 mol) adduct], and poly(meth)acrylate [e.g., poly(meth)acrylate of polyvalent alcohol, such as ethylene glycol di(meth)acrylate, propylene glycol di(meth)acrylate, neopentyl glycol di(meth)acrylate, trimethylolpropane tri(meth)acrylate, and polyethylene glycol di(meth)acrylate].

Examples of the vinyl (thio) ether include vinyl methyl ether.

Examples of the vinyl ketone include methyl vinyl ketone.

(10) Other Vinyl Monomers

Examples of other vinyl monomers include tetrafluoroethylene, fluoroacrylate, isocyanatoethyl (meth)acrylate, and m-isopropenyl-α,α-dimethylbenzyl isocyanate.

The above-listed vinyl monomers (1) to (10) may be used alone or in combination for synthesis of Resin (b1).

Considering low temperature fixability of a resultant toner, Resin (b1) is preferably a styrene-(meth)acrylic acid ester copolymer and a (meth)acrylic acid ester copolymer, and more preferably a styrene-(meth)acrylic acid ester copolymer.

Since Resin (b1) includes carboxylic acid, an acid value is imparted to the resin, which facilitate formation of toner particles on surfaces of which the resin particles (B) are deposited.

Examples of a vinyl monomer used for the resin (b2) includes vinyl monomers identical to those for the resin (b1).

The above-listed vinyl monomers (1) to (10) for the resin (b1) may be used alone or in combination for synthesis of the resin (b2).

Considering low temperature fixability of a resultant toner, the resin (b2) is preferably a styrene-(meth)acrylic acid ester copolymer and a (meth)acrylic acid ester copolymer, and more preferably a styrene-(meth)acrylic acid ester copolymer.

Among the above-listed examples, the shell and core each preferably include a styrene-acrylic resin. In this case, both heat resistant storage stability and fixability are achieved. As an amount of the resin in the shell and an amount of the resin in the core, each of the shell and the core preferably includes a styrene-acrylic resin in the amount of 50% by mass or greater.

The viscoelastic loss modulus G" of the resin (b1) at 100° C. with the frequency of 1 Hz is preferably from 1.5 MPa through 100 MPa, more preferably from 1.7 MPa through 30 MPa, and even more preferably from 2.0 MPa through 10 MPa.

The viscoelastic loss modulus G" of the resin (b2) at 100° C. with the frequency of 1 Hz is preferably from 0.01 MPa through 1.0 MPa, more preferably from 0.02 MPa through 0.5 MPa, and even more preferably from 0.05 MPa through 0.3 MPa.

When the viscoelastic loss modulus G" is within the above-mentioned range, toner particles on each surface of which the resin particles (B) including, as constitutional components, the resin (b1) and the resin (b2) per particle are deposited are easily formed.

The viscoelastic loss modulus G" of the resins (b1) and (b2) at 100° C. with frequency of 1 Hz can be adjusted by varying monomers for use and a blending ratio thereof, and adjusting polymerization conditions (e.g., an initiator for use and an amount thereof, a chain-transfer agent for use and an amount thereof, and a reaction temperature).

Specifically, for example, G" of each resin can be adjusted to the above-mentioned range by adjusting the composition of the resin as follows.

(1) Tg1 is set to preferably from 0° C. through 150° C., more preferably from 50° C. through 100° C. and Tg2 is set to preferably from −30° C. through 100° C., more preferably from 0° C. through 80° C., and even more preferably from 30° C. through 60° C., where Tg1 is a glass transition temperature of the resin (b1) as calculated from the monomers constituting the resin (b1), and Tg2 is a glass transition temperature of the resin (b2) as calculated from the monomers constituting the resin (b2). Tg1 corresponds to TgA, and Tg2 corresponds to TgB.

The glass transition temperature (Tg) as calculated from the constitutional monomers is a value calculated according to the Fox method.

The Fox method [T. G. Fox, Phys. Rev., 86, 652(1952)] is a method for estimating Tg of a copolymer from Tg of each homopolymer as represented by the following formula.

$$1/Tg=W1/Tg1+W2/Tg2+\ldots+Wn/Tgn$$

[In the formula above, Tg is a glass transition temperature (absolute temperature) of a copolymer, Tg1, Tg2 . . . Tgn are each a glass transition temperature (absolute temperature) of a homopolymer of each monomer component, and W1, W2 . . . Wn are each a weight fraction of each monomer component.]

(2) (AV1) is set to preferably from 75 mgKOH/g through 400 mgKOH/g, and more preferably from 150 mgKOH/g through 300 mgKOH/g, and (AV2) is set to preferably 0 mgKOH/g through 50 mgKOH/g, more preferably from 0 mgKOH/g through 20 mgKOH/g, and even more preferably 0 mgKOH/g, where AV1 is a calculated acid value of the resin (b1), and AV2 is a calculated acid value of the resin (b2).

The calculated acid value is a theoretical acid value calculated from a molar mass of acid groups included in the constitutional monomers, and a total mass of the constitutional monomers.

As a constitutional monomer satisfying the conditions of (1) and (2), for example, the resin (b1) is a resin including, as constitutional monomers, styrene preferably in an amount of from 10% by mass through 80% by mass, and more preferably from 30% by mass through 60% by mass, and methacrylic acid and/or acrylic acid preferably in the combined amount of from 10% by mass through 60% by mass, and more preferably from 30% by mass through 50% by mass, relative to a total mass of the resin (b1).

Moreover, the resin (b2) is, for example, a resin including, as constitutional monomers, styrene preferably in an amount of from 10% by mass through 100% by mass, and more preferably from 30% by mass through 90% by mass, and methacrylic acid and/or acrylic acid preferably in the combined amount of from 0% by mass through 7.5% by mass, and more preferably from 0% by mass through 2.5% by mass, relative to a total mass of the resin (b2).

(3) Polymerization conditions (e.g., an initiator for use and an amount thereof, a chain-transfer agent for use and an amount thereof, and a reaction temperature) are adjusted. Specifically, as the number average molecular weight (Mn1) of the resin (b1) and the number average molecular weight (Mn2) of the resin (b2), (Mn1) is set to preferably from 2,000 through 2,000,000, and more preferably from 20,000 through 200,000, and (Mn2) is set to preferably from 1,000 through 1,000,000, and more preferably from 10,000 through 100,000.

In the present disclosure, viscoelastic loss modulus G" is measured, for example, by means of the following rheometer.

Device: ARES-24A (available from Rheometric Scientific)

Jig: 25 mm parallel plate

Frequency: 1 Hz

Distortion factor: 10%

Heating rate: 5° C./min

The acid value (AVb1) of the resin (b1) is preferably from 75 mgKOH/g through 400 mgKOH/g, and more preferably from 150 mgKOH/g through 300 mgKOH/g.

When the acid value is within the above-mentioned range, toner particles on each surface of which the resin particles (B) are deposited are easily formed, where each resin particle (B) includes, as constitutional components, a vinyl-based unit of the resin (b1) and a vinyl-based unit of the resin (b2) per particle.

The resin (b1) having the acid value in the above-mentioned range is a resin including methacrylic acid and/or acrylic acid preferably in the combined amount of from 10% by mass through 60% by mass, and more preferably from 30% by mass through 50% by mass, relative to a total mass of the resin (b1).

The acid value (AVb2) of the resin (b2) is preferably from 0 mgKOH/g through 50 mgKOH/g, more preferably from 0 mgKOH/g through 20 mgKOH/g, and even more preferably 0 mgKOH/g, considering low temperature fixability.

The resin (b2) having the acid value within the above-mentioned range is a resin including methacrylic acid and/or acrylic acid preferably in the amount of from 0% by mass through 7.5% by mass, and more preferably from 0% by mass through 2.5% by mass, relative to a total mass of the resin (b2).

In the present disclosure, the acid value is measured by a method according to JIS K0070:1992.

In the present disclosure, the glass transition temperature TgA of the shell (resin b1) is higher than the glass transition temperature TgB of the core (resin b2). Since the glass transition temperature TgA of the shell is higher than the glass transition temperature TgB of the core, high heat resistant storage stability can be secured.

Examples of a method for adjusting the glass transition temperature TgA of the shells of the resin particles higher than the glass transition temperature TgB of the cores of the resin particles include a method where monomers used for synthesizing shells are selected or a blending ratio of the monomer is adjusted.

The glass transition temperature TgA of the shells of the resin particles and the glass transition temperature TgB of the cores of the resin particles preferably satisfy TgA-TgB≥10[° C.], more preferably TgA-TgB≥20[° C.]. Since the difference between TgA and TgB is 10° C. or greater, an excellent balance between easiness of deposition of the resin particles (B) on surfaces of the toner base particles, and low temperature fixability of the toner of the present disclosure is achieved.

Examples of a method for adjusting the difference between the glass transition temperatures to the above-mentioned range include a method where monomers used for synthesizing the shells and cores are selected, or a blending ratio of the monomers is adjusted.

In the present disclosure, Tg is measured by means of DSC60-A (available from Shimadzu Corporation) according to the method (DSC) specified in ASTM D3418-82.

As a method for measuring the glass transition temperature TgA of the shells of the resin particles and the glass transition temperature TgB of the cores of the resin particles from the toner, the measurement may be performed in the following manner.

For example, the shells are removed using an organic solvent, or by heating to separate and collect only the cores, and a glass transition temperature of the cores is measured according to a method (DSC) specified in ASTM D3418-82.

The glass transition temperature TgA of the resin (b1) is preferably from 0° C. through 150° C., and more preferably from 50° C. through 100° C. When the glass transition temperature TgA of the resin (b1) is 0° C. or higher, improved heat resistant storage stability is obtained. When the glass transition temperature TgA of the resin (b1) is 150° C. or lower, low temperature fixability is not impaired.

The glass transition temperature TgB of the resin (b2) is preferably from −30° C. through 100° C., more preferably 0° C. through 80° C., and even more preferably from 30° C. through 60° C. When the glass transition temperature TgB of the resin (b2) is −30° C. or higher, improved heat resistant storage stability is obtained. When the glass transition temperature TgB of the resin (b2) is 100° C. or lower, low temperature fixability is not impaired.

The glass transition temperature Tg of the resin particles is preferably 40° C. or higher but 70° C. or lower. When the glass transition temperature Tg of the resin particles is within the above-mentioned range, high heat resistant storage stability can be secured without impairing fixability. Examples of a method for adjusting the glass transition temperature Tg of the resin particles to the above-mentioned range include a method for appropriately adjusting glass transition temperatures of the shells and the cores.

The glass transition temperature Tg of the resin particles is measured from the toner in the following manner. After physically releasing the resin particles from the surfaces of the toner base particles, or separating the resin particles using an organic solvent, followed by removing the organic solvent, the glass transition temperature Tg of the resin particles is calculated according to the above-described method.

The solubility parameter (may be abbreviated as an SP value hereinafter) of the resin (b1) is preferably from 9 $(cal/cm^3)^{1/2}$ through 13 $(cal/cm^3)^{1/2}$, more preferably from 9.5 $(cal/cm^3)^{1/2}$ through 12.5 $(cal/cm^3)^{1/2}$, and even more preferably from 10.5 $(cal/cm^3)^{1/2}$ through 11.5 $(cal/cm^3)^{1/2}$, considering easiness of formation of toner particles.

The SP value of the resin (b1) can be adjusted by changing monomers used to constitute the resin (b1) and a composition ratio thereof.

The SP value of the resin (b2) is preferably from 8.5 $(cal/cm^3)^{1/2}$ through 12.5 $(cal/cm^3)^{1/2}$, more preferably from 9 $(cal/cm^3)^{1/2}$ through 12 $(cal/cm^3)^{1/2}$, and even more preferably from 10 $(cal/cm^3)^{1/2}$ through 11 $(cal/cm^3)^{1/2}$, considering easiness of formation of toner particles.

The SP value of the resin (b2) can be adjusted by changing monomers used to constitute the resin (b2) and a composition ratio thereof.

In the present disclosure, the SP value can be calculated by the method of Fedors [Polym. Eng. Sci. 14(2)152, (1974)].

Considering TgA of the resin (b1) and copolymerizability with other monomers, the resin (b1) includes, as a constitutional monomer, styrene preferably in an amount of from 10% by mass through 80% by mass, and more preferably from 30% by mass through 60% by mass, relative to total mass of the resin (b1).

Considering TgB of the resin (b2) and copolymerizability with other monomers, the resin (b2) includes, as a constitutional monomer, styrene preferably in an amount of from 10% by mass through 100% by mass, and more preferably from 30% by mass through 90% by mass, relative to total mass of the resin (b2).

The number average molecular weight (Mn) of the resin (b1) is preferably from 2,000 through 2,000,000, and more preferably from 20,000 through 200,000. When the number average molecular weight of the resin (b1) is 2,000 or greater, improved heat resistant storage stability is obtained. When the number average molecular weight of the resin (b1) is 2,000,000 or less, low temperature fixability of a toner is not impaired.

The weight average molecular weight (Mw) of the resin (b1) is preferably greater than the weight average molecular weight of the resin (b2), more preferably greater than the weight average molecular weight of the resin (b2) by 1.5 times or greater, and even more preferably greater than the weight average molecular weight of the resin (b2) by 2.0 times or greater. When the weight average molecular weight of the resin (b1) is within the above-mentioned range, excellent balance between easiness of formation of toner particles and low temperature fixability is achieved.

The weight average molecular weight (Mw) of the resin (b1) is preferably from 20,000 through 20,000,000, and is more preferably from 200,000 through 2,000,000. When the weight average molecular weight of the resin (b1) is 20,000 or greater, improved heat resistant storage stability is obtained. When the weight average molecular weight of the resin (b1) is 20,000,000 or less, low temperature fixability is not impaired.

The number average molecular weight (Mn) of the resin (b2) is preferably from 1,000 through 1,000,000, and more preferably from 10,000 through 100,000. When the number average molecular weight (Mn) of the resin (b2) is 1,000 or greater, improved heat resistant storage stability of a toner is obtained. When the number average molecular weight (Mn) of the resin (b2) is 1,000,000 or less, low temperature fixability of a toner is not impaired.

The weight average molecular weight (Mw) of the resin (b2) is preferably from 10,000 through 10,000,000, and more preferably from 100,000 through 1,000,000. When the weight average molecular weight (Mw) of the resin (b2) is 10,000 or greater, improved heat resistant storage stability of a toner is obtained. When the weight average molecular weight (Mw) of the resin (b2) is 10,000,000 or less, low temperature fixability of a toner is not impaired.

Among the above-described molecular weights, Mw of the resin (b1) is preferably from 200,000 through 2,000,000, Mw of the resin (b2) is preferably from 100,000 through 500,000, and Mw of the resin (b1) and Mw of the resin (b2) preferably satisfy [Mw of (b1)]>[Mw of (b2)].

In the present disclosure, Mn and Mw can be measured by gel permeation chromatography (GPC) under the following conditions.

Device (one example): HLC-8120, available from Tosoh Corporation

Columns (one example): 2 columns, TSK GEL GMH6, available from

Tosoh Corporation

Measuring temperature: 40° C.

Sample solution: 0.25% by weight tetrahydrofuran solution (from which an insoluble component is separated through filtration with a glass filter)

Solution injection amount: 100 μL

Detection device: refractive index detector

Reference materials: 12 samples of standard polystyrene (TSKstandard POLYSTYRENE) (molecular weights: 500, 1,050, 2,800, 5,970, 9,100, 18,100, 37,900, 96,400, 190,000, 355,000, 1,090,000, and 2,890,000) [available from Tosoh Corporation]

The mass ratio of the resin (b1) and the resin (b2) in the resin particles is preferably from 5/95 through 95/5, more preferably from 25/75 through 75/25, and even more preferably from 40/60 through 60/40. When the mass ratio of the resin (b1) and the resin (b2) in the resin particles (B) is 5/95 or greater, excellent heat resistant storage stability of a resultant toner is obtained. When the mass ratio of the resin (b1) and the resin (b2) in the resin particles particle (B) is 95/5 or less, toner particles on each surface of which the resin particles (B) are deposited are easily formed.

Examples of a production method of the resin particles (B) include production methods known in the art. Examples thereof include the following production methods (I) to (V).

(I) A method where constitutional monomers of the resin (b2) are polymerized through seeded polymerization using particles of the resin (b1) in an aqueous dispersion liquid as seeds.

(II) A method where constitutional monomers of the resin (b1) are polymerized through seeded polymerization using particles of the resin (b2) in an aqueous dispersion liquid as seeds.

(III) A method where a mixture of the resin (b1) and the resin (b2) is emulsified with an aqueous medium to obtain an aqueous dispersion liquid of resin particles.

(IV) A method where a mixture of the resin (b1) and constitutional monomers of the resin (b2) is emulsified with an aqueous medium, followed by polymerizing the constitutional monomers of the resin (b2), to obtain an aqueous dispersion liquid of resin particles.

(V) A method where a mixture of the resin (b2) and constitutional monomers of the resin (b1) is emulsified with an aqueous medium, followed by polymerizing the constitutional monomers of the resin (b1), to obtain an aqueous dispersion liquid of resin particles.

Whether or not the resin particles (B) each include, as constitutional components, the shell resin (b1) and the core resin (b2) per particle can be confirmed by observing an element mapping image of a cross-sectional surfaces of the resin particles (B) under a known surface elemental analysis device (e.g., TOF-SIMSEDX-SEM), or observing cross-sectional surfaces of the resin particles (B) dyed with a dye that can be used for functional groups included in the resin (b1) and the resin (b2) under an electron microscope.

The resin particles obtained by the above-described method may be a mixture of the resin particles (B) each including, as constitutional components, the resin (b1) and the resin (b2) per particle, resin particles each including only the resin (b1) as a constitutional resin component, and resin particles each including only the resin (b2) as a constitutional resin component. In the below-mentioned composite step, the resin particles may be used as the mixture, or only the resin particles (B) may be separated and used.

Specific examples of (I) include: a method where constitutional monomers of (b1) are dripped and polymerized to produce an aqueous dispersion liquid of resin particles including (b1), followed by seeded polymerizing constitutional monomers of (b2) using the resin particles including (b1) as seeds; and a method where (b1), which is produced in advance by solution polymerization etc., is emulsified and dispersed in water, followed by seeded polymerizing constitutional monomers of (b2) using (b1) as seeds.

Specific examples of (II) include: a method where constitutional monomers of (b2) are dripped and polymerized to produce an aqueous dispersion liquid of resin particles, followed by polymerizing constitutional monomers of (b1) using the resin particles as seeds; and a method where (b2), which is produced in advance by solution polymerization etc., is emulsified and dispersed in water, followed by seeded polymerizing constitutional monomers of (b1) using (b2) as seeds.

Specific examples of (III) include a method where solutions or melts of (b1) and (b2), which are produced in advance by solution polymerization, followed by emulsifying and dispersing the resultant into an aqueous medium.

Specific examples of (IV) include: a method where (b1), which is produced in advance by solution polymerization etc., and constitutional monomers of (b2) are mixed, and the resultant mixture is emulsified and dispersed in an aqueous medium, followed by polymerizing the constitutional monomers of (b2); and a method where (b) is produced in constitutional monomers of (b2), and the resultant mixture is emulsified and dispersed in an aqueous medium, followed by polymerizing the constitutional monomers of (b2).

Specific examples of (V) include: a method where (b2), which is produced in advance by solution polymerization etc., is mixed with constitutional monomers of (b1), and the resultant mixture is emulsified and dispersed in an aqueous medium, followed by polymerizing the constitutional monomers of (b1); and a method where (b2) is produced in constitutional monomers of (b1), and the resultant mixture is emulsified and dispersed in an aqueous medium, followed by polymerizing the constitutional monomers of (b1).

In the present disclosure, any of the production methods (I) to (V) is suitably used.

The resin particles (B) are preferably used as an aqueous dispersion liquid.

Materials (aqueous media) used in the aqueous dispersion liquid are not particularly limited as long as the materials are materials soluble to water, and may be appropriately selected depending on the intended purpose. Examples thereof include a surfactant (D), buffering agent, and protective colloid. The above-listed examples may be used alone or in combination.

An aqueous medium used in the aqueous dispersion liquid is not particularly limited as long as the aqueous medium is a fluid including water as an essential component. Examples thereof include an aqueous solution including water.

Examples of the surfactant (D) include a nonionic surfactant (D1), an anionic surfactant (D2), a cationic surfactant (D3), an amphoteric surfactant (D4), and other emulsification dispersants (D5).

Examples of the nonionic surfactant (D1) include an alkylene oxide (AO) adduct-based nonionic surfactant, and a polyvalent alcohol-based nonionic surfactant.

Examples of the AO adduct-based nonionic surfactant include a C10-20 aliphatic alcohol EO adduct, a phenol EO adduct, a nonylphenol ethylene oxide (EO) adduct, a C8-22 alkylamine EO adduct, and a poly(oxypropylene)glycol EO adduct.

Examples of the polyvalent alcohol-based nonionic surfactant include C8-24 fatty acid esters of trivalent to octavalent or higher polyvalent C2-30 alcohol (e.g., glycerol monostearate, glyceryl monooleate, sorbitan monolaurate, and sorbitan monooleate), and C4-24 alkyl polyglycoside (degree of polymerization: from 1 through 10).

Examples of the anionic surfactant (D2) include C8-24 hydrocarbon group-containing ether carboxylic acid or salts thereof, C8-24 hydrocarbon group-containing sulfuric acid ester or ether sulfuric acid ester, or salts thereof, C8-24 hydrocarbon group-containing sulfonic acid salt, sulfosuccinic acid salt containing one or two C8-24 hydrocarbon groups, C8-24 hydrocarbon group-containing phosphoric acid ester, or ether phosphoric acid ester, or salts thereof, C8-24 hydrocarbon group-containing fatty acid salt, and C8-24 hydrocarbon group-containing acylated amino acid salt.

Examples of the C8-24 hydrocarbon group-containing ether carboxylic acid or salts thereof include sodium lauryl ether acetate, and sodium (poly)oxyethylene (the number of moles added: from 1 through 100) lauryl ether acetate.

Examples of the C8-24 hydrocarbon group-containing sulfuric acid ester or ether sulfuric acid ester, or salts thereof include sodium lauryl sulfate, sodium (poly)oxyethylene (the number of moles added: from 1 through 100) lauryl sulfate, triethanolamine (poly)oxyethylene (the number of moles added: from 1 through 100) lauryl ether sulfate, and (poly)oxyethylene (the number of moles added: from 1 through 100) coconut fatty acid monoethanolamide sodium sulfate.

Examples of the C8-24 hydrocarbon group-containing sulfonic acid salt include sodium dodecylbenzene sulfonate.

Examples of the C8-24 hydrocarbon group-containing phosphoric acid ester, or ether phosphoric acid ester, or salts thereof include sodium lauryl phosphate, and sodium (poly) oxyethylene(the number of moles added: from 1 through 100) lauryl ether phosphate.

Examples of the C8-24 hydrocarbon group-containing fatty acid salt include sodium laurate, and triethanolamine laurate.

Examples of the C8-24 hydrocarbon group-containing acylated amino acid salt include sodium methyl cocoyl taurate, sodium cocoyl sarcosinate, triethanolamine cocoyl sarcosinate, triethanolamine N-cocoyl-L-glutamate, sodium N-cocoyl-L-glutamate, and laurylmethyl-8-alanine sodium salt.

Examples of the cationic surfactant (D3) include a quaternary ammonium salt-based cationic surfactant, and an amine salt-based cationic surfactant.

Examples of the quaternary ammonium salt-based cationic surfactant include trimethylstearylammonium chloride, trimethylbehenylammonium chloride, dimethylstearylammonium chloride, and N-(N'-lanolin fatty acid amide propyl) N-ethyl-N,N-dimethyl ammonium ethyl sulfate (i.e. Quaterinium-33).

Examples of the amine salt-based cationic surfactant include stearic acid diethylaminoethylamide lactic acid salt, dilaurylamine hydrochloride, and oleylamine lactate.

Examples of the amphoteric surfactant (D4) include a betaine-based amphoteric surfactant, and an amino acid-based amphoteric surfactant.

Examples of the betaine-based amphoteric surfactant include coconut oil fatty acid amidepropyldimethylaminoacetic acid betaine, lauryl dimethylaminoaetic acid betaine, 2-alkyl-N-carboxymethyl-N-hydroxyethylimidazolium betaine, and lauryl hydroxysulfobetaine.

Examples of the amino acid-based amphoteric surfactant include sodium β-laurylaminopropionate.

Examples of other emulsification dispersants (D5) include a reactive activator.

The reactive activator is not particularly limited as long as the reactive activator has radical reactivity, and may be appropriately selected depending on the intended purpose. Examples thereof include: ADEKA REASOAP (registered trademark)SE-10N, SR-10, SR-20, SR-30, ER-20, and ER-30 (all available from ADEKA CORPORATION); HITENOL (registered trademark), HS-10, KH-05, KH-10, and KH-1025 (all available from DKS Co., Ltd.); ELEMINOL (registered trademark) JS-20 (available from SANYO CHEMICAL, LTD.); LATEMUL (registered trademark) D-104, PD-420, and PD-430 (available from Kao Corporation); IONET (registered trademark) MO-200 (available from SANYO CHEMICAL, LTD.); polyvinyl alcohol; starch and derivatives thereof cellulose derivatives, such as carboxymethyl cellulose, methyl cellulose, and hydroxyethyl cellulose; carboxyl group-containing (co)polymer, such as polyacrylic acid soda; and urethane group or ester group-containing emulsification dispersants (e.g., a compound obtained by linking polycaptolactone polyol and polyether diol with polyisocyanate) disclosed in U.S. Pat. No. 5,906,704.

In order to stabilize oil droplets to obtain desired shapes, and to make a particle size distribution sharp during emulsification and dispersion, the surfactant (D) is preferably (D1), (D2), (D5), or a combination thereof, and a combination of (D1) and (D5) or a combination of (D2) and (D5) is more preferable.

Examples of the buffering agent include sodium acetate, sodium citrate, and sodium bicarbonate.

Examples of the protective colloid include a water-soluble cellulose compound, and an alkali metal salt of polymethacrylic acid.

The resin particles (B) may each include other resin components, an initiator (a residue thereof), a chain-transfer agent, an antioxidant, a plasticizer, a preservative, a reducing agent, and an organic solvent, in addition to the shell resin (b1) and the core resin (b2).

Examples of the above-mentioned other resin components include a vinyl resin excluding the resin used for the shell resin (b1) and the core resin (b2), a polyurethane resin, an epoxy resin, a polyester resin, a polyamide resin, a polyimide resin, a silicon-based resin, a phenol resin, a melamine resin, a urea resin, an aniline resin, an ionomer resin, and a polycarbonate resin.

Examples of the initiator (a residue thereof) include radical polymerization initiators known in the art. Specific examples thereof include: a persulfuric acid salt initiator, such as potassium persulfate, and ammonium persulfate; an azo initiator, such as azobisisobutyronitrile; organic peroxide, such as benzoyl peroxide, cumene hydroperoxide, tert-butyl hydroperoxide, tert-butyl peroxyisopropyl monocarbonate, and tert-butyl peroxybenzoate; and hydrogen peroxide.

Examples of the chain-transfer agent include n-dodecylmercaptan, tert-dodecylmercaptan, n-butylmercaptan, 2-ethylhexyl thioglycolate, 2-mercaptoethanol, β-mercaptopropionic acid, and α-methylstyrene dimer.

Examples of the antioxidant include a phenol compound, para-phenylenediamine, hydroquinone, an organic sulfur compound, and an organophosphorus compound.

Examples of the phenol compound include 2,6-di-t-butyl-p-cresol, butylated hydroxyanisole, 2,6-di-t-butyl-4-ethylphenol, stearyl-β-(3,5-di-t-butyl-4-hydroxyphenyl)propionate, 2,2'-methylene-bis-(4-methyl-6-t-butylphenol), 2,2'-methylene-bis-(4-ethyl-6-t-butylphenol), 4,4'-thiobis-(3-methyl-6-t-butylphenol), 4,4'-butylidenebis-(3-methyl-6-t-butylphenol), 1,1,3-tris-(2-methyl-4-hydroxy-5-t-butylphenyl)butane, 1,3,5-trimethyl-2,4,6-tris-(3,5-di-t-butyl-4-hydroxybenzyl)benzene, tetrakis-[methylene-3-(3',5'-di-t-butyl-4'-hydroxyphenyl)propionate]methane, bis[3,3'-bis(4'-hydroxy-3'-t-butylphenyl)butyric acid]glycol ester, and tocopherol.

Examples of the para-phenylenediamine include N-phenyl-N'-isopropyl-p-phenylenediamine, N,N'-di-sec-butyl-p-phenylenediamine, N-phenyl-N-sec-butyl-p-phenylenediamine, N,N'-di-isopropyl-p-phenylenediamine, and N,N'-dimethyl-N,N'-di-t-butyl-p-phenylenediamine.

Examples of the hydroquinone include 2,5-di-t-octylhydroquinone, 2,6-didodecylhydroquinone, 2-dodecylhydroquinone, 2-dodecyl-5-chlorohydroquinone, 2-t-octyl-5-methylhydroquinone, and 2-(2-octadecenyl)-5-methylhydroquinone.

Examples of the organic sulfur compound include dilauryl-3,3'-thiodipropionate, distearyl-3,3'-thiodipropionate, and ditetradecyl-3,3'-thiodipropionate.

Examples of the organophosphorus compound include triphenylphosphine, tri(nonylphenyl)phosphine, tri(dinonylphenyl)phosphine, tricresyl phosphate, and tri(2,4-dibutylphenoxy)phosphine.

Examples of the plasticizer include phthalic acid ester, aliphatic diprotic acid ester, trimellitic acid ester, phosphoric acid ester, and fatty acid ester.

Examples of the phthalic acid ester include dibutyl phthalate, dioctyl phthalate, butylbenzyl phthalate, and isodecyl phthalate.

Examples of the aliphatic diprotic acid ester include di-2-ethylhexyl adipate, and 2-ethylhexyl sebacate.

Examples of the trimellitic acid ester include tri-2-ethylhexyl trimellitate, and trioctyl trimellitate.

Examples of the phosphoric acid ester include triethyl phosphate, tri-2-ethylhexyl phosphate, and tricresyl phosphate.

Examples of the fatty acid ester include butyl oleate.

Examples of the preservative include an organic nitrogen sulfur compound preservative, and an organic sulfur halogenated compound preservative.

Examples of the reducing agent include: a reducing organic compound, such as ascorbic acid, tartaric acid, citric acid, glucose, and formaldehyde sulfoxylate metal salt; and a reducing inorganic compound, such as sodium thio sulfate, sodium sulfite, sodium bisulfite, and sodium metabisulfite.

Examples of the organic solvent include: a ketone solvent, such as acetone, and methyl ethyl ketone (may be abbreviated as MEK hereinafter); an ester solvent, such as ethyl acetate, and γ-butyrolactone; an ether solvent, such as tetrahydrofuran (THF); an amide solvent, such as N,N-dimethylformamide, N,N-dimethylacetamide, N-methyl-2-pyrrolidone, and N-methylcaprolactam; an alcohol solvent, such as isopropyl alcohol: and an aromatic hydrocarbon solvent, such as toluene, and xylene.

An amount of the resin particles is preferably from 0.2% by mass through 5% by mass relative to the toner. When the sum of the resin (b1) and the resin (b2) is within the above-mentioned range, favorable low temperature fixability and heat resistant storage stability are obtained. When the amount of the resin particles is 0.2% by mass or greater relative to the toner, a problem that heat resistant storage stability is impaired can be prevented. When the amount thereof is 5% by mass or less, a problem that low temperature fixability is impaired can be prevented.

<Toner Base Particles>

The toner base particles (may be referred to as "toner bases" or "base particles" hereinafter) each include a binder resin, a colorant, and wax. Each of the toner base particles may further include other components according to the necessity.

<<Binder Resin>>

The binder resin is not particularly limited, and may be appropriately selected depending on the intended purpose. Examples of the binder resin include a polyester resin, a styrene-acrylic resin, a polyol resin, a vinyl resin, a polyurethane resin, an epoxy resin, a polyamide resin, a polyimide resin, a silicon-based resin, a phenol resin, a melamine resin, a urea resin, an aniline resin, an ionomer resin, and a polycarbonate resin. The above-listed examples may be used alone or in combination. Among the above-listed examples, a polyester resin is preferable because the polyester resin can impart flexibility to a toner.

<<<Polyester Resin>>>

The polyester resin is not particularly limited, and may be appropriately selected depending on the intended purpose. Examples of the polyester resin include a crystalline polyester resin, a noncrystalline polyester resin, and a modified polyester resin. The above-listed examples may be used alone or in combination.

—Noncrystalline Polyester Resin—

The noncrystalline polyester resin (may be referred to as a "noncrystalline polyester," "amorphous polyester," "amorphous polyester resin," "unmodified polyester resin," or "polyester resin component A" hereinafter) is not particularly limited, and may be appropriately selected depending on the intended purpose. Examples of the noncrystalline polyester resin include a noncrystalline polyester resin obtained through a reaction between polyol and polycarboxylic acid.

In the present disclosure, the noncrystalline polyester resin is a resin obtained through a reaction between polyol and polycarboxylic acid as described above. In the present disclosure, a polyester resin, which is modified, such as a below-described prepolymer, and a modified polyester resin obtained through a crosslinking and/or elongation reaction of the prepolymer, is not regarded as the noncrystalline polyester resin, but is regarded as a modified polyester resin.

The noncrystalline polyester is a polyester resin component soluble to tetrahydrofuran (THF).

The noncrystalline polyester (polyester resin component A) is preferably a linear polyester resin.

Examples of the Polyol Include Diol.

Examples of the diol include: alkylene (the number of carbon atoms: from 2 through 3) oxide adduct (the average number of moles added: from 1 through 10) of bisphenol A, such as polyoxypropylene(2.2)-2,2-bis(4-hydroxyphenyl) propane, and polyoxyethylene(2.2)-2,2-bis(4-hydroxyphenyl)propane; ethylene glycol; propylene glycol; hydrogenated bisphenol A: and alkylene (the number of carbon atoms: from 2 through 3) oxide adduct (the average number of moles added: from 1 through 10) of hydrogenated bisphenol A. The above-listed examples may be used alone or in combination.

Among the above-listed examples, preferred is the polyol including alkylene glycol in the amount of 40 mol % or greater.

Examples of the polycarboxylic acid include dicarboxylic acid.

Examples of the dicarboxylic acid include: adipic acid, phthalic acid, isophthalic acid, terephthalic acid, fumaric acid, maleic acid, and succinic acid substituted with a C1-20 alkyl group (e.g., dodecenylsuccinic acid, and octylsuccinic acid), and succinic acid substituted with a C2-20 alkenyl group. The above-listed examples may be used alone or in combination. Among the above-listed examples, preferred is the polycarboxylic acid including terephthalic acid in an amount of 50 mol % or greater.

For the purpose of adjusting an acid value and a hydroxyl value, the polyester resin component A may include trivalent or higher carboxylic acid and/or trivalent or higher alcohol, or a trivalent or higher epoxy compound at terminals of the molecular chain of the polyester resin component A.

Among the above-listed examples, the polyester resin component A preferably includes trivalent or higher aliphatic alcohol in order to obtain sufficient glossiness and image density without unevenness.

Examples of the trivalent or higher carboxylic acid include trimellitic acid, pyromellitic acid, and anhydrides thereof.

Examples of the trivalent or higher alcohol include glycerin, pentaerythritol, and trimethylolpropane.

A molecular weight of the polyester resin component A is not particularly limited, and may be appropriately selected depending on the intended purpose. The molecular weight of the polyester resin component A is preferably within the following ranges.

The weight average molecular weight (Mw) of the polyester resin component A is preferably from 3,000 through 10,000, and more preferably from 4,000 through 7,000.

The number average molecular weight (Mn) of the polyester resin component A is preferably from 1,000 through 4,000, and more preferably from 1,500 through 3,000.

A molecular weight ratio (Mw/Mn) of the polyester resin component A is preferably from 1.0 through 4.0, and more preferably from 1.0 through 3.5.

For example, the weight average molecular weight and number average molecular weight can be measured by gel permeation chromatography (GPC).

The reasons why the above-mentioned ranges of the weight average molecular weight and number average molecular weight are preferable are as follows. When the weight average molecular weight and number average molecular weight are too small, heat resistant storage stability of a resultant toner may be poor, and durability of a toner against stress, such as by stirring, inside a developing device may be impaired. When the weight average molecular weight and number average molecular weight are too large, viscoelasticity of a resultant toner as melted may increase to impair low temperature fixability. When the amount of the component having the molecular weight of 600 or less is too large, heat resistant storage stability of a resultant toner may be poor, and durability of a toner against stress, such as by stirring, inside a developing device may be impaired. When the amount of the component having the molecular weight of 600 or less is too small, low temperature fixability may be impaired.

An amount of the THF soluble component having a molecular weight of 600 or less is preferably from 2% by mass through 10% by mass.

A method for adjusting the amount of the THF soluble component having a molecular weight of 600 or less is, for example, a method where polyester resin component A is extracted with methanol, and the extracted component is purified by removing the component having a molecular weight of 600 or less.

The acid value of the polyester resin component A is not particularly limited and may be appropriately selected depending on the intended purpose. The acid value thereof is preferably from 1 mgKOH/g through 50 mgKOH/g, and more preferably from 5 mgKOH/g through 30 mgKOH/g. When the acid value of the polyester resin component A is 1 mgKOH/g or greater, a toner tends to be negatively charged, and affinity between paper and the toner increases during fixing on the paper to thereby improve low temperature fixability. When the acid value thereof is 50 mgKOH/g or less, a problem associated with charging stability, particularly reduction in charging stability due to fluctuations of environmental conditions, can be prevented.

A hydroxyl value of the polyester resin component A is not particularly limited, and may be appropriately selected depending on the intended purpose. The hydroxyl value of the polyester resin component A is preferably 5 mgKOH/g or greater.

The glass transition temperature (Tg) of the polyester resin component A is preferably from 40° C. through 65° C., more preferably from 45° C. through 65° C., and even more preferably from 50° C. through 60° C. When Tg of the polyester resin component A is 40° C. or higher, heat resistant storage stability of a resultant toner, and durability of the toner against stress, such as by stirring, inside a developing device are improved, and moreover filming resistance is improved. When Tg of the polyester resin component A is 65° C. or lower, a resultant toner is desirably deformed by heat and pressure applied during fixing to thereby improve low temperature fixability.

An amount of the polyester resin component A is preferably from 80 parts by mass through 90 parts by mass, relative to 100 parts by mass of the toner.

—Modified Polyester Resin—

The modified polyester resin (may be referred to as "modified polyester" or "polyester resin component C") is not particularly limited and may be appropriately selected depending on the intended purpose. Examples thereof include a reaction product obtained through a reaction between an active hydrogen group-containing compound and a polyester resin having a site reactive with the active hydrogen group-containing compound (may be referred to as a "prepolymer" or "polyester prepolymer" in the present disclosure).

The modified polyester is a polyester resin insoluble to tetrahydrofuran (THF). The tetrahydrofuran (THF)-insoluble polyester resin component reduces Tg or melt viscosity of a resultant toner, and has a branched structure in a molecular skeleton thereof and a molecular chain thereof forms a three-dimensional network structure. Therefore, the TH F-insoluble polyester resin component imparts rubber-like characteristics that a toner deforms at a low temperature but does not flow, while maintaining low temperature fixability.

The polyester resin component C includes an active hydrogen group-containing compound, and sites reactive with the active hydrogen group-containing compound. Therefore, the sites act as pseudo-crosslink points, to enhance rubber-like characteristics of the noncrystalline polyester resin A. As a result, a toner having excellent heat resistant storage stability, and hot offset resistance can be produced.

——Active Hydrogen Group-Containing Compound——

The active hydrogen group-containing compound is a compound that reacts with a polyester resin having a site reactive with the active hydrogen group-containing compound.

The active hydrogen group is not particularly limited and may be appropriately selected depending on the intended purpose. Examples thereof include a hydroxyl group (e.g., an alcoholic hydroxyl group and a phenolic hydroxyl group), an amino group, a carboxyl group, and a mercapto group. The above-listed examples may be used alone or in combination.

The active hydrogen group-containing compound is not particularly limited and may be appropriately selected depending on the intended purpose. When the polyester resin having a site reactive with the active hydrogen group-containing compound is a polyester resin including an isocyanate group, the active hydrogen group-containing compound is preferably amines because a high molecular weight of the polyester resin can be obtained through an elongation reaction or a cross-linking reaction with the polyester resin.

The amines are not particularly limited and may be appropriately selected depending on the intended purpose. Examples of the amines include diamine, trivalent or higher amine, amino alcohol, aminomercaptan, amino acid, and products obtained by blocking an amino group of the above-listed amines. The above-listed examples may be used alone or in combination.

Among the above-listed examples, diamine, and a mixture of diamine and a small amount of trivalent or higher amine are preferable.

The diamine is not particularly limited, and may be appropriately selected depending on the intended purpose. Examples of the diamine include aromatic diamine, alicyclic diamine, and aliphatic diamine.

The aromatic diamine is not particularly limited, and may be appropriately selected depending on the intended purpose. Examples of the aromatic diamine include phenylenediamine, diethyltoluenediamine, and 4,4'-diaminodiphenylmethane.

The alicyclic diamine is not particularly limited, and may be appropriately selected depending on the intended purpose. Examples of the alicyclic diamine include 4,4'-diamino-3,3'-dimethyldicyclohexylmethane, diaminocyclohexane, and isophoronediamine.

The aliphatic diamine is not particularly limited, and may be appropriately selected depending on the intended purpose. Examples of the aliphatic diamine include ethylene diamine, tetramethylene diamine, and hexamethylene diamine.

The trivalent or higher amine is not particularly limited, and may be appropriately selected depending on the intended purpose. Examples thereof include diethylenetriamine, and triethylenetetramine.

The aminoalcohol is not particularly limited, and may be appropriately selected depending on the intended purpose. Examples of the aminoalcohol include ethanolamine, and hydroxyethylaniline.

The aminomercaptan is not particularly limited, and may be appropriately selected depending on the intended purpose. Examples of the aminomercaptan include aminoethylmercaptan, and aminopropylmercaptan.

The amino acid is not particularly limited, and may be appropriately selected depending on the intended purpose. Examples of the amino acid include aminopropionic acid, and aminocaproic acid.

The products obtained by blocking the amino group are not particularly limited and may be appropriately selected depending on the intended purpose. Examples of the products obtained by blocking the amino group include ketimine compounds and oxazolidine compounds each obtained by blocking the amino group with ketones, such as acetone, methyl ethyl ketone, and methyl isobutyl ketone.

——Polyester Resin Having Site Reactive with Active Hydrogen Group-Containing Compound——

The polyester resin having a site reactive with the active hydrogen group-containing compound is not particularly limited and may be appropriately selected depending on the intended purpose. Examples thereof include an isocyanate group-containing polyester resin (may be referred to as an "isocyanate group-containing polyester prepolymer" hereinafter).

The isocyanate group-containing polyester resin is not particularly limited and may be appropriately selected depending on the intended purpose. Examples thereof include a reaction product between polyisocyanate and an active hydrogen group-containing polyester resin obtained through polycondensation between polyol and polycarboxylic acid.

The polyol is not particularly limited and may be appropriately selected depending on the intended purpose. Examples thereof include diol, trivalent or higher alcohol, and a mixture including diol and trivalent or higher alcohol.

The above-listed examples may be used alone or in combination.

Among the above-listed examples, diol and a mixture including diol and a small amount of trivalent or higher alcohol are preferable.

The diol is not particularly limited, and may be appropriately selected depending on the intended purpose. Examples of the diol include chain alkylene glycol, oxyalkylene group-containing diol, alicyclic diol, bisphenols, alkylene oxide adducts of alicyclic diol, and alkylene oxide adducts of bisphenols.

Examples of the chain alkylene glycol include ethylene glycol, 1,2-propyleneglycol, 1,3-propyleneglycol, 1,4-butanediol, and 1,6-hexanediol.

Examples of the oxyalkylene group-containing diol include diethylene glycol, triethylene glycol, dipropylene glycol, polyethylene glycol, polypropylene glycol, and polytetramethylene glycol.

Examples of the alicyclic diol include 1,4-cyclohexanedimethanol, and hydrogenated bisphenol A.

Examples of the bisphenols include bisphenol A, bisphenol F, and bisphenol S.

Examples of the alkylene oxide include ethylene oxide, propylene oxide, and butylene oxide.

The number of carbon atoms of the chain alkylene glycol is not particularly limited and may be appropriately selected depending on the intended purpose. The number thereof is preferably from 2 through 12.

Among the above-listed examples, at least one of C2-12 chain alkylene glycol, and an alkylene oxide adduct of bisphenol is preferable, and an alkylene oxide adduct of bisphenol, or a mixture including an alkylene oxide adduct of bisphenol and C2-12 chain alkylene glycol is more preferable.

The trivalent or higher alcohol is not particularly limited and may be appropriately selected depending on the intended purpose. Examples thereof include trivalent or higher aliphatic alcohol, trivalent or higher polyphenols, and an alkylene oxide adduct of trivalent or higher polyphenols.

The trivalent or higher aliphatic alcohol is not particularly limited and may be appropriately selected depending on the intended purpose. Examples thereof include glycerin, trimethylolethane, trimethylolpropane, pentaerythritol, and sorbitol.

The trivalent or higher polyphenols are not particularly limited and may be appropriately selected depending on the intended purpose. Examples thereof include trisphenol PA, phenol novolac, and cresol novolac.

Examples of the alkylene oxide adduct of trivalent or higher polyphenols include alkylene oxide (e.g., ethylene oxide, propylene oxide, and butylene oxide) adducts of trivalent or higher polyols.

When a mixture of the diol and the trivalent or higher alcohol is used, a mass ratio (trivalent or higher alcohol/diol) of the trivalent or higher alcohol to the diol is not particularly limited and may be appropriately selected depending on the intended purpose, but the mass ratio is preferably from 0.01% by mass through 10% by mass, and more preferably from 0.01% by mass through 1% by mass.

The polycarboxylic acid is not particularly limited and may be appropriately selected depending on the intended purpose. Examples of the polycarboxylic acid include dicarboxylic acid, trivalent or higher carboxylic acid, and a mixture including dicarboxylic acid and trivalent or higher carboxylic acid. The above-listed examples may be used alone or in combination. Among the above-listed examples, dicarboxylic acid, and a mixture including dicarboxylic acid and a small amount of trivalent or higher polycarboxylic acid are preferable.

The dicarboxylic acid is not particularly limited and may be appropriately selected depending on the intended purpose. Examples thereof include divalent alkanoic acid, divalent alkenoic acid, and aromatic dicarboxylic acid.

The divalent alkanoic acid is not particularly limited and may be appropriately selected depending on the intended purpose. Examples thereof include succinic acid, adipic acid, and sebacic acid.

The divalent alkenoic acid is not particularly limited and may be appropriately selected depending on the intended purpose. The divalent alkenoic acid is preferably divalent alkenoic acid having 4 through 20 carbon atoms. The divalent alkenoic acid having 4 through 20 carbon atoms is not particularly limited and may be appropriately selected depending on the intended purpose. Examples thereof include maleic acid, and fumaric acid.

The aromatic dicarboxylic acid is not particularly limited and may be appropriately selected depending on the intended purpose. The aromatic dicarboxylic acid is preferably aromatic dicarboxylic acid having 8 through 20 carbon atoms. The aromatic dicarboxylic acid having 8 through 20 carbon atoms is not particularly limited and may be appropriately selected depending on the intended purpose. Examples thereof include phthalic acid, isophthalic acid, terephthalic acid, and naphthalene dicarboxylic acid.

The trivalent or higher carboxylic acid is not particularly limited and may be appropriately selected depending on the intended purpose. Examples thereof include trivalent or higher aromatic carboxylic acid.

The trivalent or higher aromatic carboxylic acid is not particularly limited and may be appropriately selected depending on the intended purpose. The trivalent or higher aromatic carboxylic acid is preferably trivalent or higher aromatic carboxylic acid having 9 through 20 carbon atoms. The trivalent or higher aromatic carboxylic acid having 9 through 20 carbon atoms is not particularly limited and may be appropriately selected depending on the intended purpose. Examples thereof include trimellitic acid, and pyromellitic acid.

As the polycarboxylic acid, acid anhydride or lower alkyl ester of any of dicarboxylic acid, trivalent or higher carboxylic acid, or a mixture including dicarboxylic acid and trivalent or higher carboxylic acid may be used.

The lower alkyl ester is not particularly limited and may be appropriately selected depending on the intended purpose. Examples thereof include methyl ester, ethyl ester, and isopropyl ester.

When a mixture of the dicarboxylic acid and the trivalent or higher carboxylic acid is used, a mass ratio (trivalent or higher carboxylic acid/dicarboxylic acid) of the trivalent or higher carboxylic acid to the dicarboxylic acid is not particularly limited and may be appropriately selected depending on the intended purpose. The mass ratio is preferably from 0.01% by mass through 10% by mass, and more preferably from 0.01% by mass through 1% by mass.

When the polyol and the polycarboxylic acid are reacted through polycondensation, an equivalent ratio (hydroxyl groups of polyol/carboxyl groups of polycarboxylic acid) of hydroxyl groups of the polyol to carboxyl groups of the polycarboxylic acid is not particularly limited and may be appropriately selected depending on the intended purpose. For example, the equivalent ratio is preferably from 1 through 2, more preferably from 1 through 1.5, and particularly preferably from 1.02 through 1.3.

An amount of the constitutional unit derived from the polyol in the isocyanate group-containing polyester prepolymer is not particularly limited and may be appropriately selected depending on the intended purpose. For example, the amount thereof is preferably from 0.5% by mass through 40% by mass, more preferably 1% by mass through 30% by mass, and particularly preferably from 2% by mass through 20% by mass.

When the amount of the constitutional unit derived from the polyol in the isocyanate group-containing polyester prepolymer is less than 0.5% by mass, hot offset resistance may be impaired, and it may be difficult to achieve both heat resistant storage stability and low temperature fixability of a resultant toner. When the amount thereof is greater than 40% by mass, low temperature fixability may be impaired.

The polyisocyanate is not particularly limited and may be appropriately selected depending on the intended purpose. Examples thereof include aliphatic isocyanate, alicyclic diisocyanate, aromatic diisocyanate, aromatic aliphatic diisocyanate, isocyanurate, and products obtained by blocking the above-listed polyisocyanates with a phenol derivative, oxime, or caprolactam.

The aliphatic diisocyanate is not particularly limited and may be appropriately selected depending on the intended purpose. Examples thereof include tetramethylene diisocyanate, hexamethylene diisocyanate, 2,6-diisocyanatocaproic acid methyl ester, octamethylene diisocyanate, decamethylene diisocyanate, dodecamethylene diisocyanate, tetradecamethylene diisocyanate, trimethylhexane diisocyanate, and tetramethylhexane diisocyanate.

The alicyclic diisocyanate is not particularly limited and may be appropriately selected depending on the intended purpose. Examples thereof include isophorone diisocyanate, and cyclohexylmethane diisocyanate.

The aromatic diisocyanate is not particularly limited and may be appropriately selected depending on the intended purpose. Examples thereof include tolylene diisocyanate, diisocyanatodiphenyl methane, 1,5-naphthylenediisocyanate, 4,4'-diisocyanatodiphenyl, 4,4'-diisocyanato-3,3'-dimethyldiphenyl, 4,4'-diisocyanato-3-methyldiphenylmethane, and 4,4'-diisocyanato-diphenyl ether.

The aromatic aliphatic diisocyanate is not particularly limited and may be appropriately selected depending on the intended purpose. Examples thereof include α,α,α',α'-tetramethylxylenediisocyanate.

The isocyanurate is not particularly limited and may be appropriately selected depending on the intended purpose. Examples thereof include tris(isocyanatalkyl)isocyanurate, and tris(isocyanatocycloalkyl)isocyanurate. The above-listed examples may be used alone or in combination.

When the polyester including a hydroxyl group is reacted with the polyisocyanate, an equivalent ratio (NCO/OH) of isocyanate groups of the polyisocyanate to hydroxyl groups of the polyester resin is not particularly limited and may be appropriately selected depending on the intended purpose. The equivalent ratio is preferably from 1 through 5, more preferably from 1.2 through 4, and particularly preferably from 1.5 through 2.5. When the equivalent ratio (NCO/OH) of isocyanate groups of the polyisocyanate to hydroxyl groups of the polyester resin is less than 1, hot offset resistant may be poor. When the equivalent ratio is greater than 5, low temperature fixability may be poor.

An amount of the constitutional unit derived from the polyisocyanate in the isocyanate group-containing polyester prepolymer is not particularly limited and may be appropriately selected depending on the intended purpose. The amount thereof is preferably from 0.5% by mass through 40% by mass, more preferably from 1% by mass through 30% by mass, and particularly preferably from 2% by mass through 20% by mass. When the amount of the constitutional unit derived from the polyisocyanate in the isocyanate group-containing polyester prepolymer is less than 0.5% by mass, hot offset resistance may be impaired. When the amount thereof is greater than 40% by mass, low temperature fixability may be impaired.

The average number of isocyanate groups per molecule of the isocyanate group-containing polyester prepolymer is not particularly limited, and may be appropriately selected depending on the intended purpose. For example, the average number thereof is preferably 1 or greater, more preferably from 1.5 through 3, and particularly preferably from 1.8 through 2.5. When the average number of isocyanate groups per molecule of the isocyanate group-containing polyester prepolymer is less than 1, a molecular weight of a modified polyester resin may be low to impair hot offset resistance.

The modified polyester can be produced by the one-shot method etc. As one example, a production method of a urea-modified polyester resin will be described.

First, polyol and polycarboxylic acid are heated to a temperature of from 150° C. through 280° C. in the presence of a catalyst (e.g., tetrabutoxy titanate, dibutyl tin oxide), optionally with removing water generated under the reduced pressure, to thereby obtain a hydroxyl group-containing polyester resin. Next, the hydroxyl group-containing polyester resin and polyisocyanate are allowed to react at a temperature of from 40° C. through 140° C., to thereby obtain an isocyanate group-containing polyester prepolymer. Then, the isocyanate group-containing polyester prepolymer and amines are allowed to react at a temperature of from 0° C. through 140° C., to thereby obtain a urea-modified polyester resin.

The number average molecular weight (Mn) of the modified polyester resin is not particularly limited and may be appropriately selected depending on the intended purpose. The number average molecular weight (Mn) thereof as measured by gel permeation chromatography (GPC) is preferably from 1,000 through 10,000, and more preferably from 1,500 through 6,000.

The weight average molecular weight of the modified polyester resin is not particularly limited and may be appropriately selected depending on the intended purpose. The weight average molecular weight thereof as measured by gel permeation chromatography (GPC) is preferably 20,000 or greater but 1,000,000 or less.

When the weight average molecular weight of the modified polyester resin is 20,000 or greater, a problem that a resultant toner tends to flow at a low temperature to thereby impair heat resistant storage stability, and a problem that a viscosity of the resultant toner as melted reduces to thereby impair hot offset resistance can be prevented.

A solvent may be optionally used when the hydroxyl group-containing polyester resin and the polyisocyanate are allowed to react, or when the isocyanate group-containing polyester prepolymer and the amines are allowed to react.

The solvent is not particularly limited and may be appropriately selected depending on the intended purpose. Examples thereof include solvents that are not reactive with isocyanate groups, such as an aromatic solvent, ketones, esters, amides, and ethers.

Examples of the aromatic solvent include toluene, and xylene.

Examples of the ketones include acetone, methyl ethyl ketone, and methyl isobutyl ketone.

Examples of the esters include ethyl acetate.

Examples of the amides include dimethylformamide, and dimethylacetamide. Examples of the ethers include tetrahydrofuran.

The glass transition temperature of the modified polyester resin is preferably −60° C. or higher but 0° C. or lower, and more preferably −40° C. or higher but −20° C. or lower. When the glass transition temperature of the modified polyester resin is −60° C. or higher, a problem that a flow of a toner cannot be suppressed at a low temperature to impair heat resistant storage stability and filming resistance can be prevented. When the glass transition temperature of the modified polyester resin is 0° C. or lower, a problem that a toner cannot be sufficiently deformed by heat and pressure applied during fixing to give insufficient low temperature fixability can be prevented.

An amount of the modified polyester is not particularly limited and may be appropriately selected depending on the intended purpose. The amount thereof is preferably from 1 part by mass through 15 parts by mass, and more preferably from 5 parts by mass through 10 parts by mass, relative to 100 parts by mass of the toner.

The molecular structures of the polyester resin components A and C can be confirmed by solution or solid NMR spectroscopy. X-ray diffraction spectroscopy, GCIMS, LC/MS, or IR spectroscopy.

As for a simple method thereof, there is a method where a compound giving an infrared absorption spectrum having no absorption based on $\delta_{CH}$ (out plane bending) of olefin at 965±10 $cm^{-1}$ and 990±10 $cm^{-1}$ is detected as the noncrystalline polyester resin.

—Crystalline Polyester—

The crystalline polyester resin (may be also referred to as a "crystalline polyester" or "polyester resin component D" hereinafter) is not particularly limited and may be appropriately selected depending on the intended purpose. Examples thereof include a crystalline polyester resin obtained through a reaction between polyol and polycarboxylic acid.

The crystalline polyester resin has thermofusion properties that the crystalline polyester resin sharply turns into viscous at around a fixing onset temperature thereof owing to high crystallinity thereof.

Since the crystalline polyester resin having such properties is used together with the amorphous polyester resin, excellent heat resistant storage stability is obtained up to a melt onset temperature owing to the crystallinity thereof, rapid reduction in viscosity (sharp melt) is caused at a melt onset temperature thereof due to fusion of the crystalline polyester resin to be compatible to the amorphous polyester resin, and the rapid reduction in the viscosity makes a resultant toner to be fixed. Therefore, the toner having both excellent heat resistant storage stability and low-temperature fixing ability can be obtained. Moreover, an excellent release width (a difference between the minimum fixing temperature and a hot offset onset temperature) is also obtained.

In the present disclosure, as described above, the crystalline polyester resin means a resin obtained using polyvalent alcohol, and polyvalent carboxylic acid, and does not include, for example, a modified polyester resin, such as such as the prepolymer and a resin obtained through a cross-linking and/or elongation reaction of the prepolymer.

——Polyol——

The polyol is not particularly limited and may be appropriately selected depending on the intended purpose. Examples thereof include diol and trivalent or higher alcohol.

Examples of the diol include saturated aliphatic diol.

Examples of the saturated aliphatic diol include straight-chain saturated aliphatic diol, and branched-chain saturated aliphatic diol. The above-listed examples may be used alone or in combination. Among the above-listed examples, straight-chain saturated aliphatic diol is preferable, and C2-12 straight-chain saturated aliphatic diol is more preferable because reduction in a melting point can be prevented.

Examples of the saturated aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanediol.

Among the above-listed examples, ethylene glycol, 1,4-butanediol, 1,6-hexanediol, 1,8-octanediol, 1,10-decanediol, and 1,12-dodecanediol are preferable, considering high crystallinity of the crystalline polyester resin and excellent sharp-melting properties.

Examples of the trivalent or higher alcohol include glycerin, trimethylolethane, trimethylolpropane, and pentaerythritol.

——Polycarboxylic Acid——

The polycarboxylic acid is not particularly limited and may be appropriately selected depending on the intended purpose. Examples thereof include divalent carboxylic acid, and trivalent or higher carboxylic acid.

Examples of the divalent carboxylic acid include: saturated aliphatic dicarboxylic acid, such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid; aromatic dicarboxylic acid (e.g., dibasic acid), such as phthalic acid, isophthalic acid, terephthalic acid, naphthalene-2,6-dicarboxylic acid, malonic acid, and mesaconic acid; and anhydrides and lower alkyl esters (the number of carbon atoms: from 1 through 3) of the above-listed dicarboxylic acids.

Examples of the trivalent or higher carboxylic acid include 1,2,4-benzenetricarboxylic acid, 1,2,5-benzenetricarboxylic acid, 1,2,4-naphthalenetricarboxylic acid, anhydrides thereof, and lower alkyl esters (the number of carbon atoms: from 1 through 3) thereof.

The polyvalent carboxylic acid may include, in addition to the saturated aliphatic dicarboxylic acid and the aromatic dicarboxylic acid, dicarboxylic acid having a sulfonic acid group. In addition to the saturated aliphatic dicarboxylic acid and the aromatic dicarboxylic acid, the polyvalent carboxylic acid may further include dicarboxylic acid having a double bond.

The above-listed examples may be used alone or in combination.

The crystalline polyester resin is preferably formed of straight-chain saturated aliphatic dicarboxylic acid having 4 or more but 12 or less carbon atoms and straight-chain saturated aliphatic diol having 2 or more but 12 or less carbon atoms. Specifically, the crystalline polyester resin preferably includes a constitutional unit derived from saturated aliphatic dicarboxylic acid having 4 or more but 12 or less carbon atoms and a constitutional unit derived from saturated aliphatic diol having 2 or more but 12 or less carbon atoms. The crystalline polyester resin including the above-mentioned structural units has high crystallinity and excellent sharp melting properties. Therefore, use of such a crystalline polyester resin is preferable because excellent low-temperature fixing ability is exhibited.

The presence of the crystallinity of the crystalline polyester resin of the present disclosure can be confirmed by a crystal analysis X-ray diffraction spectrometer (e.g., X'Pert Pro MRD, available from Philips). The measuring method will be described below.

First, a target sample is ground by a motor to prepare a sample power, and the obtained sample powder is uniformly applied into a sample holder. Thereafter, the sample holder is set inside the diffraction spectrometer, and a measurement is performed, to thereby obtain a diffraction spectrum.

When a half value width of the peak having the maximum peak density among the peaks obtained in the range of $20° < 2\theta < 25°$ of the obtained diffraction peaks is 2.0 or less, the sample is determined to have crystallinity. In contrast to the crystalline polyester resin, a polyester resin that does not have the above-mentioned half value width of the peak is referred to as a noncrystalline polyester resin in the present disclosure.

The measuring conditions of X-ray diffraction are described below.

[Measuring Conditions]

Tension kV: 45 kV
Current: 40 mA
MPSS
Upper
Gonio
Scan mode: continuous
Start angle: 3°
End angle: 35°
Angle Step: 0.02°
Lucident beam optics
Divergence slit: Div slit ½
Deflection beam optics
Anti scatter slit: As Fixed ½
Receiving slit: Prog rec slit The melting point of the crystalline polyester resin is not particularly limited and may be appropriately selected depending on the intended purpose. The melting point thereof is preferably 60° C. or higher but 80° C. or lower.

When the melting point of the crystalline polyester resin is 60° C. or higher, a problem that the crystalline polyester resin tends to melt at a low temperature, and heat resistant storage stability of a resultant toner is impaired can be prevented. When the melting point thereof is 80° C. or lower, a problem that the crystalline polyester resin is melted insufficiently by heating during fixing to impair low temperature fixability can be prevented.

A molecular weight of the crystalline polyester resin is not particularly limited and may be appropriately selected depending on the intended purpose.

The orthodichlorobenzene soluble component of the crystalline polyester resin preferably has the weight average molecular weight (Mw) of from 3,000 through 30,000, more preferably from 5,000 through 15,000 as measured by GPC.

The orthodichlorobenzene soluble component of the crystalline polyester resin preferably has the number average molecular weight (Mn) of from 1,000 through 10,000, and more preferably from 2,000 through 10,000 as measured by GPC.

The molecular weight ratio Mw/Mn of the crystalline polyester resin is preferably from 1.0 through 10, and more preferably from 1.0 through 5.0.

This is because the crystalline polyester resin having a sharp molecular weight distribution and having a low molecular weight imparts excellent low temperature fixability, and heat resistant storage stability is impaired when an amount of the low molecular weight component is large.

The acid value of the crystalline polyester resin is not particularly limited and may be appropriately selected depending on the intended purpose. In order to obtain desired low temperature fixability, the acid value thereof is preferably 5 mgKOH/g or greater, and more preferably 10 mgKOH/g or greater, considering affinity between paper and the resin. In order to improve hot offset resistance, the acid value thereof is preferably 45 mgKOH/g or less.

The hydroxyl value of the crystalline polyester resin is not particularly limited and may be appropriately selected depending on the intended purpose. In order to achieve desired low temperature fixability and excellent charging properties, the hydroxyl value thereof is preferably from 0 mgKOH/g through 50 mgKOH/g, and more preferably from 5 mgKOH/g through 50 mgKOH/g.

A molecular structure of the crystalline polyester resin can be confirmed by solution or solid NMR spectroscopy, X-ray diffraction spectroscopy, GC/MS, LC/MS, or IR spectroscopy. As for a simple method thereof, there is a method where a compound giving an infrared absorption spectrum having absorption based on $\delta_{CH}$ (out plane bending) of olefin at $965\pm10$ cm$^{-1}$ or $990\pm10$ cm$^{-1}$ is detected as the crystalline polyester resin.

An amount of the crystalline polyester resin is not particularly limited and may be appropriately selected depending on the intended purpose. The amount of the crystalline polyester resin is preferably from 3 parts by mass through 20 parts by mass, and more preferably 5 parts by mass through 15 parts by mass, relative to 100 parts by mass of the toner. When the amount of the crystalline polyester resin is 3 parts by mass or greater, a problem that sharp-melt properties owing to the crystalline polyester resin are insufficient to impair low temperature fixability can be prevented. When the amount thereof is 20 parts by mass or less, moreover, problems that heat resistant storage stability is impaired and image fogging tends to occur can be prevented.

<<Colorant>>

The colorant is not particularly limited, and may be appropriately selected depending on the intended purpose. Examples of the colorant include carbon black, a nigrosin dye, iron black, naphthol yellow S, Hansa yellow (10G, 5G and G), cadmium yellow, yellow iron oxide, yellow ocher, yellow lead, titanium yellow, polyazo yellow, oil yellow, Hansa yellow (GR, A, RN and R), pigment yellow L, benzidine yellow (G and GR), permanent yellow (NCG), vulcan fast yellow (5G, R), tartrazine lake, quinoline yellow lake, anthrasan yellow BGL, isoindolinon yellow, red iron oxide, red lead, lead vermilion, cadmium red, cadmium mercury red, antimony vermilion, permanent red 4R, para-red, fiser red, parachloroorthonitro aniline red, lithol fast scarlet G, brilliant fast scarlet, brilliant carmine BS, permanent red (F2R, F4R, FRL, FRLL and F4RH), fast scarlet VD, vulcan fast rubin B, brilliant scarlet G, lithol rubin GX, permanent red F5R, brilliant carmine 6B, pigment scarlet 3B, Bordeaux 5B, toluidine Maroon, permanent Bordeaux F2K, Helio Bordeaux BL, Bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake. Victoria blue lake, metal-free phthalocyanine blue, phthalocyanine blue, fast sky blue, indanthrene blue (RS and BC), indigo, ultramarine, iron blue, anthraquinone blue, fast violet B, methyl violet lake, cobalt purple, manganese violet, dioxane violet, anthraquinone violet, chrome green, zinc green, chromium oxide, viridian, emerald green, pigment green B, naphthol green B, green gold, acid green lake, malachite green lake, phthalocyanine green, anthraquinone green, titanium oxide, zinc flower, and lithopone.

An amount of the colorant is not particularly limited and may be appropriately selected depending on the intended purpose. The amount thereof is preferably 1 part by mass through 15 parts by mass, and more preferably 3 parts by mass through 10 parts by mass, relative to 100 parts by mass of the toner.

The colorant may be also used as a master batch that is a composite of the colorant with a resin. Examples of the resin used for the production of the master batch or kneaded together with the master batch include, in addition to the above-mentioned other polyester resins: polymers of styrene or substituted styrene, such as poly(p-chlorostyrene), and polyvinyl toluene; styrene-based copolymers, such as styrene-p-chlorostyrene copolymer, styrene-propylene copolymer, styrene-vinyl toluene copolymer, styrene-vinyl naphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl α-chloromethacrylate copolymer, styrene-acrylonitrile copolymer, styrene-methyl vinyl ketone copolymer, styrene-butadiene copolymer, styrene-isoprene copolymer, styrene-acrylonitrile-indene copolymer, styrene-maleic acid copolymer, and styrene-maleic acid ester copolymer; polymethyl methacrylate; polybutyl methacrylate; polyvinyl chloride; polyvinyl acetate; polyethylene; polypropylene; polyester; an epoxy resin; an epoxy polyol resin; polyurethane; polyamide; polyvinyl butyral; a polyacrylic acid resin; rosin; modified rosin; a terpene resin; an aliphatic or alicyclic hydrocarbon resin; an aromatic petroleum resin; chlorinated paraffin; and paraffin wax. The above-listed examples may be used alone or in combination.

The master batch can be obtained by applying high shear force to a resin for a master batch and a colorant to mix together, and kneading the mixture. In order to enhance interaction between the colorant and the resin, an organic solvent can be used. Moreover, a so-called flashing method is preferably used, since a wet cake of the colorant can be directly used without being dried. The flashing method is a method in which an aqueous paste containing a colorant is mixed or kneaded with a resin and an organic solvent, and then the colorant is transferred to the resin to remove the moisture and the organic solvent. As for the mixing and kneading, a high-shearing disperser (e.g., a three-roll mill) is preferably used.

<<Wax>>

The wax (release agent) is not particularly limited and may be appropriately selected from wax known in the art. Examples thereof include natural wax and synthetic wax. The above-listed examples may be used alone or in combination.

Examples of the natural wax include vegetable wax (e.g., carnauba wax, cotton wax, and Japanese wax), animal wax (e.g., bees wax and lanolin wax), mineral wax (e.g., ozocerite and ceresin), and petroleum wax (e.g., paraffin wax, microcrystalline wax, and petrolatum wax).

Examples of the synthetic wax include: synthetic hydrocarbon wax, such as Fischer-Tropsch, polyethylene, polypropylene; ester wax, ketone wax, and ether wax: fatty acid amide-based compound, such as 12-hydroxystearic acid amide, stearic acid amide, phthalimide anhydride, and chlorinated hydrocarbon; a low molecular-weight crystalline polyester resin, such as a homopolymer of polyacrylate (e.g., poly-n-stearylmethacrylate, and poly-n-laurylmethacrylate) or copolymer thereof (e.g., a n-stearylacrylate-ethylmethacrylate copolymer); and a crystalline polymer having a long alkyl chain at a side chain thereof.

Among the above-listed examples, hydrocarbon-based wax, such as paraffin wax, microcrystalline wax, Fischer-Tropsch wax, polyethylene wax, and polypropylene wax are preferable.

A melting point of the release agent is not particularly limited and may be appropriately selected depending on the intended purpose. The melting point thereof is preferably 60° C. or higher but 80° C. or lower. When the melting point thereof is 60° C. or higher, a problem that the release agent tends to melt at a low temperature to impair heat resistant storage stability can be prevented. When the melting point thereof is 80° C. or lower, the release agent cannot be sufficiently melted to cause fixing offset even, when the resin is melted in the fixing temperature range, and thus an image is impaired can be prevented.

An amount of the release agent is not particularly limited, and may be appropriately selected depending on the intended purpose. For example, the amount of the release agent is preferably from 2 parts by mass through 10 parts by mass, and more preferably from 3 parts by mass through 8 parts by mass relative to 100 parts by mass of the toner. When the amount thereof is 2 parts by mass or greater, problems that hot offset resistance during fixing and low temperature fixability are impaired can be prevented. When the amount thereof is 10 parts by mass or less, problems that heat resistant storage stability is impaired and image fogging may be caused can be prevented.

<<Other Components>>

The toner base particles may further include other components. Such components are not particularly limited as long as the components are components used for typical toner base particles, and may be appropriately selected depending on the intended purpose.

An amount of the above-mentioned other components is not particularly limited as long as the amount thereof does not adversely affect properties of a resultant toner, and may be appropriately selected depending on the intended purpose.

The above-mentioned other components are not particularly limited as long as the components are components used for typical toners, and may be appropriately selected depending on the intended purpose. Examples thereof include a charge controlling agent, external additives, a flowability improving agent, a cleaning improving agent, and a magnetic material.

—Charge Controlling Agent—

The charge controlling agent is not particularly limited and may be appropriately selected depending on the intended purpose. Examples of the charge controlling agent include a nigrosine-based dye, a triphenylmethane-based dye, a chrome-containing metal complex dye, a molybdic acid chelate pigment, a rhodamine-based dye, an alkoxy-based amine, a quaternary ammonium salt (including fluorine-modified quaternary ammonium), alkylamide, phosphorus or a compound thereof, tungsten or a compound thereof, a fluorosurfactant, a metal salt of salicylic acid, and a metal salt of a salicylic acid derivative.

Examples of commercial products of the charge controlling agent include: nigrosine dye BONTRON 03, quaternary ammonium salt BONTRON P-51, metal-containing azo dye BONTRON S-34, oxynaphthoic acid-based metal complex E-82, salicylic acid-based metal complex E-84 and phenol condensate E-89 (all manufactured by ORIENT CHEMICAL INDUSTRIES CO., LTD); quaternary ammonium salt molybdenum complex TP-302 and TP-415 (all manufactured by Hodogaya Chemical Co., Ltd.); and LRA-901, and boron complex LR-147 (manufactured by Japan Carlit Co., Ltd.).

An amount of the charge controlling agent cannot be set unconditionally as the amount thereof is adjusted depending on the binder resin for use, the presence of optionally used additives, and a toner production method including a dispersion method. However, the amount of the charge controlling agent is preferably from 0.1 parts by mass through 10 parts by mass, and more preferably from 0.2 parts by mass through 5 parts by mass, relative to 100 parts by mass of the binder resin. When the amount of the charge controlling agent is greater than 10 parts by mass, chargeability of a resultant toner is excessively large to reduce an effect of the charge controlling agent, and electrostatic attraction with a developing roller increases to impair flowability of a resultant developer, or reduce image density.

The charge controlling agent may be melt-kneaded with a master batch or resin, followed by dissolving or dispersing therein, or may be directly added to an organic solvent when the master batch or resin is dissolved or dispersed therein. Alternatively, the charge controlling agent may be fixed on surfaces of toner particles after producing the toner particles.

—External Additives—

The external additives are not particularly limited and may be appropriately selected depending on the intended purpose. Examples thereof include silica particles, hydrophobic silica, fatty acid metal salts (e.g., zinc stearate, and aluminium stearate), metal oxide (e.g., titania, alumina, tin oxide, and antimony oxide), and a fluoropolymer. The above-listed examples may be used alone or in combination. Among the above-listed examples, hydrophobicity-treated inorganic particles are preferable.

Examples of the silica particles include R972, R974, RX200, RY200, R202, R805, and R812 (all available from NIPPON AEROSIL CO., LTD.).

Examples of the titania particles include: P-25 (available from NIPPON AEROSIL CO., LTD.); STT-30, and STT-65C-S (both available from Titan Kogyo, Ltd.); TAF-140 (available from Fuji Titanium Industry Co., Ltd.); and MT-150W, MT-500B, MT-600B, and MT-150A (all available from TAYCA CORPORATION).

Examples of the hydrophobicity-treated titanium oxide particles include: T-805 (available from NIPPON AEROSIL CO., LTD.); STT-30A and STT-65S-S(both available from Titan Kogyo, Ltd.); TAF-500T and TAF-1500T (both available from Fuji Titanium Industry Co., Ltd.); MT-100S and MT-100T (both available from TAYCA CORPORATION); and IT-S(available from ISHIHARA SANGYO KAISHA, LTD.).

The hydrophobicity-treated oxide particles, hydrophobicity-treated silica particles, hydrophobicity-treated titania particles, and hydrophobicity-treated alumina particles can be obtained, for example, by treating hydrophilic particles with a silane coupling agent, such as methyltrimethoxysilane, methyltriethoxysilane, and octyltrimethoxysilane. Moreover, silicone oil-treated oxide particles or inorganic particles obtained by processing inorganic particles with silicone oil optionally with heating are also suitably used.

Examples of the silicone oil include dimethylsilicone oil, methylphenylsilicone oil, chlorophenylsilicone oil, methylhydrogen silicone oil, alkyl-modified silicone oil, fluorine-modified silicone oil, polyether-modified silicone oil, alcohol-modified silicone oil, amino-modified silicone oil, epoxy-modified silicone oil, epoxy/polyether-modified silicone oil, phenol-modified silicone oil, carboxyl-modified silicone oil, mercapto-modified silicone oil, methacryl-modified silicone oil, and $\alpha$-methylstyrene-modified silicone oil.

The average primary particle diameter of the external additives is not particularly limited, and may be appropriately selected depending on the intended purpose. For example, the average primary particle diameter of the external additives is preferably 100 nm or less, more preferably from 1 nm through 100 nm, even more preferably from 3 nm through 70 nm, and particularly preferably from 5 nm through 70 nm. When the average primary particle diameter of the external additives is within the above-mentioned range, the following problems can be prevented. That is, a problem that inorganic particles are embedded in toner base particles and therefore the inorganic particles cannot be effectively functioned, and a problem that a surface of a photoconductor is unevenly damaged.

The external additives preferably include at least one group of hydrophobic inorganic particles having the average primary particle diameter of 20 nm or less and at least one group of inorganic particles having the average primary particle diameter of 30 nm or greater.

The BET specific surface area of the external additives is from 20 $m^2/g$ through 500 $m^2/g$.

An amount of the external additives is not particularly limited and may be appropriately selected depending on the intended purpose. The amount thereof is preferably from 0.1 parts by mass through 5 parts by mass, and more preferably from 0.3 parts by mass through 3 parts by mass, relative to 100 parts by mass of the toner.

—Flowability Improving Agent—

The flowability improving agent is not particularly limited as long as the flowability improving agent is an agent used to perform a surface treatment to increase hydrophobicity to prevent degradation of flowability and charging properties even under high humidity conditions. The flowability improving agent may be appropriately selected depending on the intended purpose. Examples thereof include a silane coupling agent, a silylating agent, a fluoroalkyl group-containing silane coupling agent, an organic titanate-based coupling agent, an aluminium-based coupling agent, silicone oil, and modified silicone oil.

The silica and the titanium oxide are particularly preferably subjected to a surface treatment with any of the above-listed flowability improving agents to be used as hydrophobic silica and hydrophobic titanium oxide.

—Cleaning Improving Agent—

The cleaning improving agent is not particularly limited as long as the cleaning improving agent is an agent added to the toner for removing the residual developer on a photoconductor or a primary transfer medium after transferring. The cleaning improving agent may be appropriately selected depending on the intended purpose. Examples thereof include: fatty acid (e.g., stearic acid) metal salts, such as zinc stearate, and calcium stearate; and polymer particles produced by soap-free emulsion polymerization, such as polymethyl methacrylate particles, and polystyrene particles.

The polymer particles are preferably polymer particles having a relatively narrow particle size distribution, and are suitably polymer particles having the volume average particle diameter of from 0.01 μm through 1 μm.

—Magnetic Material—

The magnetic material is not particularly limited and may be appropriately selected depending on the intended purpose. Examples thereof include iron powder, magnetite, and ferrite. Among the above-listed examples, white magnetic materials are preferable in view of color tone.

<Glass Transition Temperature of Toner>

The glass transition temperature (Tg1st) of the toner measured from the first heating of differential scanning calorimetry (DSC) is preferably from 20° C. or higher but 65° C. or lower, more preferably 20° C. or higher but 50° C. or lower, and even more preferably 40° C. or higher but 50° C. or lower.

The glass transition temperature (Tga1st) of the tetrahydrofuran (THF) insoluble component of the toner measured from the first heating of DSC is preferably −45° C. or higher but 10° C. or lower, and more preferably −40° C. or higher but 10° C. or lower.

A particularly preferable embodiment is that Tg1st is 20° C. or higher but 50° C. or lower and Tga1st is −40° C. or higher but 10° C. or lower. When the toner has such glass transition temperatures, excellent low temperature fixability can be achieved while maintaining heat resistant storage stability.

The glass transition temperature (Tg2nd) of the THF soluble component of the toner measured from the second heating of DSC is preferably from 20° C. through 65° C.

The glass transition temperature (Tg1st) of the toner measured from the first heating of differential scanning calorimetry (DSC) and the glass transition temperature (Tg2nd) of the toner measured from the second heating of DSC preferably satisfy Tg1st−Tg2nd≥10[° C.], because low temperature fixability and heat resistant storage stability are improved.

The glass transition temperature of the toner can be measured, for example, by means of a differential scanning calorimeter (DSC-60. Q-200, available from Shimadzu Corporation).

For example, DSC curves are measured by the differential scanning calorimeter. The DSC curve for the first heating is selected from the obtained DSC curves using an analysis program, and the glass transition temperature Tg1st of the first heating is determined using an endothermic shoulder temperature in the analysis program. The DSC curve for the second heating is selected, and the glass transition temperature Tg2nd of the second heating is determined using the endothermic shoulder temperature.

Figure 3:
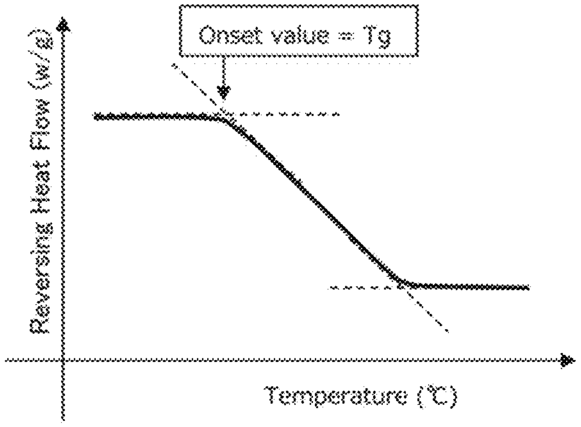
FIG. 3 is a view illustrating how Tg is determined from a DSC curve.

The method for determining the glass transition temperature will be supplemented with the following description. In the present disclosure, the onset value illustrated in FIG. 3 is determined as Tg. A DSC curve is selected from the obtained DSC curves using an analysis program, and the onset value illustrated in FIG. 3 is determined as Tg of the present disclosure.

Since a glass transition temperature of the first heating can be separated into 2 points, the THF insoluble component of the toner is measured by heating with the temperature modulation amplitude.

The THF insoluble component of the toner is heated from −80° C. to 150° C. at the heating rate of 1.0° C./min with a temperature modulation amplitude of 1.0° C./min using a modulation mode (first heating). Similarly to the above, a DSC curve is selected from the obtained DSC curves using the analysis program by plotting the "reversing heat flow" on the vertical axis. The onset value as illustrated in FIG. 3 is determined as Tg.

(Developer)

The developer of the present disclosure includes at least the toner of the present disclosure, and may further include appropriately selected other components, such as a carrier, according to the necessity. The developer may be a one-component developer or two-component developer. In the case where the developer is used for high-speed printers corresponded to improved information processing speed of recent years, the developer is preferably a two-component developer because service life can be improved.

<Carrier>

The carrier is not particularly limited and may be appropriately selected depending on the intended purpose. The carrier is preferably a carrier including carrier particles each of which includes a core and a resin layer covering the core.

—Core—

A material of the core is not particularly limited and may be appropriately selected depending on the intended purpose. Examples thereof include a manganese-strontium-based material of from 50 emu/g through 90 emu/g, and a manganese-magnesium-based material of from 50 emu/g through 90 emu/g. In order to ensure sufficient image density, moreover, a hard magnetic material, such as iron powder of 100 emu/g or greater, and magnetite of from 75 emu/g through 120 emu/g, is preferably used. A soft magnetic material, such as a copper-zinc-based material of from 30 emu/g through 80 emu/g, is preferably used because an impact of the developer held in the form of a brush against the photoconductor can be reduced, and a high image quality can be achieved. The above-listed examples may be used alone or in combination.

The volume average particle diameter of the cores is not particularly limited, and may be appropriately selected depending on the intended purpose. For example, the volume average particle diameter thereof is preferably from 10 μm through 150 μm, and more preferably from 40 μm through 100 μm.

When the volume average particle diameter of the cores is less than 10 μm, an amount of the fine powder in the carrier increases, which may reduce magnetization per carrier particle to cause scattering of the carrier. When the volume average particle diameter of the cores is greater than 150 μm, the specific surface area thereof decreases to cause toner scattering, and reproducibility of especially a solid imaging area may be impaired in a full color image having a large solid imaging area.

The toner of the present disclosure may be mixed with the carrier to be used for a two-component developer.

An amount of the carrier in the two-component developer is not particularly limited and may be appropriately selected depending on the intended purpose. For example, the amount of the carrier is preferably from 90 parts by mass through 98 parts by mass, and more preferably from 93 parts by mass through 97 parts by mass, relative to 100 parts by mass of the two-component developer.

The developer of the present disclosure can be suitably used for image formation according to various electrophotographic methods known in the art, such as a magnetic one-component developing method, a non-magnetic one-component developing method, and a two-component developing method.

(Method for Producing Toner)

The method for producing a toner of the present disclosure is a method for producing the above-described toner.

The method for producing a toner includes a composite particle forming step, and a removing step, and may further include other steps according to the necessity.

<Composite Particle Forming Step>

The composite particle forming step is a step including depositing resin particles on a surface of each toner base particle to form composite particles.

Examples of a formation method of the composite particles include a known dissolution suspension method where an oil phase including components of the toner base particles, such as the binder resin, a colorant, and wax, is dispersed in an aqueous medium including the resin particles to granulate composite particles.

As one example of the dissolution suspension method, a method for forming composite particles while generating a polyester resin through an elongation reaction and/or cross-linking reaction between the prepolymer and the curing agent will be described.

In this method, preparation of an aqueous medium, preparation of an oil phase including toner base particle materials, emulsification and/or dispersion of the toner base particles, and removal of the organic solvent are performed.

—Preparation of Aqueous Medium (Aqueous Phase)—

For example, the preparation of the aqueous medium can be performed by dispersing resin particles in an aqueous medium. An amount of the resin particles in the aqueous medium is not particularly limited, and may be appropriately selected depending on the intended purpose. For example, the amount of the resin particles is preferably from 0.5 parts by mass through 10 parts by mass relative to 100 parts by mass of the aqueous medium.

The aqueous medium is not particularly limited, and may be appropriately selected depending on the intended purpose. Examples of the aqueous medium include water, a solvent miscible with water, and a mixture thereof. The above-listed examples may be used alone or in combination. Among the above-listed examples, water is preferable.

The solvent miscible with water is not particularly limited and may be appropriately selected depending on the intended purpose. Examples thereof include alcohol, dimethyl formamide, tetrahydrofuran, cellosolves, and lower ketones.

Examples of the alcohol include methanol, isopropanol, and ethylene glycol.

Examples of the lower ketones include acetone, and methyl ethyl ketone.

—Preparation of Oil Phase—

The preparation of the oil phase is performed by dissolving and/or dispersing, in an organic solvent, toner base particle materials including a binder resin, a colorant, wax, and optionally a curing agent.

The organic solvent is not particularly limited and may be appropriately selected depending on the intended purpose. For example, the organic solvent is preferably an organic solvent having a boiling point of lower than 150° C. as such an organic solvent is easily removed.

Examples of the organic solvent having a boiling point of lower than 150° C. include toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone. The above-listed examples may be used alone or in combination. Among the above-listed examples, ethyl acetate, toluene, xylene, benzene, methylene chloride, 1,2-dichloroethane, chloroform, and carbon tetrachloride are preferably, and ethyl acetate is more preferable.

—Emulsifying and/or Dispersing—

The emulsifying and/or dispersing the toner materials can be performed by dispersing the oil phase including the toner materials in the aqueous medium. When the toner materials are emulsified and/or dispersed, the curing agent and the prepolymer can be reacted through an elongation reaction and/or cross-linking reaction.

The reaction conditions for generating the prepolymer (e.g., a reaction time and a reaction temperature) are not particularly limited, and may be appropriately selected depending on a combination of the curing agent and the prepolymer. The reaction time is preferably from 10 minutes through 40 hours, and more preferably from 2 hours through 24 hours. The reaction temperature is preferably from 0° C. through 150° C., and more preferably from 40° C. through 98° C.

A method for stably forming a dispersion liquid including the prepolymer in the aqueous medium is not particularly limited and may be appropriately selected depending on the intended purpose. Examples thereof include a method where the oil phase prepared by dissolving and/or dispersing the toner materials is added to the aqueous medium phase, and the resultant is mixture is dispersed with shearing force.

A disperser used for the dispersing is not particularly limited and may be appropriately selected depending on the intended purpose. Examples thereof include a low-speed shearing disperser, a high-speed shearing disperser, a friction disperser, a high-pressure jet disperser, and an ultrasonic disperser. Among the above-listed examples, a high-speed shearing disperser is preferable as the particle diameter of the dispersed elements (oil droplets) can be adjusted to from 2 μm through 20 μm.

In the case where the high-speed shearing disperser is used, conditions, such as rotational speed, a dispersion time, and a dispersion temperature, are appropriately selected depending on the intended purpose. The rotational speed is preferably from 1,000 rpm through 30,000 rpm, and more preferably from 5,000 rpm through 20,000 rpm. In case of a batch system, the dispersion time is from 0.1 minutes through 5 minutes. The dispersion temperature is preferably from 0° C. through 150° C., and more preferably from 40° C. through 98° C. under pressure. Generally speaking, dispersion is performed easier when the dispersion temperature is a high temperature.

An amount of the aqueous medium used for emulsifying and/or dispersing the toner materials is not particularly limited and may be appropriately selected depending on the intended purpose. For example, the amount of the aqueous medium is preferably 50 parts by mass through 2,000 parts by mass, and more preferably from 100 parts by mass through 1,000 parts by mass, relative to 100 parts by mass of the toner materials. When the amount of the aqueous medium is less than 50 parts by mass, the dispersion state of the toner materials is poor and toner base particles having desired particle diameters may not be obtained. When the amount thereof is greater than 2,000 parts by mass, the production cost may become high.

When the oil phase including the toner materials is emulsified and/or dispersed, a disperser is preferably used for stabilizing dispersed elements, such as oil droplets to obtain desired shapes and make a particle size distribution sharp.

The disperser is not particularly limited and may be appropriately selected depending on the intended purpose. Examples thereof include a surfactant, a poorly water-soluble inorganic compound disperser, and a polymer-based protective colloid. The above-listed examples may be used alone or in combination. Among the above-listed examples, a surfactant is preferable.

The surfactant is not particularly limited and may be appropriately selected depending on the intended purpose. For example, an anionic surfactant, a cationic surfactant, a nonionic surfactant, or an amphoteric surfactant may be used. Examples of the anionic surfactant include alkyl benzene sulfonic acid salt, α-olefin sulfonic acid salt, and phosphoric acid ester. Among the above-listed examples, a surfactant including a fluoroalkyl group is preferable.

—Removal of Organic Solvent—

A method for removing the organic solvent from the dispersion liquid, such as the emulsified slurry, is not particularly limited and may be appropriately selected depending on the intended purpose. Examples thereof include: a method where the entire reaction system is gradually heated to evaporate the organic solvent inside the oil droplets; and a method where spraying the dispersion liquid in a dry atmosphere to remove the organic solvent in the oil droplets.

Once the organic solvent is removed, composite particles are formed.

<Removing Step>

The removing step is a step including removing at least part of the resin particles, and preferably removing part of or all of the shell resin (resin (b1)) of the resin particles.

Examples of the step including removing at least part of the resin particles include a washing step including washing the composite particles. Therefore, the removing step can be also referred to as a washing step.

Examples of a method for removing part or all of the resin (b1) in the washing step include a method where part of or all of the resin (b1) is removed by a chemical method.

Examples of the chemical method include a step for washing the composite particles with a basic aqueous solution. Part or all of the shell resin (b1) can be dissolved by washing the composite particles with the basic aqueous solution.

The basic aqueous solution is not particularly limited as long as the aqueous solution is basic, and may be appropriately selected depending on the intended purpose. Examples thereof include an aqueous solution of hydroxide of alkali metal, such as potassium hydroxide, and sodium hydroxide, and ammonia. The above-listed examples may be used alone or in combination.

Among the above-listed examples, potassium hydroxide and sodium hydroxide are preferable as the shell resin (b1) is easily dissolved.

The pH of the basic aqueous solution is preferably from 8 through 14, and more preferably from 10 through 12.

Mixing the composite particles and the alkali aqueous solution in the washing step can be performed by a method where the basic aqueous solution is added to the composite slurry by dripping with stirring.

After dripping the basic aqueous solution, an acid aqueous solution may be added by dripping to neutralize.

<Other Steps>

The above-mentioned other steps are not particularly limited and may be appropriately selected depending on the intended purpose. Examples thereof include a drying step and a classifying step.

The drying step is not particularly limited as long as the drying step can remove the solvent from the composite particles, and may be appropriately selected depending on the intended purpose.

The classifying step may be performed by removing the fine particle component by cyclon in a liquid, a decanter, or centrifugation. Alternatively, an operation of the classification may be performed after drying.

The obtained composite particles may be mixed with particles of the external additives, or the charge controlling agent. As mechanical impact is applied, the particles of the external additives etc., are prevented from being detached from surfaces of the toner base particles.

A method for applying the mechanical impact is not particularly limited and may be appropriately selected depending on the intended purpose. Examples thereof include: a method for applying impact force to the mixture using a blade rotated at high speed; and a method where the mixture is added to a high-speed air flow to accelerate the particles to make the particles crush to each other or make the particles crush into an appropriate impact board.

A device used for the above-mentioned method is not particularly limited and may be appropriately selected depending on the intended purpose. Examples thereof include an angmill (available from HOSOKAWA MICRON CORPORATION), a device obtained by modifying an I-type mill (available from Nippon Pneumatic Mfg. Co., Ltd.), a hybridization system (available from NARA MACHINERY CO., LTD.), Kryptron System (available from Kawasaki Heavy Industries, Ltd.), and an automatic mortar.

(Toner Storage Unit)

A toner storage unit of the present disclosure is a unit that has a function of storing a toner, and stores the toner therein. Exemplified embodiments of the toner storage unit include a toner storage container, a developing device, and a process cartridge.

The toner storage container is a container in which a toner is stored.

The developing device is a device including a unit configured to store a toner and develop.

The process cartridge includes at least an image bearer and a developing unit as an integrated body, stores the toner therein, and is detachably mounted in an image forming apparatus. The process cartridge may further include at least one selected from the group consisting a charging unit, an exposing unit, and a cleaning unit.

When image formation is performed with mounting the toner storage unit of the present disclosure in an image forming apparatus, an image is formed with the toner of the present disclosure. Therefore, both low temperature fixability and heat resistant storage stability are achieved, and a cleaning member or photoconductor is prevented from contamination while maintaining excellent cleaning performance.

Figure 4:
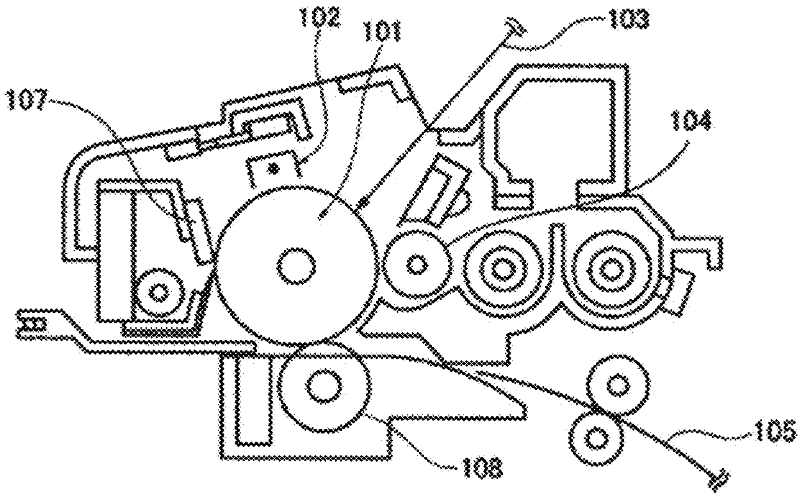
FIG. 4 is a schematic view illustrating an example of the process cartridge of the present disclosure.

Next, an embodiment of the process cartridge is illustrated in FIG. 4. As illustrated in FIG. 4, the process cartridge of the present disclosure includes a latent image bearer 101 therein, and includes a charging device 102, a developing device 104, and a cleaning unit 107. The process cartridge may further include other units according to the necessity. In FIG. 4, the numeral reference 103 is exposure light emitted from an exposing device, and the numeral reference 105 is recording paper.

As the latent image bearer 101, a latent image bearer identical to an electrostatic latent image bearer in the below-described image forming apparatus may be used. Moreover, an arbitrary charging member is used as the charging device 102.

In the image forming process using the process cartridge illustrated in FIG. 4, the latent image bearer 101 is charged by the charging device 102 with rotating in the direction indicated with the arrow in FIG. 4, and exposed to light 103 by the exposing unit (not illustrated) to form an electrostatic latent image corresponding to the exposure image on the surface of the latent image bearer.

The electrostatic latent image is developed with the toner by the developing device 104, and the developed toner image is transferred to recording paper 105 by the transfer roller 108, followed by outputting. Subsequently, the surface of the latent image bearer after the image transfer is cleaned by the cleaning unit 107, and the charge is eliminated by the charge-eliminating unit (not illustrated). Then, the above-described operations are again repeated.

(Image Forming Apparatus and Image Forming Method)

The image forming apparatus of the present disclosure includes an electrostatic latent image bearer, an electrostatic latent image forming unit, a developing unit, a transferring unit, a fixing unit, and a cleaning unit. The image forming apparatus may further include the above-described toner storage unit, and may further include other units according to the necessity.

The image forming method of the present disclosure include an electrostatic latent image forming step, a developing step, a transferring step, a fixing step, and a cleaning step. The image forming method may further include other steps according to the necessity.

<Electrostatic Latent Image Bearer>

A material, structure, and size of the electrostatic latent image bearer (may be also referred to as a photoconductor) are not particularly limited and may be appropriately selected from those known in the art. Examples of the material of the electrostatic latent image bearer include: inorganic photoconductors, such as amorphous silicon and selenium; and organic photoconductors, such as polysilane and phthalopolymethine. Among the above-listed examples, amorphous silicon is preferable considering long service life.

The linear speed of the electrostatic latent image bearer is preferably 300 mm/s or greater.

<Electrostatic Latent Image Forming Unit and Electrostatic Latent Image Forming Step>

The electrostatic latent image forming unit is not particularly limited as long as the electrostatic latent image forming unit is a unit configured to form an electrostatic latent image on the electrostatic latent image bearer, and may be appropriately selected depending on the intended purpose. Examples thereof include a unit including a charging member configured to charge a surface of the electrostatic latent image bearer and an exposure member configured to expose the surface of the electrostatic latent image bearer to light imagewise.

The electrostatic latent image forming step is not particularly limited as long as the electrostatic latent image forming step is a step for forming an electrostatic latent image on the electrostatic latent image bearer, and may be appropriately selected depending on the intended purpose. For example, the electrostatic latent image forming step can be performed by charging a surface of the electrostatic latent image bearer, followed by exposing the charged surface of the electrostatic latent image bearer to light imagewise. The electrostatic latent image forming step can be performed by the electrostatic latent image forming unit.

—Charging Member and Charging—

The charging member is not particularly limited and may be appropriately selected depending on the intended purpose. Examples of the charging member include contact chargers, known in the art themselves, each equipped with a conductive or semiconductive roller, brush, film, or rubber blade, and non-contact chargers utilizing corona discharge, such as corotron, and scorotron.

For example, the charging can be performed by applying voltage to the surface of the electrostatic latent image bearer using the charging member.

A form of the charging member may be any shape, such as a magnetic brush and a fur brush, other than a roller. The form thereof may be selected depending on specifications or an embodiment of the image forming apparatus.

The charging member is not limited to the contact charger, but the contact charger is preferably used because an image forming apparatus which discharge a reduced amount of ozone generated from the charging member can be obtained.

<<Exposing Member and Exposing>>

The exposing member is not particularly limited as long as the exposing member is a member capable of exposing the surface of the electrostatic latent image bearer, which has been charged by the charging member, to imagewise light corresponding to an image to be formed, and may be appropriately selected depending on the intended purpose. Examples thereof include various exposing members, such as copy optical exposing members, rod lens array exposing members, laser optical exposing members, and liquid crystal shutter optical exposing members.

A light source used for the exposing member is not particularly limited and may be appropriately selected depending on the intended purpose. Examples thereof include most of light emitters, such as a fluorescent lamp, a tungsten lamp, a halogen lamp, a mercury lamp, a sodium vapor lamp, a light emitting diode (LED), a semiconductor laser (LD), and an electroluminescent light (EL).

In order to apply only light having a desired wavelength range, various filters, such as a sharp-cut filter, a band-pass filter, a near infrared ray-cut filter, a dichroic filter, an interference filter, and a color temperature conversion filter, may be used.

For example, the exposing may be performed by exposing the surface of the electrostatic latent image bearer to imagewise light using the exposing member.

In the present disclosure, a back-exposure system may be employed. The back-exposure system is a system where imagewise exposing is performed from the back side of the electrostatic latent image bearer.

<Developing Unit and Developing Step>

The developing unit is not particularly limited as long as the developing unit is a unit configured to develop the electrostatic latent image formed on the electrostatic latent image bearer with the toner to form a toner image, which is a visible image. The developing unit may be appropriately selected depending on the intended purpose.

The developing step is not particularly limited as long as the developing step is a step including developing the electrostatic latent image formed on the electrostatic latent image bearer with the toner to form a toner image, which is a visible image. The developing step may be appropriately selected depending on the intended purpose. For example, the developing step may be performed by the developing unit.

The developing unit is preferably a developing device including a stirrer configured to stir the toner to charge the toner with friction, and a developer bearer, inside of which a magnetic field generating unit is disposed and fixed, where the developer bearer is configured to bear a developer including the toner on a surface thereof, and is rotatable.

<Transferring Unit and Transferring Step>

The transferring unit is not particularly limited as long as the transferring unit is a unit configured to transfer a visible image to a recording medium. The transferring unit may be appropriately selected depending on the intended purpose. For example, a preferable embodiment of the transferring unit is a transferring unit including a primary transferring unit configured to transfer visible images onto an intermediate transfer member to form a composite transfer image, and a secondary transferring unit configured to transfer the composite transfer image onto a recording medium.

The transferring step is not particularly limited as long as the transferring step is a step including transferring a visible image to a recording medium. The transferring step may be appropriately selected depending on the intended purpose. For example, a preferable embodiment of the transferring step is a transferring step, which uses an intermediate transfer member, and includes primary transferring visible images onto the intermediate transfer member, followed by secondary transferring the visible images onto the recording medium.

For example, the transferring step can be performed by charging the photoconductor with a transfer charger to charge the visible image. The transferring step may be performed by the transferring unit.

When an image secondary transferred to the recording medium is a color image formed of two or more color toners, images of respective color toners are sequentially superimposed onto the intermediate transfer member by the transferring unit to form a composite image on the intermediate transfer member, and the composite image on the intermediate transfer member is collectively secondary transferred onto the recording medium by the intermediate transferring unit.

The intermediate transfer member is not particularly limited and may be appropriately selected from transfer members known in the art depending on the intended purpose. Preferable examples thereof include a transfer belt.

The transferring unit (the primary transferring unit, the secondary transferring unit) preferably includes at least a transferor configured to charge the visible image formed on the photoconductor to release the visible image to the side of the recording medium. Examples of the transferor include a corona transferor using corona discharge, a transfer belt, a transfer roller, a pressure transfer roller, and an adhesion transferor.

The recording medium is typically plane paper, and the recording medium is not particularly limited as long as the recording medium is a medium to which an unfixed image after developing can be transferred. The recording medium may be appropriately selected depending on the intended purpose. A PET base for OHP may be also used as the recording medium.

<Fixing Unit and Fixing Step>

The fixing unit is not particularly limited as long as the fixing unit is a unit configured to fix the transfer image transferred onto the recording medium. The fixing unit may be appropriately selected depending on the intended purpose. For example, the fixing unit is preferably a known heat press member. Examples of the heat press member include a combination of a heating roller and a press roller, and a combination of a heating roller, a press roller, and an endless belt.

The fixing step is not particularly limited as long as the fixing step is a step including fixing the visible image transferred onto the recording medium. The fixing step may be appropriately selected depending on the intended purpose. For example, the fixing step may be performed every time an image of each color toner is transferred to the recording medium, or may be performed once when images of respective color toners are laminated on the recording medium.

The fixing step may be performed by the fixing unit.

Heating performed by the heat press member is preferably at a temperature from 80° C. through 200° C.

In the present disclosure, for example, a known optical fixing device may be used in combination with or instead of the fixing unit according to the intended purpose.

The surface pressure during the fixing step is not particularly limited and may be appropriately selected depending on the intended purpose. The surface pressure is preferably from 10 $N/cm^2$ through 80 $N/cm^2$.

<Cleaning Unit and Cleaning Step>

The cleaning unit is not particularly limited as long as the cleaning unit is capable of removing the toner remained on the photoconductor, and may be appropriately selected depending on the intended purpose. Examples of the cleaning unit include a magnetic brush cleaner, an electrostatic brush cleaner, a magnetic roller cleaner, a blade cleaner, a brush cleaner, and a web cleaner.

The cleaning step is not particularly limited as long as the cleaning step is a step capable of removing the toner remained on the photoconductor, and may be appropriately selected depending on the intended purpose. For example, the cleaning step can be performed by the cleaning unit.

<Other Units and Other Steps>

Examples of the above-mentioned other units include a charge-eliminating unit, a recycling unit, and a controlling unit.

Examples of the above-mentioned other steps include a charge-eliminating step, a recycling step, and a controlling step.

—Charge-Eliminating Unit and Charge-Eliminating Step—

The charge-eliminating unit is not particularly limited as long as the charge-eliminating unit is a unit configured to apply charge-eliminating bias to the photoconductor to eliminate the charge of the photoconductor. The charge-eliminating unit may be appropriately selected depending on the intended purpose. Examples of the charge-eliminating unit include a charge-eliminating lamp.

The charge-eliminating step is not particularly limited as long as the charge-eliminating step is a step including applying charge-eliminating bias to the photoconductor to eliminate the charge of the photoconductor. The charge-eliminating step may be appropriately selected depending on the intended purpose. For example, the charge-eliminating step may be performed by the charge-eliminating unit.

—Recycling Unit and Recycling Step—

The recycling unit is not particularly limited as long as the recycling unit is a unit configured to recycle the toner removed by the cleaning step to the developing device. The recycling unit may be appropriately selected depending on the intended purpose. Examples of the recycling unit include a known conveying unit.

The recycling step is not particularly limited as long as the recycling step is a step including recycling the toner removed by the cleaning step to the developing device. The recycling step may be appropriately selected depending on the intended purpose. For example, the recycling step may be performed by the recycling unit.

<Example of Image Forming Apparatus>

Next, one embodiment for carrying out a method for forming an image by the image forming apparatus of the present disclosure will be described with reference to FIG. 5. A printer is illustrated as an example of the image forming apparatus of the present embodiment, but the image forming apparatus is not particularly limited as long as the image forming apparatus is an apparatus capable of forming an image with a toner, such as a photocopier, a facsimile, and a multifunction peripheral.

The image forming apparatus includes a paper feeding unit 210, a conveying unit 220, an image formation unit 230, a transferring unit 240, and a fixing unit 250.

The paper feeding unit 210 includes a paper feeding cassette 211 loaded with paper P to be fed, and a paper feeding roller 212 configured to feed paper P in the paper feeding cassette 211 one by one.

The conveying unit 220 includes a roller 221 configured to transport the paper P fed by the paper feeding roller 212 towards the transferring unit 240, a pair of timing rollers 222 configured to nip the edge of the paper P transported by the roller 221 to stand-by and send the paper to the transferring unit 240 at the predetermined timing, and a paper ejection roller 223 configured to discharge the paper P on which a color toner image is fixed to the paper ejection tray 224.

Figure 5:
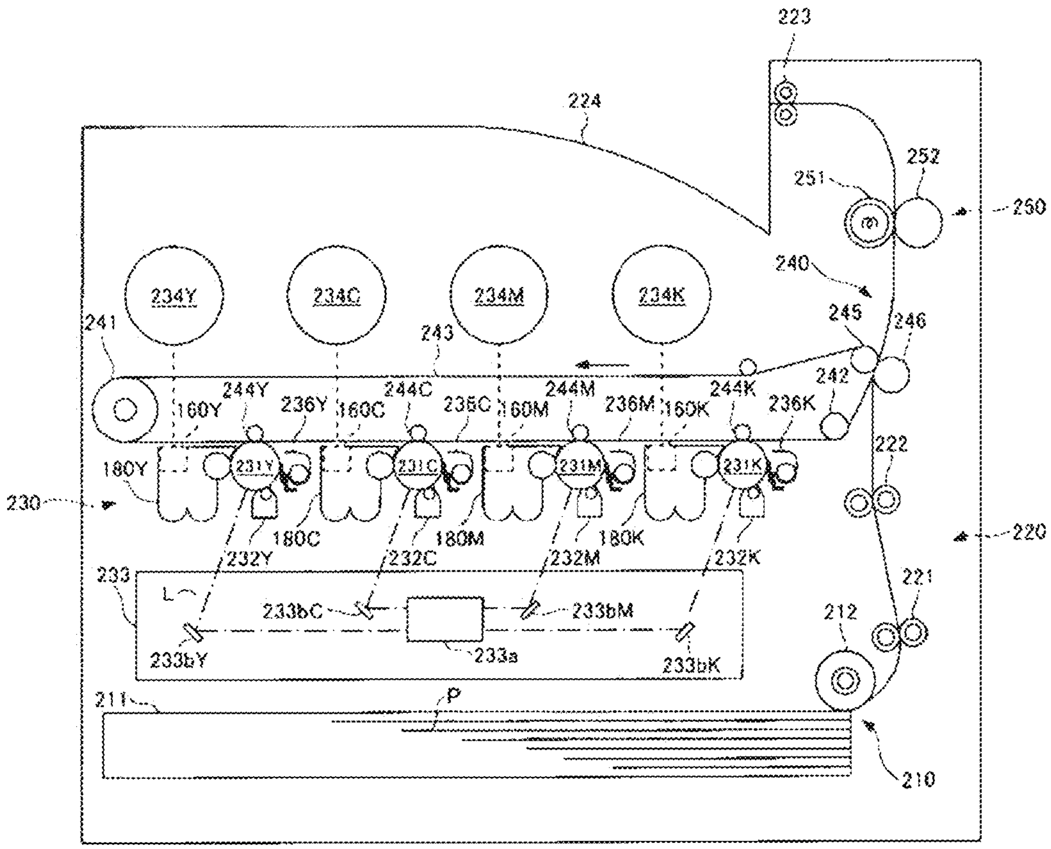
FIG. 5 is a schematic view illustrating an example of the image forming apparatus of the present disclosure.

The image formation unit 230 includes an image formation unit Y configured to form an image using a developer including a yellow toner, an image formation unit C using a developer including a cyan toner, an image formation unit M using a developer including a magenta toner, and an image formation unit K using a developer including a toner, which are disposed in this order from left to right in FIG. 5 with the predetermined gap between the image formation units next to one another, and an exposure unit 233.

When an arbitrary image formation unit is described among the image formation units (Y, C, M, K), it is simply referred to as an image formation unit.

Moreover, the developer includes a toner and a carrier. The four image formation units (Y, C, M, and K) have identical mechanical structures, expect that a developer for use is different.

The image formation units (Y, C, M, and K) are disposed to be rotatable in the clockwise direction in FIG. 5. Each image formation unit includes a photoconductor drum (231Y, 231C, 231M, or 231K), on which an electrostatic latent image and a toner image are formed, a charger (232Y, 232C, 232M, or 232K) configured to uniformly charge a surface of the photoconductor drum (231Y, 231C, 231M, or 231K), a developing device (180Y, 180C, 180M, or 180K) confirmed to develop the electrostatic latent image formed on the surface of the photoconductor drum (231Y, 231C, 231M, or 231K) by an exposing unit 233 with a toner of each color to form a toner image, and a cleaning unit (236Y, 236C, 236M, or 236K) configured to remove the toner remained on the surface of the photoconductor drum (231Y, 231C, 231M, or 231K).

Moreover, the image formation unit (Y, C, M, or K) further includes a toner cartridge (234Y, 234C, 234M, or 234K), in which a toner of each color is stored, and a sub hopper (160Y, 160C, 160M, or 160K) configured to feed the toner supplied from the toner cartridge (234Y, 234C, 234M, or 234K) for replenishment.

The toner stored in the toner cartridge 234 is discharged by a suction pump and is supplied to the sub hopper 160 via a supply channel. The sub hopper 160 is configured to convey the toner supplied from the toner cartridge 234 to feed the toner to the developing device 180. The developing device 180 is configured to develop the electrostatic latent image formed on the photoconductor drum 231 using the toner fed by the sub hopper 160.

The exposing unit 233 is configured to reflect laser light L emitted from the light source 233*a* based on the image information with a polygon mirror 233*b* (233*b*Y, 233*b*C, 233*b*M, or 233*b*K), which is driven to rotate by a motor, to irradiate the photoconductor drum (231Y, 231C, 231M, or 231K) with the reflected laser light L.

The transferring unit 240 includes a driving roller 241 and a driven roller 242, an intermediate transfer belt 243 rotatable in the anti-clock direction in FIG. 5 along the movement of the driving roller 241, primary transfer rollers (244Y, 244C, 244M, and 244K) disposed to face the photoconductor drum 231 via the intermediate transfer belt 243, and a secondary counter roller 245 and a secondary transfer roller 246 disposed to face each other via the intermediate transfer belt 243 at the transfer position of the toner image to paper.

The fixing unit 250 includes a press roller 252, which includes a heater therein, and is configured to rotatably press a fixing belt 251 to form a nip, where the fixing belt 251 is configured to heat the paper P. Owing to the fixing unit, heat and pressure are applied to the color toner image on the paper P to fix the color toner image. The paper P, on which the color toner image has been fixed, is ejected to the paper ejection tray 224 by the paper ejection roller 223, to thereby complete a series of image formation processes.

EXAMPLES

The present disclosure will be described below by way of Examples, but should not be construed as being limited to these Examples in any way.

Production Example 1

[Production of Resin Particle (A) Aqueous Dispersion Liquid (W0-1)]

A reaction vessel equipped with a stirrer, a heating and cooling device, and a thermometer was charged with 3,710 parts by mass of water and 200 parts by mass of polyoxyethylene-1-(allyloxymethyl) alkyl ether ammonium sulfate (HITENOL KH-1025, available from DKS Co., Ltd.), and the resultant mixture was stirred at 200 rpm to homogenize the mixture. The homogenized mixture was heated to increase the internal system temperature to 75° C. Thereafter, 90 parts by mass of a 10% by mass ammonium persulfate aqueous solution was added, followed by adding a mixture including 450 parts by mass of styrene, 250 parts by mass of butyl acrylate, and 300 parts by mass of methacrylic acid by dripping over 4 hours.

After the dripping, the resultant was matured at 75° C. for 4 hours, to thereby obtain Particle Dispersion Liquid (W0-1) including particles of Resin (a1-1) that was a polymer obtained by copolymerizing the monomers and polyoxyethylene-1-(allyloxymethyl) alkyl ether ammonium sulfate.

The volume average particle diameter of the particles in Particle Dispersion Liquid (W0-1) was measured by dynamic light scattering (electrophoretic light scattering photospectrometer ELS-8000, available from Otsuka Electronics Co., Ltd.), and the result was 15 nm.

Moreover, part of Particle Dispersion Liquid (W0-1) was dried to separate Resin (a1-1). The resin component had a glass transition temperature (TgA) of 75° C., and an acid value of 195 mgKOH/g.

Production Example 2

[Production of Resin Particle (A) Aqueous Dispersion Liquid (W0-2)]

A reaction vessel equipped with a stirrer, a heating and cooling device, and a thermometer was charged with 3,760 parts by mass of water and 150 parts by mass of polyoxyethylene-1-(allyloxymethyl) alkyl ether ammonium sulfate (HITENOL KH-1025, available from DKS Co., Ltd.), and the resultant mixture was stirred at 200 rpm to homogenize the mixture. The homogenized mixture was heated to increase the internal system temperature to 75° C. Thereafter, 90 parts by mass of a 10% by mass ammonium persulfate aqueous solution was added, followed by adding a mixture including 430 parts by mass of styrene, 270 parts by mass of butyl acrylate, and 300 parts by mass of methacrylic acid by dripping over 4 hours.

After the dripping, the resultant was matured at 75° C. for 4 hours, to thereby obtain Particle Dispersion Liquid (W0-2) including particles of Resin (a2-1) that was a polymer obtained by copolymerizing the monomers and polyoxyethylene-1-(allyloxymethyl) alkyl ether ammonium sulfate.

The volume average particle diameter of the particles in Particle Dispersion Liquid (W0-2) was measured in the same manner as in Production Example 1, and the result was 30 nm.

Moreover, part of Particle Dispersion Liquid (W0-2) was dried to separate Resin (a2-1). The resin component had a glass transition temperature (TgA) of 85° C., and an acid value of 195 mgKOH/g.

Production Example 3

[Production of Resin Particle (A) Queous Dispersion Liquid (W0-3)]

A reaction vessel equipped with a stirrer, a heating and cooling device, and a thermometer was charged with 3,810 parts by mass of water and 100 parts by mass of polyoxyethylene-1-(allyloxymethyl) alkyl ether ammonium sulfate (HITENOL KH-1025, available from DKS Co., Ltd.), and the resultant mixture was stirred at 200 rpm to homogenize the mixture. The homogenized mixture was heated to increase the internal system temperature to 75° C. Thereafter, 90 parts by mass of a 10% by mass ammonium persulfate aqueous solution was added, followed by adding a mixture including 400 parts by mass of styrene, 300 parts by mass of butyl acrylate, and 300 parts by mass of methacrylic acid by dripping over 4 hours.

After the dripping, the resultant was matured at 75° C. for 4 hours, to thereby obtain Particle Dispersion Liquid (W0-3) including particles of Resin (a3-1) that was a polymer obtained by copolymerizing the monomers and polyoxyethylene-1-(allyloxymethyl) alkyl ether ammonium sulfate.

The volume average particle diameter of the particles in Particle Dispersion Liquid (W0-3) was measured in the same manner as in Production Example 1, and the result was 45 nm.

Moreover, part of Particle Dispersion Liquid (W0-3) was dried to separate Resin (a3-1). The resin component had a glass transition temperature (TgA) of 65° C., and an acid value of 195 mgKOH/g.

The details of Resin Particle (A) Aqueous Dispersion Liquids (W0-1) to (W0-3) are summarized in Table 1.

TABLE 1

| | Aqueous Dispersion of Resin Particles (A) | | |
|---|---|---|---|
| Components (parts by mass) | WO-1 | WO-2 | WO-3 |
| Water | 3,710 | 3,760 | 3,810 |
| polyoxyethylene-1-(allyloxymethyl) alkyl ether ammonium sulfate | 200 | 150 | 100 |
| 10% by mass ammonium persulfate aqueous solution | 90 | 90 | 90 |
| Styrene | 450 | 430 | 400 |
| Butyl acrylate | 250 | 270 | 300 |
| Methacrylic acid | 300 | 300 | 300 |
| Volume average particle diameter (nm) | 15 | 30 | 45 |
| Glass transition temperature (° C.) | 75 | 85 | 65 |
| Acid value (mgKOH/g) | 195 | 195 | 195 |

Production Example 4

<Production of Resin Particle (A-1) Aqueous Dispersion Liquid (W-1)>

Next, a reaction vessel equipped with a stirrer, a heating and cooling device, and a thermometer was charged with 667 parts by mass of Aqueous Dispersion Liquid (W0-1) of Resin Particles (A), and 248 parts by mass of water. To the resultant mixture, 0.267 parts by mass of tert-butyl hydroperoxide (PERBUTYL H, available from NOF CORPORATION) was added, and the resultant mixture was heated to increase the internal system temperature to 70° C. Thereafter, a mixture including 43.3 parts by mass of styrene, 23.3 parts by mass of butyl acrylate, and 18.0 parts by mass of a 1% by mass ascorbic acid aqueous solution was added by dripping over 2 hours.

After dripping, the resultant was matured at 70° C. for 4 hours, to thereby obtain Aqueous Dispersion Liquid (W-1) of Resin Particles (A-1) including, in each particle as constitutional components, Resin (a1-1) and Resin (a1-2) that was a polymer obtained by copolymerizing the monomers with the resin particles in (W0-1) as seeds.

The volume average particle diameter of Resin Particles (A-1) was measured in the same manner as in Production Example 1, and the result was 17.3 nm.

Resin Particle (A-1) Aqueous Dispersion Liquid (W-1) was neutralized with a 10% by mass ammonia aqueous solution to pH 9.0. Thereafter, the resultant was subjected to centrifugal separation, and the obtained sediments were dried to separate Resin (a1-2). The glass transition temperature (Tg) of the resin was 61° C.

Whether or not Aqueous Dispersion Liquid (W-1) included Resin Particles (A-1), each of which included, as constitutional components, Resin (a1-1) and Resin (a1-2) per particle was confirmed in the following manner.

Specifically, 2 parts by mass of gelatin (Cook Gelatin, available from MORINAGA & CO., LTD.) was added to and dissolved in 15 parts by mass of water heated to a temperature of from 95° C. through 100° C. To the gelatin aqueous solution air-cooled to 40° C., Resin Particle (A-1) Aqueous Dispersion Liquid (W-1) was blended at a mass ratio of 1:1. After sufficiently stirring the resultant mixture, the mixture was cooled at 10° C. for 1 hour to set and form a gel.

The gel was cut by means of ultramicrotome (Ultramicrotome UC7, FC7, available from Leica Microsystems) with controlling a temperature to −80° C. to produce a cut piece having a thickness of 80 nm. Then, the cut piece was phase-dyed in a 2% ruthenium tetroxide aqueous solution for 5 minutes. The dyed cut piece was observed under transmission electron microscope (H-7100, available from Hitachi High-Tech Corporation) to confirm the presence of Resin (a1-1) and Resin (a1-2).

Production Example 5

<Production of Resin Particle (A-2) Aqueous Dispersion Liquid (W-2)>

Next, a reaction vessel equipped with a stirrer, a heating and cooling device, and a thermometer was charged with 667 parts by mass of Resin Particle (A) Aqueous Dispersion Liquid (W0-2), and 248 parts by mass of water. To the resultant mixture, 0.267 parts by mass of tert-butyl hydroperoxide (PERBUTYL H, available from NOF CORPORATION) was added, and the resultant mixture was heated to increase the internal system temperature to 70° C. Thereafter, a mixture including 43.3 parts by mass of styrene, 23.3 parts by mass of butyl acrylate, and 18.0 parts by mass of a 1% by mass ascorbic acid aqueous solution was added by dripping over 2 hours.

After dripping, the resultant was matured at 70° C. for 4 hours, to thereby obtain Aqueous Dispersion Liquid (W-2) of Resin Particles (A-2) including, in each particle as constitutional components, Resin (a2-1) and Resin (a2-2) that was a polymer obtained by copolymerizing the monomers with the resin particles in (W0-2) as seeds.

The volume average particle diameter of Resin Particles (A-2) was measured in the same manner as in Production Example 1, and the result was 34.3 nm.

Resin Particle (A-2) Aqueous Dispersion Liquid (W-2) was neutralized with a 10% by mass ammonia aqueous solution to pH 9.0. Thereafter, the resultant was subjected to centrifugal separation, and the obtained sediments were dried to separate Resin (a2-2). The glass transition temperature (Tg) of the resin was 69° C.

The fact that Aqueous Dispersion Liquid (W-2) included Resin Particles (A-2), each of which included, as constitutional components. Resin (a2-1) and Resin (a2-2) per particle was confirmed in the same manner as in Production Example 4.

Production Example 6

<Production of Resin Particle (A-3) Aqueous Dispersion Liquid (W-3)>

Next, a reaction vessel equipped with a stirrer, a heating and cooling device, and a thermometer was charged with 667 parts by mass of Resin Particle (A) Aqueous Dispersion Liquid (W0-3), and 248 parts by mass of water. To the resultant mixture, 0.267 parts by mass of tert-butyl hydroperoxide (PERBUTYL H, available from NOF CORPORATION) was added, and the resultant mixture was heated to increase the internal system temperature to 70° C. Thereafter, a mixture including 43.3 parts by mass of styrene, 23.3 parts by mass of butyl acrylate, and 18.0 parts by mass of a 1% by mass ascorbic acid aqueous solution was added by dripping over 2 hours.

After dripping, the resultant was matured at 70° C. for 4 hours, to thereby obtain Aqueous Dispersion Liquid (W-3) of Resin Particles (A-3) including, in each particle as constitutional components, Resin (a3-1) and Resin (a3-2) that was a polymer obtained by copolymerizing the monomers with the resin particles in (W0-3) as seeds. The volume average particle diameter of Resin Particles (A-3) was measured in the same manner as in Production Example 1, and the result was 51.5 nm.

Resin Particle (A-3) Aqueous Dispersion Liquid (W-3) was neutralized with a 10% by mass ammonia aqueous solution to pH 9.0. Thereafter, the resultant was subjected to centrifugal separation, and the obtained sediments were dried to separate Resin (a3-2). The glass transition temperature (Tg) of the resin was 55° C.

The fact that Aqueous Dispersion Liquid (W-3) included Resin Particles (A-3), each of which included, as constitutional components, Resin (a3-1) and Resin (a3-2) per particle was confirmed in the same manner as in Production Example 4.

The details of Resin Particles (A-1) to (A-3) are summarized in Table 2.

TABLE 2

| | Resin Particles No. | | |
|---|---|---|---|
| | A-1 | A-2 | A-3 |
| Particle Dispersion Liquid (type) | WO-1 | WO-2 | WO-3 |
| Particle Dispersion Liquid (parts by mass) | 667 | 667 | 667 |
| Water (parts by mass) | 248 | 248 | 248 |
| Tert-butyl hydroxyl peroxide (parts by mass) | 0.267 | 0.267 | 0.267 |
| Styrene (parts by mass) | 43.3 | 43.3 | 43.3 |
| Butyl acrylate (parts by mass) | 23.3 | 23.3 | 23.3 |
| 1% by mass ascorbic acid aqueous solution (parts by mass) | 18.0 | 18.0 | 18.0 |
| Volume average particle diameter (nm) | 17.3 | 34.3 | 51.5 |
| Tg (° C.) | 61 | 69 | 55 |

Production Example 7

<Synthesis of Noncrystalline Polyester Resin (b-1)>

A reaction vessel equipped with a cooling tube, a stirrer, and a nitrogen inlet tube was charged with 425 parts by mass of a bisphenol A PO (2 mol) adduct, 100 parts by mass of propylene glycol, 634 parts of a terephthalic acid propylene glycol (2 mol) adduct, and 0.5 parts by mass of titanium diisopropoxy bistriethanol aminate serving as a condensation catalyst, and the resultant mixture was allowed to react at 230° C. for 12 hours.

Subsequently, the resultant was allowed to react under the reduced pressure of from 10 mmHg through 15 mmHg.

The amount of the collected propylene glycol was 195 parts by mass.

After cooling to the resultant to 180° C., 30 parts by mass of trimellitic anhydride was added, and the mixture was allowed to react at 180° C. for 1 hour, followed by collecting the reaction product.

The collected resin as the reaction product was cooled to room temperature, to thereby obtain Noncrystalline Polyester (b-1). The resin component had a glass transition temperature (Tg) of 42° C., the number average molecular weight (Mn) of 2,400, the weight average molecular weight (Mw) of 5,400, a hydroxyl value of 32 mgKOH/g, and an acid value of 18 mgKOH/g.

Production Example 8

<Production of Colorant Dispersion Liquid>

A reaction vessel equipped with a cooling tube, a stirrer, and a nitrogen inlet tube was charged with 557 parts by mass of propylene glycol, 569 parts by mass of dimethyl terephthalate, 184 parts by mass of adipic acid, and 3 parts by mass of tetrabutoxy titanate serving as a condensation catalyst. The resultant mixture was allowed to react at 180° C. for 8 hours under a nitrogen flow with removing generated methanol.

Subsequently, the resultant was allowed to react for 4 hours with gradually elevating the temperature up to 230° C. under a nitrogen flow with removing generated propylene glycol and water, followed by further reacting for 1 hour under the reduced pressure of from 0.007 MPa through 0.026 MPa.

The amount of the collected propylene glycol was 175 parts by mass.

Subsequently, the resultant was cooled to 180° C. To the resultant, 121 parts by mass of trimellitic anhydride was added, and the resultant mixture was allowed to react for 2 hours under ambient pressure in the sealed condition. Thereafter, the resultant was heated to 220° C. under the ambient pressure to react until a softening point was to be 180° C., to thereby obtain a polyester resin (number average molecular weight (Mn)=8,500).

A beaker was charged with 20 parts by mass of copper phthalocyanine, 4 parts by mass of a colorant dispersant (SOLSPERSE 28000, available from The Lubrizol Corporation), 20 parts by mass of the obtained polyester resin, and 56 parts by mass of ethyl acetate. The resultant mixture was stirred to homogeneously disperse, followed by finely dispersing the copper phthalocyanine by a bead mill, to thereby obtain [Colorant Dispersion Liquid].

The volume average particle diameter of the dispersed elements in obtained [Colorant Dispersion Liquid] was 0.2 μm.

Production Example 9

<Production of Modified Wax (d)>

A pressure resistant reaction vessel equipped with a stirrer, a heating and cooling device, a thermometer, and a dripping cylinder was charged with 454 parts by mass of xylene, and 150 parts by mass of low molecular weight polyethylene (SANWAX LEL-400, available from SANYO CHEMICAL, LTD.), and was purged with nitrogen. Thereafter, the resultant mixture was heated to 170° C. with stirring. At 170° C., a mixed solution including 595 parts by mass of styrene, 255 parts by mass of methyl methacrylate, 34 parts by mass of di-t-butyl peroxyhexahydroterephthalate, and 119 parts by mass of xylene was dripped over 3 hours. The resultant mixture was kept at 170° C. for 30 minutes.

Subsequently, xylene was removed from the mixture under the reduced pressure of 0.039 MPa, to thereby obtain Modified Wax (d).

The graft chain of Modified Wax (d) had the SP value of 10.35 $(cal/cm^3)^{1/2}$, and Modified Wax (d) had the number average molecular weight (Mn) of 1,900, the weight average molecular weight (Mw) of 5,200, and a glass transition temperature (Tg) of 57° C.

Production Example 10

<Production of Release Agent Dispersion Liquid>

A reaction vessel equipped with a cooling tube, a stirrer, a heating and cooling device, and a thermometer was charged with 10 parts by mass of paraffin wax (HNP-9, hydrocarbon-based wax, available from Nippon Seiro Co., Ltd.), 1 part by mass of Modified Wax (d), and 33 parts by mass of ethyl acetate, and the resultant mixture was heated to 78° C., and was stirred for 30 minutes at 78° C. Thereafter, the resultant was cooled to 30° C. over 1 hour to precipitate the paraffin wax as particles. The resultant was subjected to wet pulverization by means of ULTRA VISCOMILL (available from AIMEX CO., Ltd.), to thereby obtain [Release Agent Dispersion Liquid].

The volume average particle diameter of the wax particles in [Release Agent Dispersion Liquid] was 0.25 μm.

Production Example 11

<Production of Reactive Prepolymer (a2b-1)>

A reaction vessel equipped with a cooling tube, a stirrer, and a nitrogen inlet tube was charged with 3-methyl-1,5-pentanediol, isophthalic acid, adipic acid, and trimellitic anhydride together with titanium tetraisopropoxide (1,000 ppm relative to the resin component) in a manner that the molar ratio (OH/COOH) of hydroxyl groups to carboxyl groups was to be 1.5, the diol component was to be composed of 100 mol % of 3-methyl-1,5-pentanediol, the dicarboxylic acid component was to be composed of 40 mol % of isophthalic acid and 60 mol % of adipic acid, and the amount of the trimellitic anhydride was to be 1 mol % relative to the total monomers.

Thereafter, the resultant was heated to 200° C. for about 4 hours, subsequently the mixture was heated to 230° C. for 2 hours, and the reaction was continued until discharge of water was stopped.

Thereafter, the resultant was further reacted for 5 hours under the reduced pressure of from 10 mmHg through 15 mmHg, to thereby obtain [Intermediate Polyester C-1].

Next, a reaction vessel equipped with a cooling tube, a stirrer, and a nitrogen inlet tube was charged with [Intermediate Polyester C-1] and isophorone diisocyanate (IPDI) at the molar ratio (isocyanate groups of IPDI/hydroxyl groups of intermediate polyester) of 2.0. The resultant mixture was diluted with ethyl acetate to form a 50% ethyl acetate solution, followed by reacting at 100° C. for 5 hours, to thereby obtain [Reactive Prepolymer (a2b-1)].

Example 1

<Production of Composite Resin Particles (C-1)>

A beaker was charged with 165 parts by mass of ion exchanged water, a mixture including 5 parts by mass of Particle Dispersion Liquid (W-1) and 10 parts by mass of Particle Dispersion Liquid (W0-1), 1 part by mass of sodium carboxymethylcellulose, 26 parts by mass of sodium dodecyldiphenyl ether disulfonate aqueous solution (ELEMINOL MON-7, available from SANYO CHEMICAL, LTD.7), and 15 parts by mass of ethyl acetate. The resultant mixture was mixed to thereby obtain a dispersion liquid.

Subsequently, another beaker was charged with 71 parts by mass of Noncrystalline Polyester Resin (b-1), 40 parts by mass of [Colorant Dispersion Liquid], 39 parts by mass of [Release Agent Dispersion Liquid], and 54 parts by mass of ethyl acetate, and the resultant mixture was mixed. To the mixture, thereafter, 18 parts by mass of a solution of Reactive Prepolymer (a2b-1) and 0.3 parts by mass of isophoronediamine serving as a curing agent (β) were further added. The resultant mixture was mixed to thereby obtain a mixed liquid.

The entire amount of the mixed liquid was added to the previously prepared dispersion liquid, and the resultant was stirred for 2 minutes by means of TK Auto Homomixer, to thereby obtain a mixed liquid.

Subsequently, the obtained mixed liquid was transferred to a reaction vessel equipped with a stirrer and a thermometer, and ethyl acetate was removed from the mixed liquid at 50° C. until the concentration was to be 0.5% by mass or less to perform composite-particle processing, to thereby obtain an aqueous dispersion liquid of composite resin particles.

The composite resin particles included in the aqueous dispersion liquid of the composite resin particles were composite resin particles, in each of which particles including Resin Particles (A-1) were deposited on a surface of Resin Particle (B'-1) including Noncrystalline Polyester Resin (b-1) and Noncrystalline Polyurethane Resin (b-2) formed of a reaction product between Reactive Prepolymer (a2b-1) and isophoronediamine.

Whether the resin particles included in the aqueous dispersion liquid of the composite resin particles were Composite Resin Particles (C-1), in each of which particles including Resin Particles (A-1) were deposited on a surface of Resin Particle (B'-1) was confirmed by magnifying and observing the shapes of the particles included in the aqueous dispersion liquid of the composite resin particles under an electron microscope (scanning electron microscope: SU-8230, available from Hitachi High-Tech Corporation).

Next, sodium hydroxide was added to adjust the pH of the aqueous dispersion liquid of the composite resin particles to 12. The resultant was stirred for 1 hour by Three-one-motor. Thereafter, the resultant was subjected to centrifugal filtration, and ion-exchanged water was again added to the filtration cake to reslurry. Again, the resultant was subjected to centrifugal filtration, followed by reslurry. This process was repeated several time. Thereafter, the resultant was subjected to suction filtration with a membrane filter (may be referred to as a "washing and filtering step" hereinafter). The resultant was fried at 40° C. for 18 hours to reduce the volatile component to 0.5% by mass or less, to thereby obtain Composite Resin Particles (C-1).

Subsequently, to 100 parts by mass of Composite Resin Particles (C-1), 1.0 part by mass of colloidal silica (AEROSIL R972, available from NIPPON AEROSIL CO., LTD.) serving as external additives was added and mixed by means of a sample mill, to thereby obtain Toner (T-1) after the external additive treatment.

Example 2

<Production of Toner (T-2)>

An aqueous dispersion liquid of Composite Resin Particles (C-2), in each of which particles including Resin Particles (A-1) were deposited on a surface of Resin Particle (B'-1), was obtained in the same manner as in Example 1, except that 15 parts by mass of the mixed liquid including 5 parts by mass of Particle Dispersion Liquid (W-1) and 10 parts by mass of Particle Dispersion Liquid (W0-1) was replaced with 15 parts by mass of a mixed liquid including 7.5 parts by mass of Particle Dispersion Liquid (W-1) and 7.5 parts by mass of Particle Dispersion Liquid (W0-1).

Subsequently, a washing and filtering step was performed on the obtained aqueous dispersion liquid in the same manner as in Example 1, and the result was dried at 40° C. for 18 hours to reduce the volatile component to 0.5% by mass or less, to thereby obtain Composite Resin Particles (C-2).

Then, an external additive treatment was performed in the same manner as in Example 1, to thereby obtain Toner (T-2).

Example 3

<Production of Toner (T-3)>

An aqueous dispersion liquid of Composite Resin Particles (C-3), in each of which particles including Resin Particles (A-1) were deposited on a surface of Resin Particle (B'-1), was obtained in the same manner as in Example 1, except that 15 parts by mass of the mixed liquid including 5 parts by mass of Particle Dispersion Liquid (W-1) and 10 parts by mass of Particle Dispersion Liquid (W0-1) was replaced with 15 parts by mass of a mixed liquid including 10 parts by mass of Particle Dispersion Liquid (W-1) and 5 parts by mass of Particle Dispersion Liquid (W0-1).

Subsequently, a washing and filtering step was performed on the obtained aqueous dispersion liquid in the same manner as in Example 1, and the result was dried at 40° C. for 18 hours to reduce the volatile component to 0.5% by mass or less, to thereby obtain Composite Resin Particles (C-3).

Then, an external additive treatment was performed in the same manner as in Example 1, to thereby obtain Toner (T-3).

Example 4

<Production of Toner (T-4)>

An aqueous dispersion liquid of Composite Resin Particles (C-4), in each of which particles including Resin Particles (A-2) were deposited on a surface of Resin Particle (B'-1), was obtained in the same manner as in Example 1, except that 15 parts by mass of the mixed liquid including 5 parts by mass of Particle Dispersion Liquid (W-1) and 10 parts by mass of Particle Dispersion Liquid (W0-1) was replaced with 15 parts by mass of a mixed liquid including 5 parts by mass of Particle Dispersion Liquid (W-2) and 10 parts by mass of Particle Dispersion Liquid (W0-2).

Subsequently, a washing and filtering step was performed on the obtained aqueous dispersion liquid in the same manner as in Example1, and the result was dried at 40° C. for 18 hours to reduce the volatile component to 0.5% by mass or less, to thereby obtain Composite Resin Particles (C-4).

Then, an external additive treatment was performed in the same manner as in Example 1, to thereby obtain Toner (T-4).

Example 5

<Production of Toner (T-5)>

An aqueous dispersion liquid of Composite Resin Particles (C-5), in each of which particles including Resin Particles (A-2) were deposited on a surface of Resin Particle (B'-1), was obtained in the same manner as in Example 1, except that 15 parts by mass of the mixed liquid including 5 parts by mass of Particle Dispersion Liquid (W-1) and 10 parts by mass of Particle Dispersion Liquid (W0-1) was replaced with 15 parts by mass of a mixed liquid including 7.5 parts by mass of Particle Dispersion Liquid (W-2) and 7.5 parts by mass of Particle Dispersion Liquid (W0-2).

Subsequently, a washing and filtering step was performed on the obtained aqueous dispersion liquid in the same manner as in Example 1, and the result was dried at 40° C. for 18 hours to reduce the volatile component to 0.5% by mass or less, to thereby obtain Composite Resin Particles (C-5).

Then, an external additive treatment was performed in the same manner as in Example 1, to thereby obtain Toner (T-5).

Example 6

<Production of Toner (T-6)>

An aqueous dispersion liquid of Composite Resin Particles (C-6), in each of which particles including Resin Particles (A-2) were deposited on a surface of Resin Particle (B'-1), was obtained in the same manner as in Example 1, except that 15 parts by mass of the mixed liquid including 5 parts by mass of Particle Dispersion Liquid (W-1) and 10 parts by mass of Particle Dispersion Liquid (W0-1) was replaced with 15 parts by mass of a mixed liquid including 10 parts by mass of Particle Dispersion Liquid (W-2) and 5 parts by mass of Particle Dispersion Liquid (W0-2).

Subsequently, a washing and filtering step was performed on the obtained aqueous dispersion liquid in the same manner as in Example 1, and the result was dried at 40° C. for 18 hours to reduce the volatile component to 0.5% by mass or less, to thereby obtain Composite Resin Particles (C-6).

Then, an external additive treatment was performed in the same manner as in Example 1, to thereby obtain Toner (T-6).

Example 7

<Production of Toner (T-7)>

An aqueous dispersion liquid of Composite Resin Particles (C-7), in each of which particles including Resin Particles (A-3) were deposited on a surface of Resin Particle (B'-1), was obtained in the same manner as in Example 1, except that 15 parts by mass of the mixed liquid including 5 parts by mass of Particle Dispersion Liquid (W-1) and 10 parts by mass of Particle Dispersion Liquid (W0-1) was replaced with 15 parts by mass of a mixed liquid including 5 parts by mass of Particle Dispersion Liquid (W-3) and 10 parts by mass of Particle Dispersion Liquid (W0-3).

Subsequently, a washing and filtering step was performed on the obtained aqueous dispersion liquid in the same manner as in Example 1, and the result was dried at 40° C. for 18 hours to reduce the volatile component to 0.5% by mass or less, to thereby obtain Composite Resin Particles (C-7).

Then, an external additive treatment was performed in the same manner as in Example 1, to thereby obtain Toner (T-7).

Example 8

<Production of Toner (T-8)>

An aqueous dispersion liquid of Composite Resin Particles (C-8), in each of which particles including Resin Particles (A-3) were deposited on a surface of Resin Particle (B'-1), was obtained in the same manner as in Example 1, except that 15 parts by mass of the mixed liquid including 5 parts by mass of Particle Dispersion Liquid (W-1) and 10 parts by mass of Particle Dispersion Liquid (W0-1) was replaced with 15 parts by mass of a mixed liquid including 7.5 parts by mass of Particle Dispersion Liquid (W-3) and 7.5 parts by mass of Particle Dispersion Liquid (W0-3).

Subsequently, a washing and filtering step was performed on the obtained aqueous dispersion liquid in the same manner as in Example1, and the result was dried at 40° C. for 18 hours to reduce the volatile component to 0.5% by mass or less, to thereby obtain Composite Resin Particles (C-8).

Then, an external additive treatment was performed in the same manner as in Example 1, to thereby obtain Toner (T-8).

Example 9

<Production of Toner (T-9)>

An aqueous dispersion liquid of Composite Resin Particles (C-9), in each of which particles including Resin Particles (A-3) were deposited on a surface of Resin Particle (B'-1), was obtained in the same manner as in Example 1, except that 15 parts by mass of the mixed liquid including 5 parts by mass of Particle Dispersion Liquid (W-1) and 10 parts by mass of Particle Dispersion Liquid (W0-1) was replaced with 15 parts by mass of a mixed liquid including 10 parts by mass of Particle Dispersion Liquid (W-3) and 5 parts by mass of Particle Dispersion Liquid (W0-3).

Subsequently, a washing and filtering step was performed on the obtained aqueous dispersion liquid in the same manner as in Example 1, and the result was dried at 40° C. for 18 hours to reduce the volatile component to 0.5% by mass or less, to thereby obtain Composite Resin Particles (C-9).

Then, an external additive treatment was performed in the same manner as in Example 1, to thereby obtain Toner (T-9).

Example 10

<Production of Toner (T-10)>

An aqueous dispersion liquid of Composite Resin Particles (C-10), in each of which particles including Resin Particles (A-1) were deposited on a surface of Resin Particle (B'-1), was obtained in the same manner as in Example 1, except that the amount of the resin particles (coverage factor) was reduced.

Subsequently, a washing and filtering step was performed on the obtained aqueous dispersion liquid in the same manner as in Example 1, and the result was dried at 40° C. for 18 hours to reduce the volatile component to 0.5% by mass or less, to thereby obtain Composite Resin Particles (C-10).

Then, an external additive treatment was performed in the same manner as in Example 1, to thereby obtain Toner (T-10).

Example 11

<Production of Toner (T-11)>

An aqueous dispersion liquid of Composite Resin Particles (C-11), in each of which particles including Resin Particles (A-1) were deposited on a surface of Resin Particle (B'-1), was obtained in the same manner as in Example 1, except that the amount of the resin particles (coverage factor) was increased.

Subsequently, a washing and filtering step was performed on the obtained aqueous dispersion liquid in the same manner as in Example 1, and the result was dried at 40° C. for 18 hours to reduce the volatile component to 0.5% by mass or less, to thereby obtain Composite Resin Particles (C-11).

Then, an external additive treatment was performed in the same manner as in Example 1, to thereby obtain Toner (T-11).

Example 12

<Production of Toner (T-12)>

An aqueous dispersion liquid of Composite Resin Particles (C-12), in each of which particles including Resin Particles (A-1) were deposited on a surface of Resin Particle (B'-1), was obtained in the same manner as in Example 1, except that the amount of styrene was changed to 50.3 parts by mass in the production of Resin Particle (A-1) Aqueous Dispersion Liquid (W-1).

Subsequently, a washing and filtering step was performed on the obtained aqueous dispersion liquid in the same manner as in Example 1, and the result was dried at 40° C. for 18 hours to reduce the volatile component to 0.5% by mass or less, to thereby obtain Composite Resin Particles (C-12).

Then, an external additive treatment was performed in the same manner as in Example 1, to thereby obtain Toner (T-12).

Example 13

<Production of Toner (T-13)>

An aqueous dispersion liquid of Composite Resin Particles (C-13), in each of which particles including Resin Particles (A-1) were deposited on a surface of Resin Particle (B'-1), was obtained in the same manner as in Example 1, except that the amount of styrene was changed to 37.5 parts by mass in the production of Resin Particle (A-1) Aqueous Dispersion Liquid (W-1), and 15 parts by mass of the mixed liquid including 5 parts by mass of Particle Dispersion Liquid (W-1) and 10 parts by mass of Particle Dispersion Liquid (W0-1) was replaced with 20 parts by mass of a mixed liquid including 15 parts by mass of Particle Dispersion Liquid (W-1) and 5 parts by mass of Particle Dispersion Liquid (W0-1).

Subsequently, a washing and filtering step was performed on the obtained aqueous dispersion liquid in the same manner as in Example1, and the result was dried at 40° C. for 18 hours to reduce the volatile component to 0.5% by mass or less, to thereby obtain Composite Resin Particles (C-13).

Then, an external additive treatment was performed in the same manner as in Example 1, to thereby obtain Toner (T-13).

Example 14

<Production of Toner (T-14)>

An aqueous dispersion liquid of Composite Resin Particles (C-14), in each of which particles including Resin Particles (A-1) were deposited on a surface of Resin Particle (B'-1), was obtained in the same manner as in Example 1, except that the amount of styrene was changed to 50.5 parts by mass in the production of Resin Particle (A-1) Aqueous Dispersion Liquid (W-1), and 15 parts by mass of the mixed liquid including 5 parts by mass of Particle Dispersion Liquid (W-1) and 10 parts by mass of Particle Dispersion Liquid (W0-1) was replaced with 25 parts by mass of a mixed liquid including 5 parts by mass of Particle Dispersion Liquid (W-1) and 20 parts by mass of Particle Dispersion Liquid (W0-1).

Subsequently, a washing and filtering step was performed on the obtained aqueous dispersion liquid in the same manner as in Example1, and the result was dried at 40° C. for 18 hours to reduce the volatile component to 0.5% by mass or less, to thereby obtain Composite Resin Particles (C-14).

Then, an external additive treatment was performed in the same manner as in Example 1, to thereby obtain Toner (T-14).

Example 15

<Production of Toner (T-15)>

An aqueous dispersion liquid of Composite Resin Particles (C-15), in each of which particles including Resin Particles (A-1) were deposited on a surface of Resin Particle (B'-1), was obtained in the same manner as in Example 1, except that the amount of styrene was changed to 50.5 parts by mass in the production of Resin Particles (A-1) Aqueous Dispersion Liquid (W-1), and 15 parts by mass of the mixed liquid including 5 parts by mass of Particle Dispersion Liquid (W-1) and 10 parts by mass of Particle Dispersion Liquid (W0-1) was replaced with 30 parts by mass of a mixed liquid including 5 parts by mass of Particle Dispersion Liquid (W-1) and 25 parts by mass of Particle Dispersion Liquid (W0-1).

Subsequently, a washing and filtering step was performed on the obtained aqueous dispersion liquid in the same manner as in Example1, and the result was dried at 40° C. for 18 hours to reduce the volatile component to 0.5% by mass or less, to thereby obtain Composite Resin Particles (C-15).

Then, an external additive treatment was performed in the same manner as in Example 1, to thereby obtain Toner (T-15).

Example 16

<Production of Toner (T-16)>

An aqueous dispersion liquid of Composite Resin Particles (C-16), in each of which particles including Resin Particles (A-1) were deposited on a surface of Resin Particle (B'-1), was obtained in the same manner as in Example 1, except that the amount of the solution of Reactive Prepolymer (a2b-1) was changed to 3 parts by mass.

Subsequently, a washing and filtering step was performed on the obtained aqueous dispersion liquid in the same manner as in Example1, and the result was dried at 40° C. for 18 hours to reduce the volatile component to 0.5% by mass or less, to thereby obtain Composite Resin Particles (C-16).

Then, an external additive treatment was performed in the same manner as in Example 1, to thereby obtain Toner (T-16).

Comparative Example 1

<Production of Toner (T'-1)>

An aqueous dispersion liquid of Composite Resin Particles (C'-1), in each of which particles including Resin Particles (a2-1) were deposited on a surface of Resin Particle (B'-1), was obtained in the same manner as in Example 1, except that 15 parts by mass of the mixed liquid including 5 parts by mass of Particle Dispersion Liquid (W-1) and 10 parts by mass of Particle Dispersion Liquid (W0-1) was replaced with 15 parts by mass of Particle Dispersion Liquid (W0-2).

Subsequently, a washing and filtering step was performed on the obtained aqueous dispersion liquid in the same manner as in Example 1, and the result was dried at 40° C. for 18 hours to reduce the volatile component to 0.5% by mass or less, to thereby obtain Composite Resin Particles (C'-1).

Then, an external additive treatment was performed in the same manner as in Example 1, to thereby obtain Toner (T-1).

Comparative Example 2

<Production of Toner (T'-2)>

An aqueous dispersion liquid of Composite Resin Particles (C'-2), in each of which particles including Resin Particles (a2-1) were deposited on a surface of Resin Particle (B'-1), was obtained in the same manner as in Example 1, except that 15 parts by mass of the mixed liquid including 5 parts by mass of Particle Dispersion Liquid (W-1) and 10 parts by mass of Particle Dispersion Liquid (W0-1) was replaced with 15 parts by mass of Particle Dispersion Liquid (W0-2).

Subsequently, in the same manner as in Example 1, and the result was dried at 40° C. for 18 hours to reduce the volatile component to 0.5% by mass or less, to thereby obtain Composite Resin Particles (C'-2).

Then, an external additive treatment was performed in the same manner as in Example 1, to thereby obtain Toner (T'-2).

Comparative Example 3

<Production of Toner (T'-3)>

An aqueous dispersion liquid of Composite Resin Particles (C'-3), in each of which particles including Resin Particles (A-1) were deposited on a surface of Resin Particle (B'-1), was obtained in the same manner as in Example 1, except that 15 parts by mass of the mixed liquid including 5 parts by mass of Particle Dispersion Liquid (W-1) and 10 parts by mass of Particle Dispersion Liquid (W0-1) was replaced with 15 parts by mass of a mixed liquid including 3 parts by mass of Particle Dispersion Liquid (W-1) and 12 parts by mass of Particle Dispersion Liquid (W0-1).

Subsequently, a washing and filtering step was performed on the obtained aqueous dispersion liquid in the same manner as in Example 1, and the result was dried at 40° C. for 18 hours to reduce the volatile component to 0.5% by mass or less, to thereby obtain Composite Resin Particles (C'-3).

Then, an external additive treatment was performed in the same manner as in Example 1, to thereby obtain Toner (T'-3).

Comparative Example 4

<Production of Toner (T'-4)>

An aqueous dispersion liquid of Composite Resin Particles (C'-4), in each of which particles including Resin Particles (A-3) were deposited on a surface of Resin Particle (B'-1), was obtained in the same manner as in Example 1, except that 15 parts by mass of the mixed liquid including 5 parts by mass of Particle Dispersion Liquid (W-1) and 10 parts by mass of Particle Dispersion Liquid (W0-1) was replaced with 15 parts by mass of a mixed liquid including 2.5 parts by mass of Particle Dispersion Liquid (W-3) and 12.5 parts by mass of Particle Dispersion Liquid (W0-3).

Subsequently, a washing and filtering step was performed on the obtained aqueous dispersion liquid in the same manner as in Example1, and the result was dried at 40° C. for 18 hours to reduce the volatile component to 0.5% by mass or less, to thereby obtain Composite Resin Particles (C'-4).

Then, an external additive treatment was performed in the same manner as in Example 1, to thereby obtain Toner (T-4).

(Production of Carrier)

To 100 parts by mass of toluene, 100 parts by mass of a silicone resin (organo straight silicone), 5 parts by mass of γ-(2-aminoethyl)aminopropyltrimethoxy silane, and 10 parts by mass of carbon black were added, and the resultant mixture was dispersed by means of Homomixer for 20 minutes, to thereby prepare a resin layer coating liquid.

The resin layer coating liquid was applied onto surfaces of spherical magnetite particles (1,000 parts by mass) having the average particle diameter of 50 μm by means of a fluidized bed coater, to thereby produce [Carrier].

(Production of Developer)

Each [Toner] (5 parts by mass) and [Carrier] (95 parts by mass) were mixed by means of a ball mill, to thereby produce each [Developer].

(Measurements)

Next, Tg1st of each toner, Tga1st of the THF insoluble component of each toner, the distance between resin particles of each toner, storage elastic modulus of each toner, a glass transition temperature TgA of the shells of each toner, and a glass transition temperature TgB of cores of each toner were measured in the following manner. The results are presented in Tables 3 to 6.

<Measurement of Tg1st of Toner and Tga1st of THF Insoluble Component>

The toner (1 g) was added to 100 mL of THF, and the resultant was subjected to Soxhlet extraction to obtain a THF soluble component and a THF insoluble component. The obtained components were dried by a vacuum dryer for 24 hours to thereby obtain a polyester resin component A from the THF soluble component, and a polyester resin component C from the THF insoluble component. The polyester resin component A and polyester resin component C obtained were provided as measuring samples. Moreover, the toner was used as a measuring sample for the measurement of Tg1st of the toner. The polyester resin component A corresponded to Noncrystalline Polyester (b-1) mentioned above, and the polyester resin component C corresponded to Reactive Prepolymer (a2b-1) mentioned above.

Next, a sample container formed of aluminium was charged with 5.0 mg of the measurement sample, the sample container was placed on a holder unit, and the holder unit was set in an electric furnace. Then, sample was heated from −80° C. to 150° C. at the heating rate of 1.0° C./min in a nitrogen atmosphere (first heating). Then, the sample was cooled from 150° C. to −80° C. at the cooling rate of 10° C./min, followed by again heating to 150° C. at the heating rate of 10° C./min (second heating). DSC curves for the first heating and the second heating were each measured by means of a differential scanning calorimeter (Q-200, available from TA Instruments Inc.).

The DSC curve for the first heating was selected from the obtained DSC curves using an analysis program installed in the Q-200 system, and a glass transition temperature Tg1st of the sample at the first heating was determined.

Moreover, the THF insoluble component of the toner was heated from −80° C. to 150° C. at the heating rate of 1.0° C./min with a temperature modulation amplitude of 1.0° C./min using a modulation mode (first heating). Similarly to the above, a DSC curve was selected from the obtained DSC curves using the analysis program installed in the Q-200 system by plotting the reversing heat flow on the vertical axis. The onset value of the DSC curve was determined as Tg. In the manner as described, Tga1st was determined.

<Measurement of Distance Between Resin Particles>

Next, the external additives were removed from each of the obtained toners as much as possible by a liberation treatment using ultrasonic waves to make the toner particles in the state close to the toner base particles, and then the average value and standard deviation of the distance between resin particles were determined.

—Liberation Method of External Additives—

[1] A 100 mL screw vial was charged with 50 mL of a 5% by mass surfactant aqueous solution (product name: NOIGEN ET-165, available from DKS Co., Ltd.). To the solution, 3 g of the toner was added, and the vial was slowly agitated in up-down and left-right motions. Thereafter, the resultant was stirred by a ball mill for 30 minutes to homogeneously disperse the toner in the dispersion solution.

[2] Then, ultrasonic energy was applied to the resultant for 60 minutes by means of an ultrasonic homogenizer (product name: homogenizer, type: VCX750, CV33, available from Sonics & Materials, Inc.) with setting the output to 40 W.

[Ultrasonic Wave Conditions]

Vibration duration: continuous 60 minutes

Amplitude: 40 W

Vibration onset temperature: 23° C.±1.5° C.

Temperature during vibrations: 23° C.±1.5° C.

[3](1) The dispersion liquid was subjected to vacuum filtration with filter paper (product name: Quantitative filter paper (No. 2, 110 mm), available from Advantec Toyo Kaisha, Ltd.). The resultant was washed twice with ion-exchanged water, followed by performing filtration. After removing the free additives that had been detached from the toner particles, the toner particles were dried.

(2) The toner obtained in (1) was observed under scanning electron microscope (SEM). First, a backscattered electron image was observed to detect external additives and/or filler including Si.

(3) The image of (1) was binarized using image processing software (ImageJ), to eliminate the external additives and/or filler.

Next, the toner of the same location as (1) was observed to obtain a secondary electron image. The resin particles were not observed in the backscattered electron image, but were observed only in the secondary electron image. With reference to the image obtained in (3), therefore, the particles present in the region other than the residual external additives and fillers (other than the region excluded in (3)) were determined as the resin particles, and a distance between the resin particles (a distance between the center of one resin particle and the center of another resin particle present next to the one resin particle) was measured using the image processing software.

The measurement was performed on 100 binarized images (one toner particle per image) and an average of the measured values was determined as an average value of the distance between the resin particles.

The standard deviation of the distance between resin particles was calculated according to the following equation, where x was a distance between particles.

$$\sqrt{\frac{1}{n-1}\sum_{k=1}^{n}(x_i-\bar{x})}$$

Scanning electron microscope: SU-8230 (available from Hitachi High-Tech Corporation)

Image capturing magnification: 35,000 times

Captured image: secondary electron (SE(L)) image, backscattered electron (BSE) image Acceleration voltage: 2.0 kV Acceleration current: 1.0 ρA Probe current: Normal Focus mode: UHR WD: 8.0 mm <Measurement of Storage Elastic Modulus of Toner>

A pellet was produced in the following manner, and a storage elastic modulus of the toner was measured.

[Pellet Production Conditions]

As a measuring sample, a sample obtained by press molding the toner into a circular plate having a diameter of 8.0 mm±4:0.3 mm, and a thickness of 1.0 mm±0.3 mm by means of a pellet forming die in the environment of 25° C. was used.

[Measuring Conditions]

Rotational circular-disk rheometer: ARES-G2

Manufacturer: TA Instruments Inc.

The sample was set between parallel plates each having a diameter of 8.0 mm and was stabilized at 40° C. Thereafter, the sample was heated to 200° C. at the heating rate of 2.0° C./min at the frequency of 10 Hz (6.28 rad/s) with the strain amount of 0.1% (strain amount controlling mode).

<Glass Transition Temperature TgA of Shells and Glass Transition Temperature TgB of Cores>

As described above, part of Particle Dispersion Liquid (W0) was dried to separate Resin (a-1), and a glass transition temperature of the resin component was determined to determine a glass transition temperature TgA of shells.

Particle Dispersion Liquid (W0) was dried up to collect the resin particles. The shells of the resin particles were removed by using an organic solvent or heating to separate cores. Then, a glass transition temperature of only the cores was measured to determine a glass transition temperature TgB of the cores.

(Evaluations)

Next, Toners (T-1) to (T-16) and (T-1) to (T'-4), and the developers were subjected to the evaluations of "low temperature fixability," "heat resistant storage stability," "cleaning performance," and "contamination of blade and photoconductor" in the following manner. The results are presented in Tables 7 to 9.

<Low Temperature Fixability>

Each toner was uniformly applied onto a surface of paper at a deposition amount of 0.8 mg/cm$^2$. As a method for applying the toner, a printer from which a thermal fixing device had been removed, was used. Any other methods may be used as long as the toner can be uniformly deposited with the above-mentioned weight density. An onset temperature (minimum fixing temperature (MFT)) of cold offset was measured when the paper was passed through the press roller at the fixing speed (rim speed of the heat roller) of 213 mm/sec, and the fixing pressure (pressure of the press roller) of 10 kg/cm$^2$. The lower cold offset onset temperature means better low temperature fixability.

[Cold Offset Evaluation Criterial]

A: The minimum fixing temperature was 130° C. or lower

B: The minimum fixing temperature was higher than 130° C. but 135° C. or lower

C: The minimum fixing temperature was higher than 135° C. but 140° C. or lower

D: The minimum fixing temperature was higher than 140° C.

<Heat Resistant Storage Stability>

Each toner was stored at 50° C. for 8 hours. Thereafter, the toner was passed through a sieve of 42-mesh for 2 minutes, and the residual rate on the wire net was measured. Then, heat resistant storage stability of the toner was evaluated based on the following criteria. The lower residual rate means the better heat resistant storage stability of the toner.

[Evaluation Criteria]

A: The residual rate was less than 5%.

B: The residual rate was 5% or greater but less than 15%.

C: The residual rate was 15% or greater but less than 30%.

D: The residual rate was 30% or greater.

<Cleaning Performance (Photoconductor Smear)>

By means of an image forming apparatus (imageo MP C5002, available from Ricoh Company Limited), a chart having an imaging area rate of 5% was printed on 50,000 sheets (A4, landscape) at 3 prints/job in the laboratory environment of 21° C. and 65% RH. In the following manner, 50,000 sheets were output. Note that, the structure of the image forming apparatus was the structure as illustrated in FIG. 5.

Thereafter, as an evaluation image, a chart of a vertical band pattern (relative to the sheet feeding direction) including 3 bands each having a width of 43 mm was printed on 100 sheets (A4, landscape) in the laboratory environment of 32° C. and 54% RH. The obtained images were observed with naked eyes, and the cleaning performance was evaluated based on the presence or absence of image defects due to a cleaning failure according to the following criteria.

[Evaluation Criteria]

I: The toner passed through due to a cleaning failure could not be visually observed on the printed paper or the photoconductor, and the line marks formed of the passed through toner on the photoconductor could not be observed when the photoconductor was observed along the longitudinal direction thereof under the microscope.

II: The toner passed through due to a cleaning failure could not be visually observed on the printed paper or the photoconductor, but the line marks formed of the passed through toner on the photoconductor was observed when the photoconductor was observed along the longitudinal direction thereof under the microscope.

III: The toner passed through due to a cleaning failure was visually observed on both the printed paper and the photoconductor.

<Contamination of Blade and Photoconductor>

By means of an image forming apparatus (IMAGEO MP C5002, available from Ricoh Company Limited), a vertical band chart having an imaging area rate of 30% was printed on 50,000 sheets (A4, landscape) at 3 prints/job in the laboratory environment of 27° C. and 90% RH.

Subsequently, 5,000 sheets (A4, landscape) of blank paper were output at 3 prints/job, followed by printing a half-tone image on 1 sheet.

Thereafter, the blade (cleaning blade) and the photoconductor were observed with naked eyes, and the contamination of the blade was evaluated. The evaluation criteria was as follows.

[Evaluation Criteria]

I: There was no contamination in the photoconductor and the blade, and there was no problem in quality of the image.

II: There was a slight deposition of the toner on either the photoconductor or blade, but there was no problem in image quality.

III: There was a clear deposition of the toner on both the photoconductor and the blade, and there was a problem in image quality.

<Comprehensive Judgement>

The comprehensive judgement of the 4 evaluation results of "low temperature fixability," "heat resistant storage stability," "cleaning performance," and "contamination of blade and photoconductor" was performed based on the following criteria.

[Evaluation Criteria]

1: There was at least one result of A or I, and no result of C, D, and III.

2: There was no result of C, D, and III.

3: There was a result of C or D or III.

TABLE 3

| | Ex. 1 | Ex. 2 | Ex. 3 | Ex. 4 | Ex. 5 | Ex. 6 |
|---|---|---|---|---|---|---|
| Structure of resin particle | core-shell | core-shell | core-shell | core-shell | core-shell | core-shell |
| Constitutional components of resin particles | styrene acryl resin | styrene acryl resin | styrene acryl resin | styrene acryl resin | styrene acryl resin | styrene acryl resin |
| Type of resin particles | A-1 | A-1 | A-1 | A-2 | A-2 | A-2 |
| Particle diameter of resin particles [nm] | 17.3 | 17.3 | 17.3 | 34.3 | 34.3 | 34.3 |
| Ratio of Resin a2/Resin a1 (in Resin Particles A) | 1/2 | 1/2 | 1/2 | 1/2 | 1/2 | 1/2 |
| TgA (shell Tg) [° C.] | 75 | 75 | 75 | 85 | 85 | 85 |
| TgB (core Tg) [° C.] | 45 | 45 | 45 | 50 | 50 | 50 |
| Tg of resin particles [° C.] | 61 | 61 | 61 | 69 | 69 | 69 |
| G'1 [Pa] | $4.5 \times 10^5$ | $6.0 \times 10^5$ | $7.5 \times 10^5$ | $5.0 \times 10^5$ | $6.5 \times 10^5$ | $8.0 \times 10^5$ |
| G'2 [Pa] | $3.5 \times 10^4$ | $4.0 \times 10^4$ | $4.9 \times 10^4$ | $4.0 \times 10^4$ | $4.4 \times 10^4$ | $5.0 \times 10^4$ |
| Coverage factor with resin | 40 | 60 | 80 | 40 | 60 | 80 |

TABLE 3-continued

| | Ex. 1 | Ex. 2 | Ex. 3 | Ex. 4 | Ex. 5 | Ex. 6 |
|---|---|---|---|---|---|---|
| particles [%] | | | | | | |
| Tg1st [° C.] | 42 | 43 | 45 | 43 | 44 | 46 |
| Tga1st [° C.] | −37 | −37 | −37 | −37 | −37 | −37 |
| Standard deviation of distance between resin particles [nm] | 63 | 23 | 15 | 200 | 45 | 35 |
| Toner washing step | performed | performed | performed | performed | performed | performed |

TABLE 4

| | Ex. 7 | Ex. 8 | Ex. 9 | Ex. 10 | Ex. 11 | Ex. 12 |
|---|---|---|---|---|---|---|
| Structure of resin particle | core-shell | core-shell | core-shell | core-shell | core-shell | core-shell |
| Constitutional components of resin particles | styrene acryl resin | styrene acryl resin | styrene acryl resin | styrene acryl resin | styrene acryl resin | styrene acryl resin |
| Type of resin particles | A-3 | A-3 | A-3 | A-1 | A-1 | A-1 |
| Particle diameter of resin particles [nm] | 51.5 | 51.5 | 51.5 | 51.5 | 51.5 | 51.5 |
| Ratio of Resin a2/Resin a1 (in Resin Particles A) | 1/2 | 1/2 | 1/2 | 1/2 | 1/2 | 1/2 |
| TgA (shell Tg) [° C.] | 65 | 65 | 65 | 65 | 65 | 65 |
| TgB (core Tg) [° C.] | 45 | 45 | 45 | 45 | 45 | 60 |
| Tg of resin particles [° C.] | 55 | 55 | 55 | 55 | 55 | 55 |
| G'1 [Pa] | $6.0 \times 10^5$ | $7.5 \times 10^5$ | $8.5 \times 10^5$ | $4.0 \times 10^5$ | $9.5 \times 10^5$ | $10.6 \times 10^5$ |
| G'2 [Pa] | $4.5 \times 10^4$ | $5.0 \times 10^4$ | $5.4 \times 10^4$ | $2.5 \times 10^4$ | $6.7 \times 10^4$ | $8.3 \times 10^4$ |
| Coverage factor with resin particles [%] | 40 | 60 | 80 | 25 | 95 | 80 |
| Tg1st [° C.] | 44 | 45 | 47 | 40 | 52 | 53 |
| Tga1st [° C.] | −37 | −37 | −37 | −37 | −37 | −37 |
| Standard deviation of distance between resin particles [nm] | 330 | 210 | 94 | 400 | 70 | 95 |
| Toner washing step | performed | performed | performed | performed | performed | performed |

TABLE 5

| | Ex. 13 | Ex. 14 | Ex. 15 | Ex. 16 |
|---|---|---|---|---|
| Structure of resin particle | core-shell | core-shell | core-shell | core-shell |
| Constitutional components of resin particles | styrene acryl resin | styrene acryl resin | styrene acryl resin | styrene acryl resin |
| Type of resin particles | A-1 | A-1 | A-1 | A-1 |
| Particle diameter of resin particles [nm] | 105 | 51.5 | 51.5 | 51.5 |
| Ratio of Resin a2/Resin a1 (in Resin Particles A) | 3/1 | 1/4 | 1/5 | 1/2 |
| TgA (shell Tg) [° C.] | 65 | 65 | 65 | 65 |
| TgB (core Tg) [° C.] | 45 | 45 | 45 | 45 |
| Tg of resin particles [° C.] | 50 | 60 | 60 | 55 |
| G'1 [Pa] | $>5.0 \times 10^5$ | $10.0 \times 10^5$ | $4.1 \times 10^5$ | $10.5 \times 10^5$ |
| G'2 [Pa] | $3.5 \times 10^4$ | $8.0 \times 10^4$ | $2.0 \times 10^4$ | $8.5 \times 10^4$ |
| Coverage factor with resin particles [%] | 80 | 30 | 30 | 80 |
| Tg1st [° C.] | 43 | 50 | 60 | 55 |
| Tga1st [° C.] | −37 | −37 | −37 | 20 |
| Standard deviation of distance between resin particles [nm] | 80 | 510 | 90 | 94 |
| Toner washing step | performed | performed | performed | performed |

TABLE 6

| | Comp. Ex. 1 | Comp. Ex. 2 | Comp. Ex. 3 | Comp. Ex. 4 |
|---|---|---|---|---|
| Structure of resin particle | not core-shell | not core-shell | core-shell | core-shell |
| Constitutional components of resin particles | styrene acryl resin | styrene acryl resin | styrene acrylresin | styrene acryl resin |
| Type of resin particles | a2-1 | a2-1 | A-1 | A-3 |
| Particle diameter of resin particles [nm] | 17.2 | 51.5 | 17.2 | 17.2 |
| Ratio of Resin a2/Resin a1 (in Resin Particles A) | 1/2 | 1/2 | 1/2 | 1/2 |
| TgA (shell Tg) [° C.] | 45 | 40 | 60 | 75 |
| TgB (core Tg) [° C.] | 30 | 60 | 55 | 45 |
| Tg of resin particles [° C.] | 37 | 52 | 58 | 61 |
| G'1 [Pa] | $8.0 \times 10^4$ | $7.3 \times 10^5$ | $9.0 \times 10^5$ | $9.0 \times 10^4$ |
| G'2 [Pa] | $1.0 \times 10^4$ | $4.5 \times 10^4$ | $6.0 \times 10^4$ | $2.0 \times 10^4$ |
| Coverage factor with resin particles [%] | 70 | 70 | 70 | 20 |
| Tg1st [° C.] | 41 | 42 | 42 | 41 |
| Tga1st [° C.] | −37 | −37 | −37 | −37 |
| Standard deviation of distance between resin particles [nm] | 560 | 530 | 500 | 560 |
| Toner washing-step | performed | not performed | performed | performed |

TABLE 6-continued

| | Comp. Ex. 1 | Comp. Ex. 2 | Comp. Ex. 3 | Comp. Ex. 4 |
|---|---|---|---|---|

TABLE 7

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Low temperature fixability | A | A | A | A | B | B | A | B |
| Heat resistant storage stability | B | B | B | B | B | B | B | A |
| Cleaning performance | II | II | II | II | II | II | II | I |
| Blade contamination | I | II | II | I | II | II | II | II |
| Comprehensive judgement | 1 | 1 | 1 | 1 | 2 | 2 | 1 | 1 |

TABLE 8

| | Ex. 9 | Ex. 10 | Ex. 11 | Ex. 12 | Ex. 13 | Ex. 14 | Ex. 15 | Ex. 16 |
|---|---|---|---|---|---|---|---|---|
| Low temperature fixability | B | A | B | B | B | A | A | B |
| Heat resistant storage stability | A | B | A | B | B | B | B | B |
| Cleaning performance | I | II | II | II | II | II | II | II |
| Blade contamination | II | II | II | II | II | II | II | II |
| Comprehensive judgement | 1 | 1 | 1 | 2 | 2 | 1 | 1 | 2 |

TABLE 9

| | Comp. Ex. 1 | Comp. Ex. 2 | Comp. Ex. 3 | Comp. Ex. 4 |
|---|---|---|---|---|
| Low temperature fixability | B | C | D | B |
| Heat resistant storage stability | D | D | B | D |
| Cleaning performance | III | III | II | III |
| Blade contamination | III | II | II | III |
| Comprehensive judgement | 3 | 3 | 3 | 3 |

As presented in the tables above. Examples 1 to 16 had the excellent results compared to Comparative Examples 1 to 4.

Toner (T'-1) of Comparative Example 1 using Composite Resin Particles (C'-1), in each of which particles including Resin Particles (a2-1) were deposited on a surface of Resin Particle (B'-1), had excellent low temperature fixability, but unfavorable heat resistant storage stability, cleaning performance, and filming resistance.

Moreover, Toner (T-2) of Comparative Example 2 using the composite resin particles obtained by not performing the washing step in the production of Composite Resin Particles (C'-2), in each of which particles including Resin Particles (a2-1) were deposited on a surface of Resin Particle (B'-1), had unfavorable heat resistant storage stability and cleaning performance.

Moreover, Toner (T'-3) of Comparative Example 3 using Composite Resin Particles (C'-3) obtained by decreasing the Resin Particles (A-1) content in the toner, and Toner (T'-4) of Comparative Example 4 using Composite Resin Particles (C'-4) obtained by decreasing the Resin Particles (A-3) content in the toner had excellent low temperature fixability, but unfavorable heat resistant storage stability, cleaning performance, and filming resistance due to the additives.

What is claimed is:

1. A toner comprising toner base particles, each of the toner base particles including a binder resin, a colorant, and wax; and resin particles, each of the resin particles has a core-shell structure including a core and a shell, where a glass transition temperature TgA of the shell is higher than a glass transition temperature TgB of the core, wherein a surface of each of the toner base particles is covered with the resin particles, and wherein a storage elastic modulus G'1 of the toner at 70° C. during heating is $1.0\times10^5$ Pa or greater but $1.0\times10^6$ Pa or less, and a storage elastic modulus G'2 of the toner at 100° C. during heating is $1.0\times10^4$ Pa or greater but $5.0\times10^4$ Pa or less, as the toner is measured by a rheometer.

2. The toner according to claim 1, wherein a coverage factor of the toner base particles with the resin particles is 30% or greater but 90% or less.

3. The toner according to claim 2, wherein the coverage factor of the toner base particles with the resin particles is 30% or greater but 70% or less.

4. The toner according to claim 1, wherein the resin particles satisfy TgA−TgB≥10° C., where TgA is a glass transition temperature of the shell of each of the resin particles, and TgB is a glass transition temperature of the core of each of the resin particles.

5. The toner according to claim 1, wherein the resin particles include a styrene-acrylic resin in both the shell and the core of each of the resin particles.

6. The toner according to claim 1, wherein the resin particles have a volume average primary particle diameter of 10 nm or greater but 100 nm or less.

7. The toner according to claim 1, wherein the resin particles have a glass transition temperature Tg of 40° C. or higher but 70° C. or lower.

8. The toner according to claim 1, wherein a standard deviation of distances between the resin particles next to one another present on the surface of each of the toner base particles is 500 nm or less.

9. The toner according to claim 1, wherein a glass transition temperature Tg1st of the toner measured from first heating of differential scanning calorimetry (DSC) of the toner is 20° C. or higher but 50° C. or lower, and a glass transition temperature Tg1st of a tetrahydrofuran (THF) insoluble component of the toner measured from first heating of differential scanning calorimetry (DSC) of the THF insoluble component is −40° C. or higher but 10° C. or lower.

10. A developer comprising:

a carrier; and the toner according to claim 1.

11. A toner storage unit comprising:

the toner according to claim 1; and a unit, in which the toner is stored.

12. An image forming apparatus comprising:

an electrostatic latent image bearer;

an electrostatic latent image forming unit configured to form an electrostatic latent image on the electrostatic latent image bearer;

a developing device including a toner and configured to develop the electrostatic latent image with the toner to form a visible image;

a transferring unit configured to transfer the visible image onto a recording medium;

a fixing unit configured to fix the transferred visible image on the recording medium; and a cleaning unit configured to clean the electrostatic latent image bearer, wherein the toner is the toner according to claim 1.

13. An image forming method comprising:

forming an electrostatic latent image on an electrostatic latent image bearer;

developing the electrostatic latent image with a toner to form a visible image;

transferring the visible image onto a recording medium;

fixing the transferred visible image on the recording medium; and cleaning the electrostatic latent image bearer, wherein the toner is the toner according to claim 1.

* * * * *